US011477993B2

(12) United States Patent
Irwin et al.

(10) Patent No.: US 11,477,993 B2
(45) Date of Patent: *Oct. 25, 2022

(54) SERVO DRIVEN ICE CREAM SANDWICH ASSEMBLY AND WRAPPING MACHINE

(71) Applicant: Norse Dairy Systems, LLC, Columbus, OH (US)

(72) Inventors: Jeff Irwin, Etna, OH (US); Jeff Crawford, Canal Winchester, OH (US); Chris Martin, Columbus, OH (US)

( * ) Notice: Subject to any disclaimer, the term of this patent is extended or adjusted under 35 U.S.C. 154(b) by 427 days.

This patent is subject to a terminal disclaimer.

(21) Appl. No.: 16/444,712

(22) Filed: Jun. 18, 2019

(65) Prior Publication Data
US 2019/0380359 A1   Dec. 19, 2019

Related U.S. Application Data

(63) Continuation-in-part of application No. 15/355,619, filed on Nov. 18, 2016, now Pat. No. 10,730,649.
(Continued)

(51) Int. Cl.
*A23G 9/28* (2006.01)
*B65B 25/00* (2006.01)
(Continued)

(52) U.S. Cl.
CPC .............. *A23G 9/286* (2013.01); *B65B 11/08* (2013.01); *B65B 25/007* (2013.01); *B65B 49/08* (2013.01);
(Continued)

(58) Field of Classification Search
CPC . A23G 9/22; A23G 9/28; A23G 9/286; B65B 11/08; B65B 11/20; B65B 2051/105; B65B 25/007; B65B 49/08; B65B 51/10; B65B 59/04; B65H 2220/01; B65H 2220/02; B65H 23/1825; B65H 23/185;
(Continued)

(56) References Cited

U.S. PATENT DOCUMENTS 3,834,199 A * 9/1974 Rouyer ................ B21D 13/045
72/38
4,580,476 A * 4/1986 Jones ..................... A23G 9/245
83/160
(Continued)

*Primary Examiner* — Dana Ross
*Assistant Examiner* — Joseph W Iskra
(74) *Attorney, Agent, or Firm* — Gutwein Law; Tyler Droste

(57) ABSTRACT

An apparatus for the preparation of comestible-containing sandwich products comprises a sandwich product assembly station and corresponding means for the fabrication and assembly of a sandwich product in the vertical direction. The apparatus includes an extruder nozzle, wafer trays and corresponding components for the location of wafers on opposite sides of the extruded product, an indexing wheel for receiving the assembled sandwich product, and sandwich transporting means for moving the sandwich to a wrapping assembly and from there to a discharge end, wherein all of the components of the apparatus are mounted in cantilevered fashion on a vertical support or base member. Each element is powered individually by a servo motor or actuator and controlled by a controller allowing the variability of throughput for each station.

18 Claims, 45 Drawing Sheets

Related U.S. Application Data

(60) Provisional application No. 62/686,395, filed on Jun. 18, 2018.

(51) Int. Cl.
  *B65B 51/10* (2006.01)
  *B65B 49/08* (2006.01)
  *B65B 11/08* (2006.01)

(52) U.S. Cl.
  CPC ........ *B65B 51/10* (2013.01); *B65B 2051/105* (2013.01)

(58) Field of Classification Search
  CPC ........ B65H 2511/112; B65H 2511/142; B65H 2513/11; B65H 2515/31; B65H 2553/212; B65H 2553/30; B65H 2555/24
  USPC ....................................................... 99/450.4
  See application file for complete search history.

(56) References Cited

U.S. PATENT DOCUMENTS

| | | | |
|---|---|---|---|
| 5,493,957 A * | 2/1996 | Kennedy | A23G 9/286 99/450.4 |
| 7,322,166 B1 * | 1/2008 | Claxton | A21C 15/02 53/230 |
| 2013/0067858 A1 * | 3/2013 | Spears | B65B 11/54 53/122 |
| 2015/0164131 A1 * | 6/2015 | Vardakostas | A23P 20/20 99/450.4 |

* cited by examiner

SERVO DRIVEN ICE CREAM SANDWICH ASSEMBLY AND WRAPPING MACHINE

CROSS-REFERENCE TO RELATED APPLICATION

This U.S. patent application claims priority to U.S. Provisional Application: 62/686,395 filed on Jun. 18, 2018, and is a continuation in part U.S. Non-Provisional Application Ser. No. 15/355,619 filed Nov. 18, 2016 which claims priority to U.S. Provisional Application: 62/256,783 filed on Nov. 18, 2015 the disclosures of which are considered part of the disclosure of this application and is hereby incorporated by reference in its entirety.

FIELD OF THE INVENTION

This invention relates generally to an apparatus for making comestible-containing sandwich products such as ice cream sandwiches and wrapping of comestible-containing sandwich products.

BACKGROUND

There have been many machines known in the art for the manufacture and wrapping of ice cream sandwiches, the basic features of which are well understood by those of ordinary skill in the art. Examples of such prior art devices include those disclosed in U.S. Pat. No. 3,828,660 to Mueller et al., U.S. Pat. No. 3,834,119 to Armitt et al., U.S. Pat. No. 4,628,664 to Price et al. and U.S. Pat. No. 5,493,957 to Kennedy et al., which are incorporated herein by reference.

As shown in these patents and as is well known in the art, an ice-cream sandwich filling apparatus typically comprises an apparatus frame to which a series of stations are affixed in a cantilevered fashion. The moving components of the apparatus are typically controlled by a numerical or computer controller through one or more drive mechanisms. The first station is typically the wafer filling station, in which a top and bottom wafer are provided by wafer feeders and an ice-cream extruder discharges ice cream between the wafers. The completed sandwich is then delivered, often via an indexing wheel or similar device, to a conveyor assembly, also affixed to the apparatus frame, which carries the sandwich toward a wrapping station.

When the sandwich arrives at the wrapping station, it first enters at the bottom of a vertical elevator, where a cut sheet of wrapping paper, provided by primary and secondary paper rollers and cut by a rotary knife between the two rollers, is situated atop the sandwich. The paper rollers are typically biased downward through the use of mechanical compression springs to provide friction between the roller and the supplied paper, thereby reducing or preventing slippage. The operation of the paper rollers and rotary knife and the arrangement of the cut sheet atop the sandwich is known in the prior art, and typically all of these parts have been commonly driven. The elevator then carries the sandwich and cut sheet upwards through the wrapping assembly, where a pusher mechanism cooperates with side and bottom tucking devices both to fold the paper about the sandwich and to push the wrapped sandwich toward an exit tray. The operation of these tuckers is also known in the art. The exit tray in turn includes one or more heated platens, which act to heat seal the bottom overlaps of the cut sheet of wrapping paper to each other, providing a secure wrap.

Despite the periodic improvements reflected in the above-referenced patents, there remain several drawbacks in ice cream sandwich-making machines known in the art, particularly with respect to the single motor drivetrain apparatus. For example, current ice cream sandwich making machines use a combination of AC motor and gearbox to drive the components of the machine through a series of belts, chains, cams, gearboxes and shafts. This type of drive arrangement is subject to mechanical failure and continuous maintenance. Further, the components of this type of mechanical drive take up substantially more internal space within the machine, congest, interfere, and make difficult the maintenance, repair, and/or replacements of parts or components of the ice cream sandwich making apparatus.

In addition, the relative motions and timing of components and stations are normally fixed in current machines, unless the machine is manually adjusted, or an existing mechanical setting is changed—typically requiring substantial down time for the machine. Even further, many complex processes, for example motions, phasing and/or timing of components and stations are not achievable with this type of conventional drive arrangement due to limitations of mechanical factors. Therefore, there is a need for an apparatus to provide the same consistency of manufacturing while providing additional adjustments for throughput and maintenance.

BRIEF SUMMARY OF THE INVENTION

In one aspect, the present invention relates to an improved apparatus for the assembly of comestible-containing sandwich products such as ice cream sandwiches and wrapping of comestible-containing sandwich products. The apparatus disclosed is constructed about a vertical support or wall having attached thereto in cantilevered fashion a sandwich assembling station.

A sandwich assembling station comprising a central extruder with a nozzle for the discharge of a comestible of a predetermined shape and a sandwich wafer dispensing means comprising inclined wafer trays configured to stably support a plurality of wafers for delivery against the corresponding opposite ends of the extruded comestible product. The sandwich assembling station further comprised of an indexing means comprising an indexing wheel that is disposed vertically below the sandwich assembling means, the indexing means comprising an indexing wheel defining a plurality of circumferentially positioned pockets or slots for receiving and transferring sandwiches for horizontal conveyance.

A transport assembly station communicates with the indexing means for receiving ice cream sandwiches from the discharge end thereof and moving them to a wrapping assembly, where the transport assembly station comprising one or more actuators means for receiving and moving said ice cream sandwiches forward, to be interfaced by an elevator actuator.

A sandwich wrapping assembly is located at the discharge end of the transport assembly actuator(s) when fully extended, the wrapping assembly comprising a vertically reciprocable elevator for receiving the sandwich and a sheet of wrapping material and conveying the sandwich and the wrapping material to a tucking mechanism. The tucking mechanism is comprised of two laterally disposed and reciprocable side tucking fingers for urging said wrapping paper about the opposite ends of said sandwich, and a bottom tucking device reciprocable in a direction from the side tucking device, and co-acting therewith to complete the wrapping of the ice cream sandwich and pushing the sandwich off of the assembly.

The invention extends in a first aspect to the modular construction of the described apparatus, in that the sandwich assembling station, sandwich indexing means and the sandwich wrapping means are all removable from the apparatus and replaceable with corresponding components of different size to accommodate the manufacture of differently sized sandwich products. Thus, the wafer trays, extruder nozzles, indexing wheel, elevator, side tuck fingers and bottom tuck device may all be removed and replaced with like components of different dimension.

Another aspect of the invention relates to improvements of the drivetrain of the apparatus by supplying each individual station with a one or more servo motors or linear actuators to drive each respected station in communication with each other. The apparatus described above comprising a plurality of servo motors drives for driving the various stations and components within each station, of the apparatus. The servo motors may be communicatively coupled to and coordinated by a controller such as a programmable logic controller ("PLC") that provides a variety of custom and/or complex controls. Increasing the number of servo motors and the manner of the application of the servo motors provides increased control of each station and component within the station of the apparatus, allowing a user to optimize the functionality of the apparatus based on variables in sizes of sandwich products. The additional functionality provided by the servo motors can provide higher production rates, easier repair, and adjustability of timing requirements for the apparatus throughput requirements.

The drivetrain of the apparatus is less complex and there is less congested by eliminating the multiple chains, belts, and gears necessary to properly coordinate the interaction between the stations and components therein. The less congestion allows for easier access for repair, replacement, and modularity of the parts cantilevered to the wall. The servos also prevent the need to re-gear the drivetrain mechanism to conform to the type and size of sandwich being produced and can easily be adjusted using the PLC to control the speed of the individual servo motors. The timing and coordination of the various servo motors are capable of being performed rapidly through the PLC that can be connected to an electronic interface, such as a graphical user interface, thus allowing a user to manual control or load a pre-set program to be performed by the PLC.

The apparatus further includes wrapping material dispensing means, including a plurality of wrapping material dispenser spools that are servo driven indexed and timed for delivery of said wrapping paper and the severing of same to a predetermined size for the respective sandwich being wrapped. The means for indexing and severing wrapping paper of a predetermined size is driven by a servo motor, which can be adjusted by the PLC to accommodate various sizes and frequency of the wrapping material being severed and provided.

Accordingly, it is a principal object of the present invention to provide an ice cream sandwich making apparatus that is capable of rapid and thorough cleaning and maintenance, by the provision of the primary stations of said wrapping machine in cantilevered fashion along a single support wall.

It is a further object of the present invention to provide an ice cream sandwich making apparatus as aforesaid that is of modular design and capable of the removal and retrofitting of the primary components concerned with the sandwich making process, to facilitate their replacement with like components of different size without the additional hassle of retiming the apparatus and using the pre-determined programs with the PLC and servo motors.

It is a still further object of the present invention to provide an ice cream sandwich making apparatus as aforesaid that is so designed as to render the removal and retrofitting of primary components rapid by the reduction in the number of screw fittings, support plates, chain drives, and sprockets that must be manipulated to such end.

It is a still further object of the present invention to provide an ice cream sandwich making apparatus having a friction member or press plate assembly to actively engage the ice cream sandwich while the pusher withdraws after pushing the ice cream sandwich. The friction member or press plate assembly can be further functionalized using a servo motor to adjust pressure depending on the size of the sandwich upon which friction is applied.

It is a further object of the present invention to provide a braking system coupled to said wrapping feeder means and communicatively coupled to said controller, wherein the braking system can have a sensor configured to monitor the tension of the wrap, and a braking means configured to apply torque to the wrap roller.

It is a further object of the present invention to provide a 3-axis roller assembly wherein said wrap roller servo drive assembly is further comprised of additional servo motors configured, wherein the servos are configured to drive a first and second roller to feed a wrap to said wrapping assembly, and wherein a third servo motor is configured to drive a rotary knife configured to cut said wrap.

It is a further object of the present invention to provide a paper core chuck including a plunger, shaft, and one or more clamping jaws, wherein the chuck is configured to clamp equally around the diameter of a paper core and maintain the paper in a centered configuration. The shaft can further include a stepped configuration having a plurality of steps, wherein said steps contact an interfacing portion of the claiming jaws to further extend the jaws as the plunger is further depressed.

It is a further object of the present invention to provide a method for controlling the tension of wrap on a wrap feed system including first providing a controller communicatively coupled to a first servo motor coupled to a roll of wrap, a second servo motor, a third servo motor, a fourth servo motor, and a laser distance sensor positioned proximate to the roll of wrap configured to measure the diameter of the roll of wrap. The controller can initiate wrap at a prescribed a feed rate at a first pre-determined rate. A user can then input a desired a wrap tension. The controller can monitor the tension of the wrap and change the feed rate to increase or decrease the wrap tension. The controller can then calculate using the controller the speed of the spin of the roll to provide a pre-determined amount of wrap. Wrap can be provided to the second motor, wherein the second motor spins at the same rate as the first motor. The second motor can spin second pre-determined rate, wherein said second pre-determined rate corresponds to a wrapping cycle. A third motor can spin at a third pre-determined rate, wherein said third pre-determined rate is faster than said first pre-determined rate and configured to create tension on the wrap.

Other objects and advantages will become apparent to those skilled in the art from a review of the ensuing description which proceeds with reference to the following illustrative drawings. The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1A:
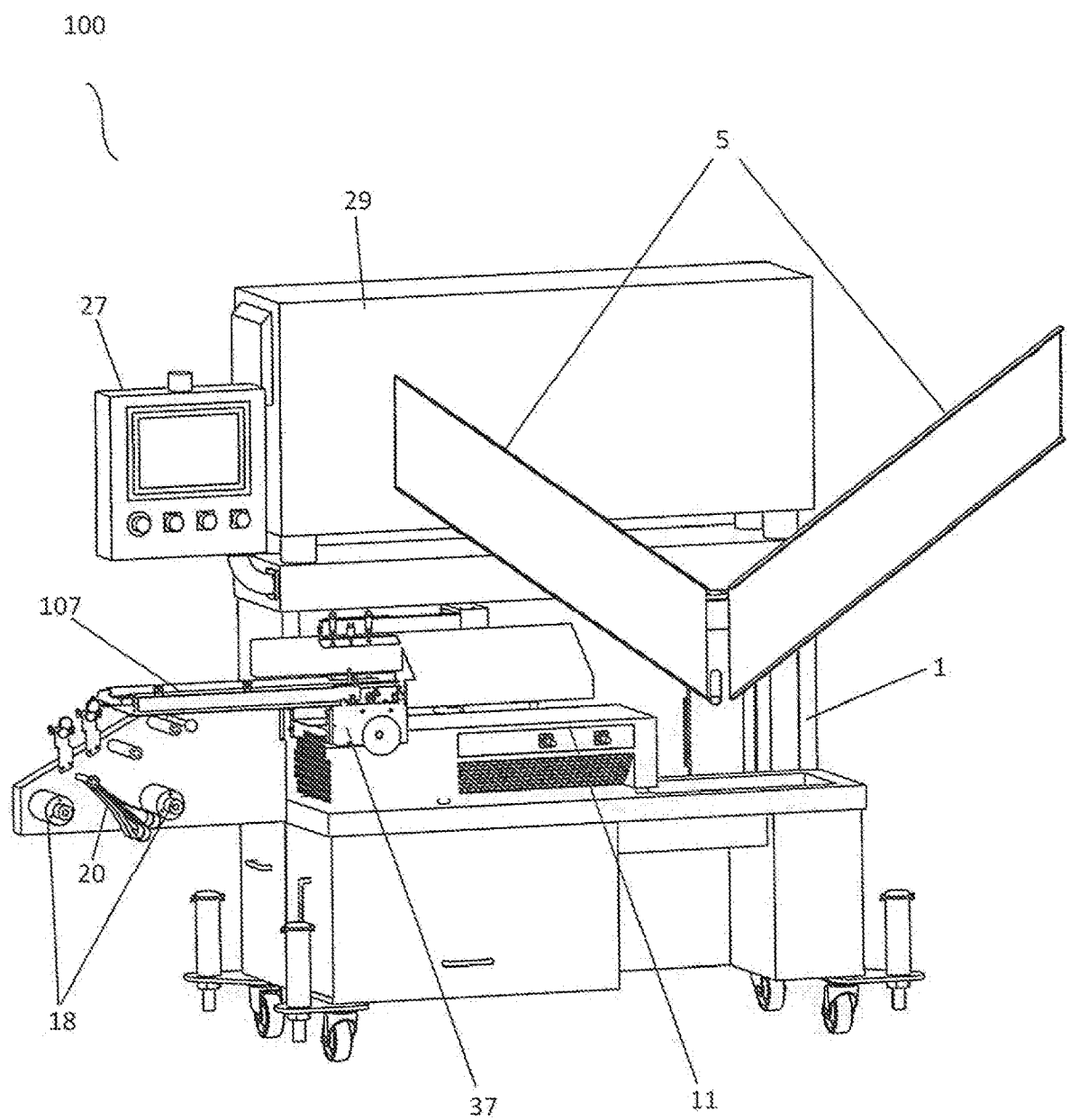
FIG. 1A is a front plan view of the apparatus of the present invention, setting forth components and parts thereof.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

In its primary aspect, the present invention relates to an apparatus for the manufacture of comestible-containing sandwich sandwiches, such as ice cream products, which comprises a sandwich forming station including an extruder apparatus and wafer dispenser means associated lateral thereto, a means for receiving, indexing and conveying the formed sandwiches for packaging, a sandwich wrapping assembly and an output assembly for the movement of wrapped sandwiches to an output end for further processing, packaging and shipping. Each of the stations of the apparatus of the present invention may be mounted in cantilevered fashion against a vertical central support wall. Certain components thereof are individually removable and may be replaced with corresponding components of different size, to facilitate the operation of the apparatus of the invention in the manufacture of differently sized comestible sandwich products.

Referring now to FIG. 1A-B and FIG. 2A-B, ice cream sandwich apparatus 100 is disclosed which comprises a vertical support wall 1, to which are attached all of the primary components and stations of the said apparatus.

Figure 18A:
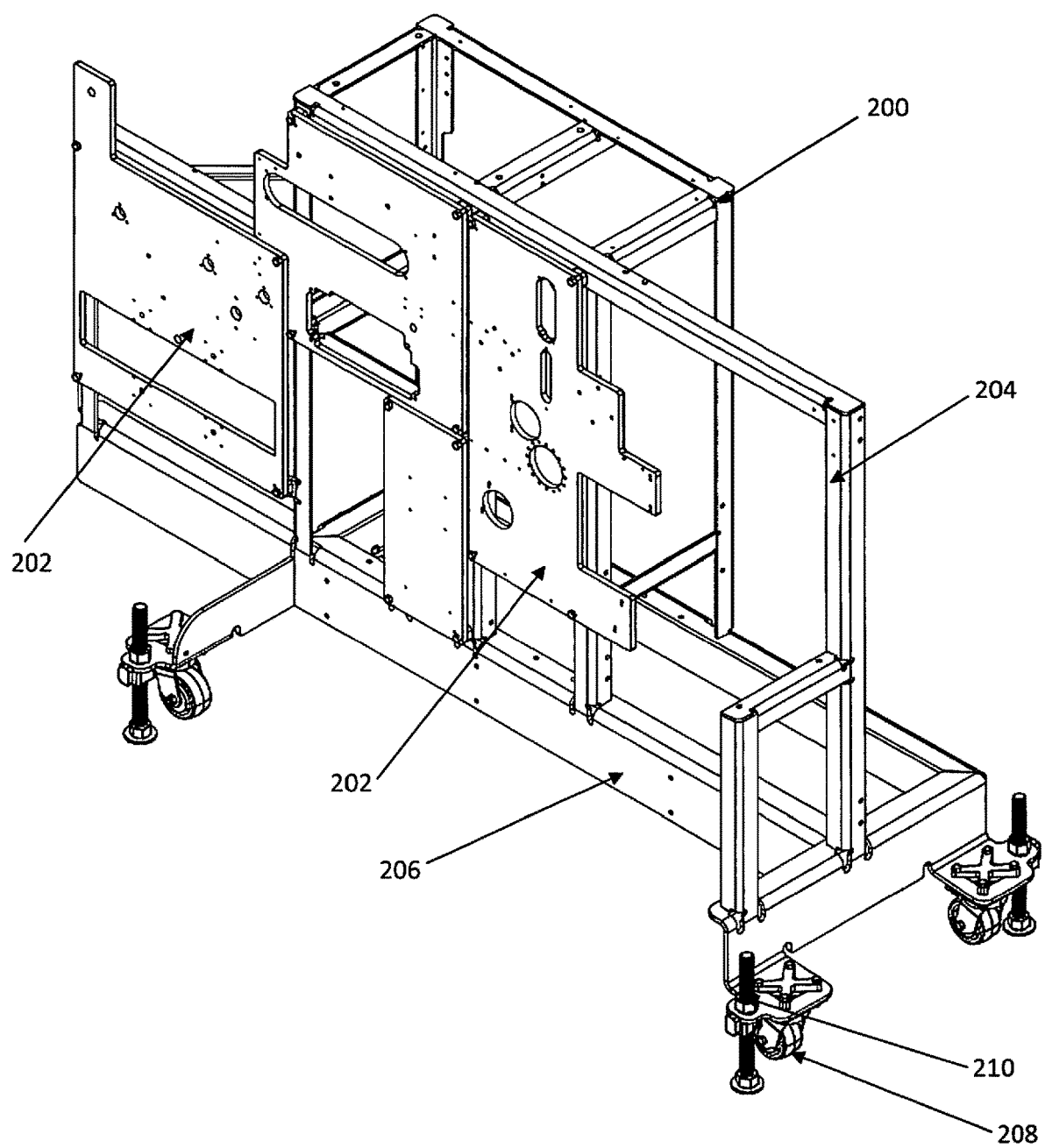
FIG. 18A is a perspective view of exemplary embodiments of the support structure of the apparatus of the present invention.
Figure 18B:
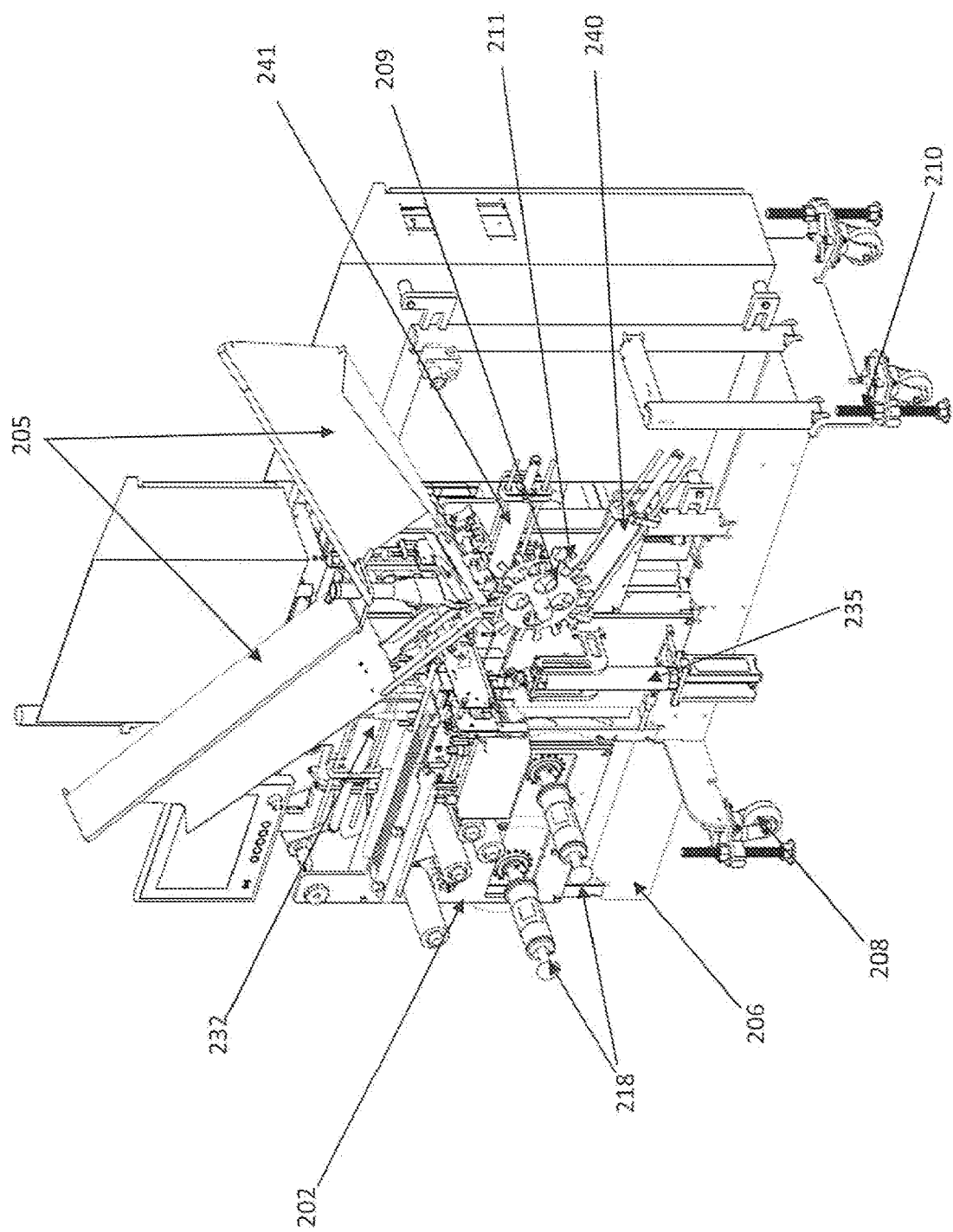
FIG. 18B is a perspective view of an exemplary embodiment of the apparatus of the present invention.
Figure 18C:
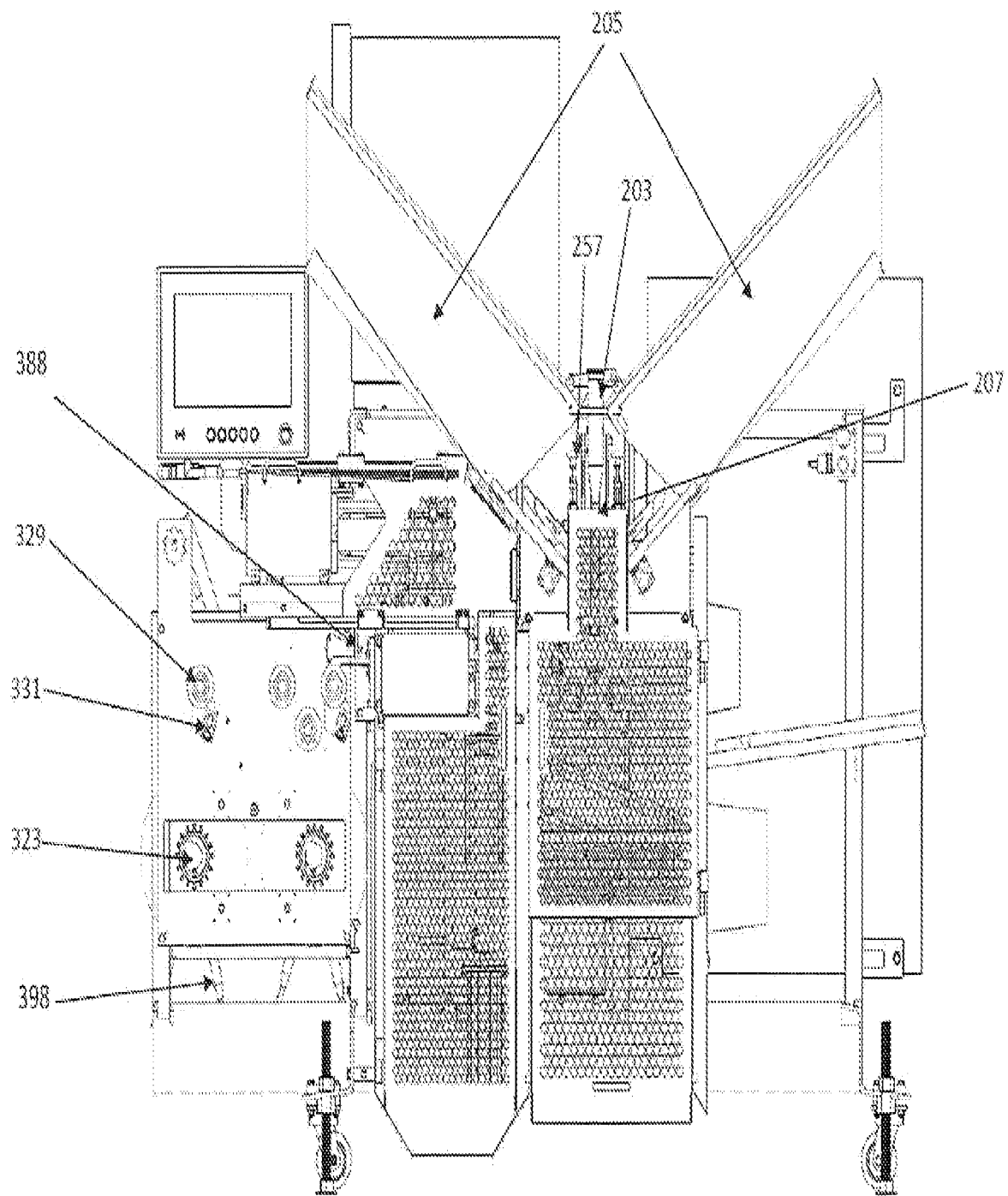
FIG. 18C is another front view of an exemplary embodiment of the apparatus including protective shielding proximate to the working areas of the apparatus.

In one exemplary embodiment as shown in FIG. 18A-C, the frame can be comprised of a plurality of assemblies. The frame 200 can consist of an outer layer 202, an inner support structure 204, and a base portion 206. The outer layer 202 can be comprised of composite, metal, plastic, or any other suitable material. The support frame can have a base portion 206. The base portion 206 can include one or more wheels 208 to allow for easy mobility of the apparatus throughout an area. Additionally, the base portion can include a braking or leveling means 210 to maintain the apparatus at a constant level. One exemplary embodiment can use a precision machine metal that can be welded around the sides to form a seamless shroud thereby limiting the penetration of any unwanted materials from entering the interior portion of the apparatus of the present disclosure. In another exemplary embodiment, the outer layer can be comprised of various removeable plates, wherein the plates can be spaced to allow for easy cleaning and sanitation of the entire apparatus. The base portion can have one or more support members configured to allow for coupling of the outer layer to the support structure. In one exemplary embodiment, the support members can be formed vertically from the base portion.

Another exemplary embodiment, the outer layer can comprise one or more removeable sections that allow for easy removal and replacement of current implements attached to the plates and for modular design changes if the desired application needs to be reconfigured. The removeable sections can be precisely and including mounting pads to allow for easily coupling to the frame support structure. Additionally, the pads can provide for a space between the support structure and removeable sections to allow for a more sanitary apparatus that can be easily cleaned and prevent the retention of contaminants. The removeable sections can include one or more apertures configured to allow for the coupling of machine subassemblies to be attached to the removeable sections. The removeable sections can be coupled to the support structure using fasteners, welding, or any other suitable means. In other embodiments, the sections can be permanently welded or affixed to the support structure.

In some exemplary embodiments, the removeable sections can be spaced off with large gaps to allow for sanitation to easily clean all areas. For alignment, the plates can be mounted to pads that can be machined on the frame after welding. The pads can insure tight parallelism and position between all mounting points. Furthermore, the support structure can further include locating pins to locate the plates. Additionally, the removeable sections/plates can be ground flat to ensure parallelism between the frame and all components mounted to them, which can provide tighter alignment of the servo motors thereby improving servo motor operation.

Additionally, the frame of an apparatus can be configured in a manner to minimize or completely remove any structure from being located under the production area of the apparatus. This can be achieved from the cantilever design of the machine subassemblies being coupled to the sections of the outer layer. This configuration enables for more effective and efficient cleaning practices that can prevent or limit any potential contamination within the production area from the inability to properly clean proximate to the production area of the apparatus.

An apparatus of the present disclosure can further include one or more control/electrical cabinet, such as a PLC and HMI housing/cabinet. Currently, many similar apparatuses have a control cabinet located above the top portion of the vertical supports. In one exemplary embodiment, a control cabinet can be coupled directly to the base portion of the frame and configured to reduce the height of current similar apparatus configuration, while additionally lowering the center of gravity of the apparatus. Similarly, the cabinet can be coupled to a vertical support member extending from the base portion. In some embodiment, more than about 50% of the cabinet is located below the central horizontal axis of the entire apparatus. The HMI cabinet can be communicatively coupled to a display for displaying information and used to control the operations of the apparatus of the present disclosure.

Similar to the removeable sections mounted to the support structure, the cabinet assemblies can be removeably coupled to the support structure allowing for user customization and modification without needing to replace an entire apparatus of the present disclosure. A cabinet can have six walls, with one of the walls being hingedly and/or removeably coupled to the cabinet to allow a user access to the interior compartment of the cabinet. The top wall of the cabinet can be angled or sloped to allow for easier cleaning and limit or prevent liquid from remaining or standing on the top of the cabinet. This can help maintain the cabinet of the system hygienic for food preparation. Additionally, a plurality of cases/cabinets can be used to separate high voltage and low voltage elements for safe debugging.

Thus, apparatus 100 may include a sandwich assembling station comprising centrally located extruder nozzle 3, disposed centrally of wafer dispensing means 5. Wafer dispensing means 5 in turn comprises slanted wafer trays, disposed for communication with the output end or orifice of extruder nozzle 3. In addition, wafer hold-down bars are mounted above wafer trays, and in spaced relation thereto corresponding to the height of the wafers being dispensed for assembly of the sandwich product. Wafer hold-down bars and wafer trays, as well as the extruder nozzle, can all bolted to support wall 1, and in accordance with the present invention, are removable and replaceable with analogous components of different size.

A wafer pusher 7 may be disposed with its parallel blades straddling an extruder nozzle 3. Wafer pusher 7 reciprocates in the vertical plane to urge wafers down into engagement with the extruded comestible to form the sandwich product. Wafer pusher 7 is likewise replaceable to accommodate differences in the size of the sandwich products being made.

The sandwich products thus formed may be vertically dropped and thereby delivered to the conveying means, comprising an indexing wheel 9. The indexing wheel 9, likewise removable in accordance with the present invention, comprises paired spaced apart circular disks, having pockets or notches regularly disposed about the circumference thereof, each pocket or notch sized and configured to receive a fully formed sandwich product. The indexing wheel 9, shown in FIG. 2A-B is configured to rotate, in this instance, in a counterclockwise fashion as depicted in FIG. 1, to deliver the formed sandwich products from the output of the extruder nozzle 3, to the horizontal conveyor 11. Horizontal conveyor 11 in turn is constructed so as to cooperate with indexing wheel 9 by means of fingers that are timed and positioned to engage the ice cream sandwiches as they are brought into the essentially horizontal position, and to remove them from the pockets of indexing wheel 9 and to urge them forward therealong. Alternatively, the sandwich products can be transported using a plurality of actuators as illustrated in FIG. 27. An indexing wheel ejector can be coupled to a linear actuator, wherein upon the actuator being activated the indexing wheel ejector portion can be configured to push the sandwich out of the indexing wheel and carry the sandwich to the next station of the apparatus. The indexing wheel ejector portion can be wider than the width of the indexing wheel to allow for the indexing wheel to rotate within the opening of the indexing wheel ejector portion.

Referring now to FIG. 2A-B, a conveyor 11 can be seen to define a central opened space within which indexing wheel 9 may rotatably pass. Indexing wheel 9 rotates about horizontal axis as shown, and may be aligned thereon by lock and key engagement with an axial rib located on axle mating with a corresponding slot in indexing wheel 9.

Referring further to FIG. 2A-B, a conveyor 11 can be disposed in cantilevered fashion and is thereby suspended along horizontally disposed axes of rotation, such as an axle, as shown. The conveyor is adjustable in width to accommodate different size of ice cream sandwich products. More particularly, sprockets 17 that are outboard and distal to the support wall are configured to move translationally along corresponding axles.

Figure 1B:
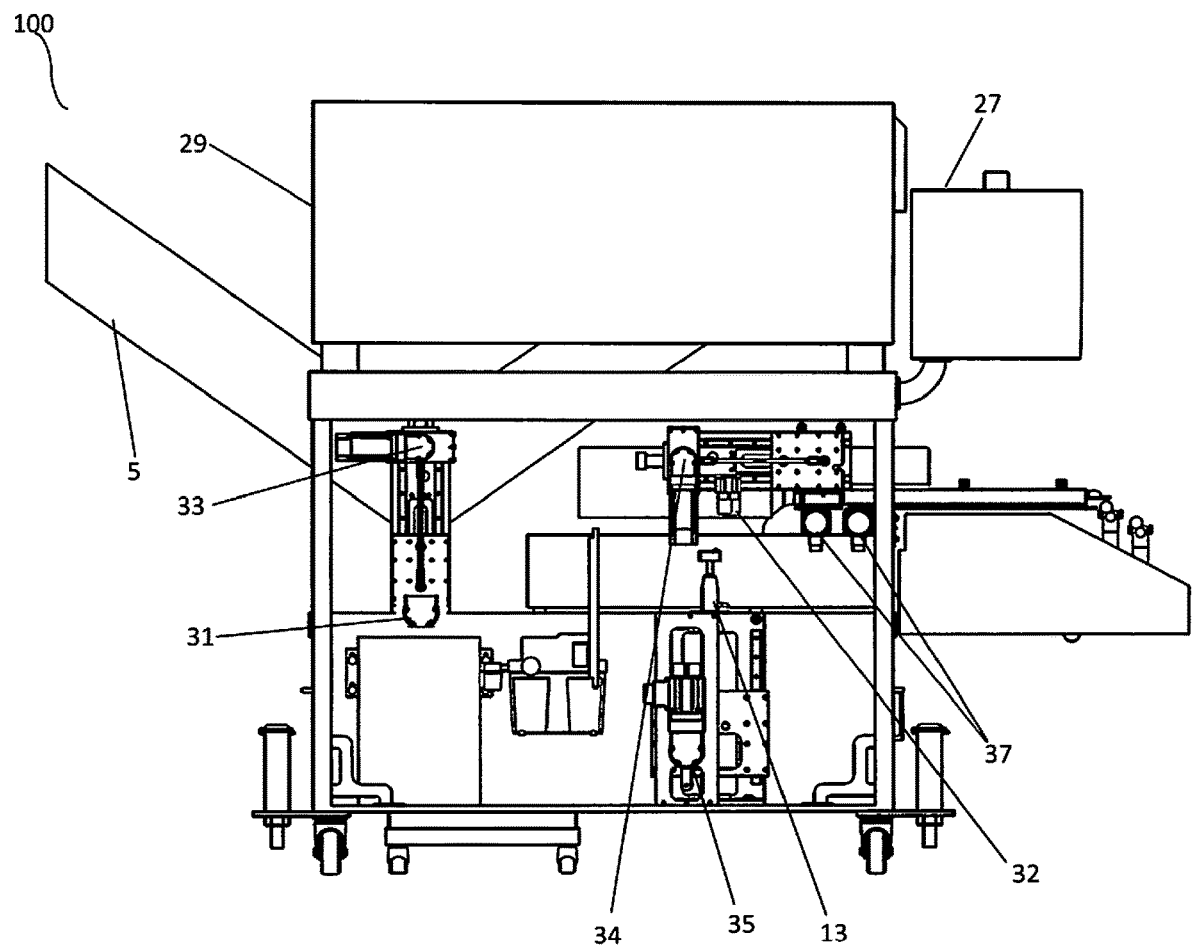
FIG. 1B is a rear plan view of the apparatus of the present invention, setting forth components and parts thereof.
Figure 2A:
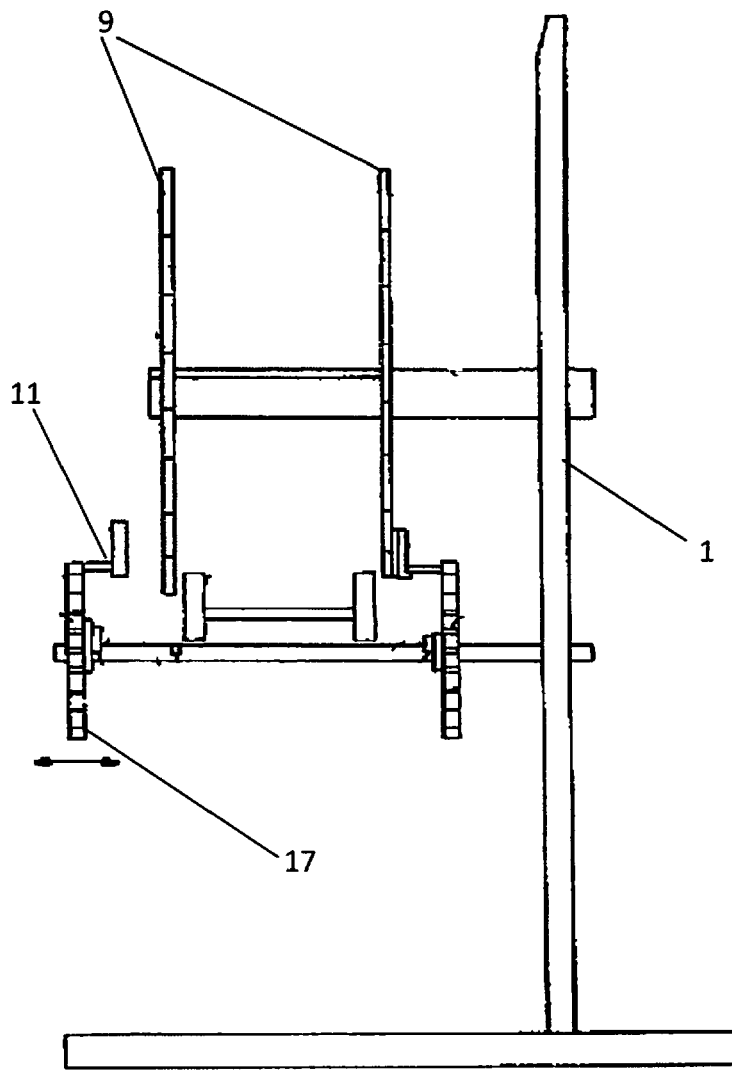
FIG. 2A is a side view of the apparatus of FIG. 1, depicting the cantilevered construction thereof and star wheel.
Figure 2B:
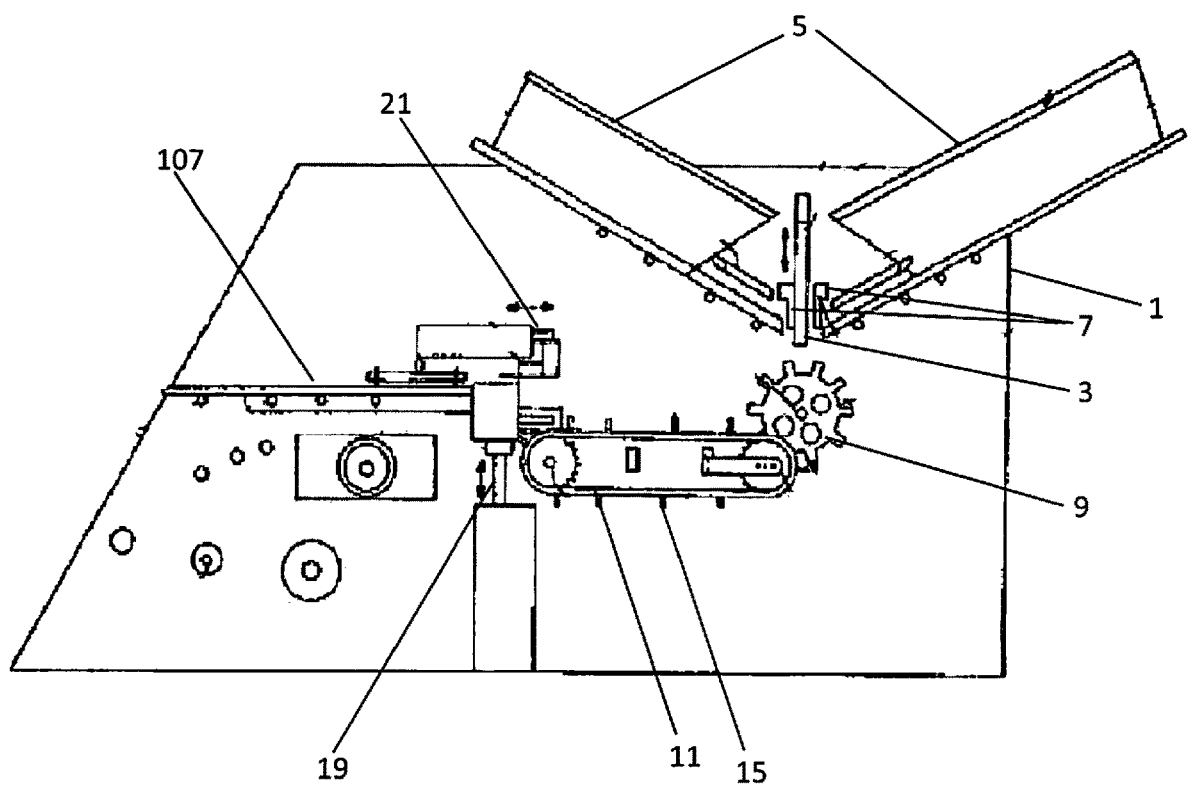
FIG. 2B is another exemplary view of the apparatus illustrating the star wheel and extruder.
Figure 3:
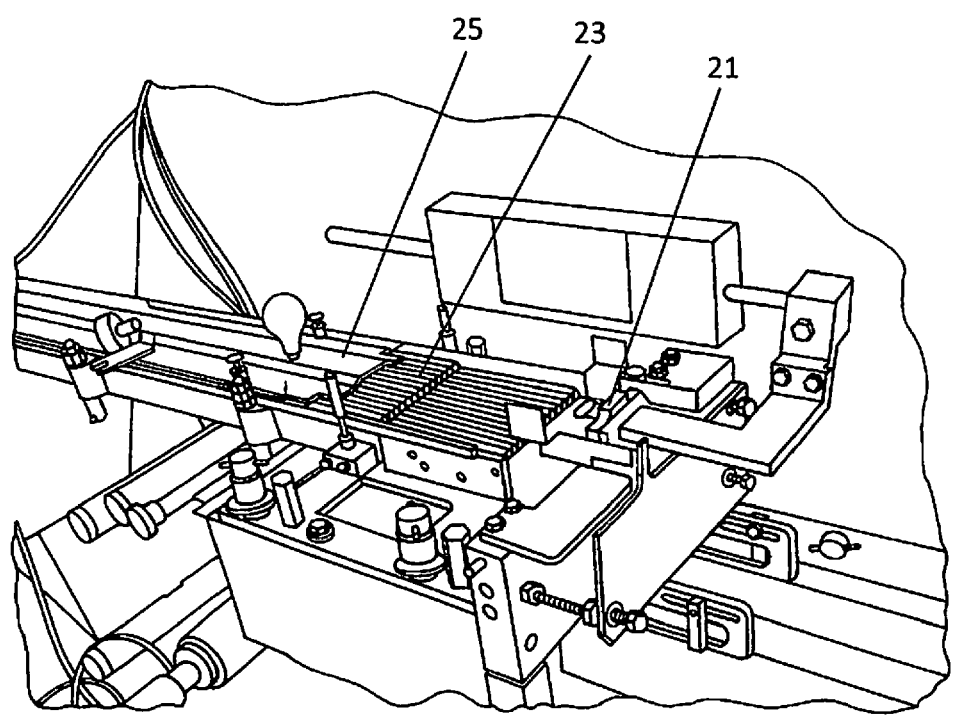
FIG. 3 is a left hand perspective view of an exemplary embodiment of the wrapping head section of the apparatus of the present invention showing the wrapping head, side tucker devices and pusher.

Referring generally to FIGS. 1A-B and 3, the apparatus includes a wrapping assembly, disposed at the output end of conveyor. The wrapping assembly includes a roller assembly 37 and wrapping head defining an elevator shaft 19, which terminates at its uppermost end in a platform which cooperates with elevator means, side tucking fingers and bottom tucking reciprocating pusher 21 to finally wrap and urge the finished sandwich product toward the output conveyor 107 and to the output end of the apparatus. The wrapping assembly can further be comprised of a press plate 25 and heat platen 23 to assist in wrapping the sandwich. Of these components, each is capable of removal and replacement with components of different size to accommodate corresponding differences in the ice cream products being wrapped. Wrapping paper spools 18 can be distal from the wrapping assembly and hold rolls of wrapping paper used to wrap the sandwich. Paper arbors/spool assemblies 18 can be coupled to the vertical wall sections or alternatively coupled directly to a support member of the frame. Coupling directly to the support members can help ensure the alignment of the spool assemblies 18 are proper and additionally increase the stiffness of the assembly.

A further aspect of the present invention is the simplification of the actuation thereof, by means of using servo motors and drive units in connection with a controller that coordinates and connects to the drive units and servo motors to operate the components of the apparatus and receive feedback from the individual components of the apparatus. Specifically, the rear of apparatus is shown in FIG. 1B and is seen to comprise a vertical wall, to which is mounted to a plurality of servo motors to drive the individual stations and components of the apparatus. The drive units and controller are also shown being networked between each other. The human machine interface HMI and PLC can each have their separate housings, the HMI housing 27 and PLC housing 29. The servo motors can be connected to a drive unit or amplifier that can be controlled by a controller that provides overall control of the motion of each individual servo motor and the apparatus as a whole. The drive unit handles the power and speed control of the servo motor and can have brake control and temperature monitoring connections. The controller can also be connected to an HMI or graphical user interface to provide visual feedback and control to a use of the apparatus.

The controller can be a PLC or dedicated motion controller that provides commands to the drive units and which monitors sensors and limits inputs to ensure the apparatus is operating correctly and does not exceed the predefined program limits. The combination of the servo motors, drive units, and the controller form an encoder feedback loop that provides continual motor output shaft speed and position data, which can allow the drive unit to compensate for changes in load conditions that may affect the shaft speed and monitor the exact position of the shaft. Likewise, in some instances multiple components can be driven by one servo motor, such as the actuation for the elevator and the wrapping head can be achieved by the driving of both components from the same shaft of a servo motor.

FIG. 1B is an illustration of one exemplary embodiment showing various servo dives such as the indexing wheel servo assembly 31, the tucker drive servo assembly 32, the wafer pusher servo assembly 33, the bottom folding arm servo assembly 34, the elevator drive servo assembly 35, the wrapping roller drive servo assembly 37, the wrapping servo assembly 39, the conveyor servo assembly 41, and the wrapper paper dispensing servo assembly (not shown). The servo motors and assemblies are further illustrated in FIGS. 6-17 and discussed below.

Figure 18D:
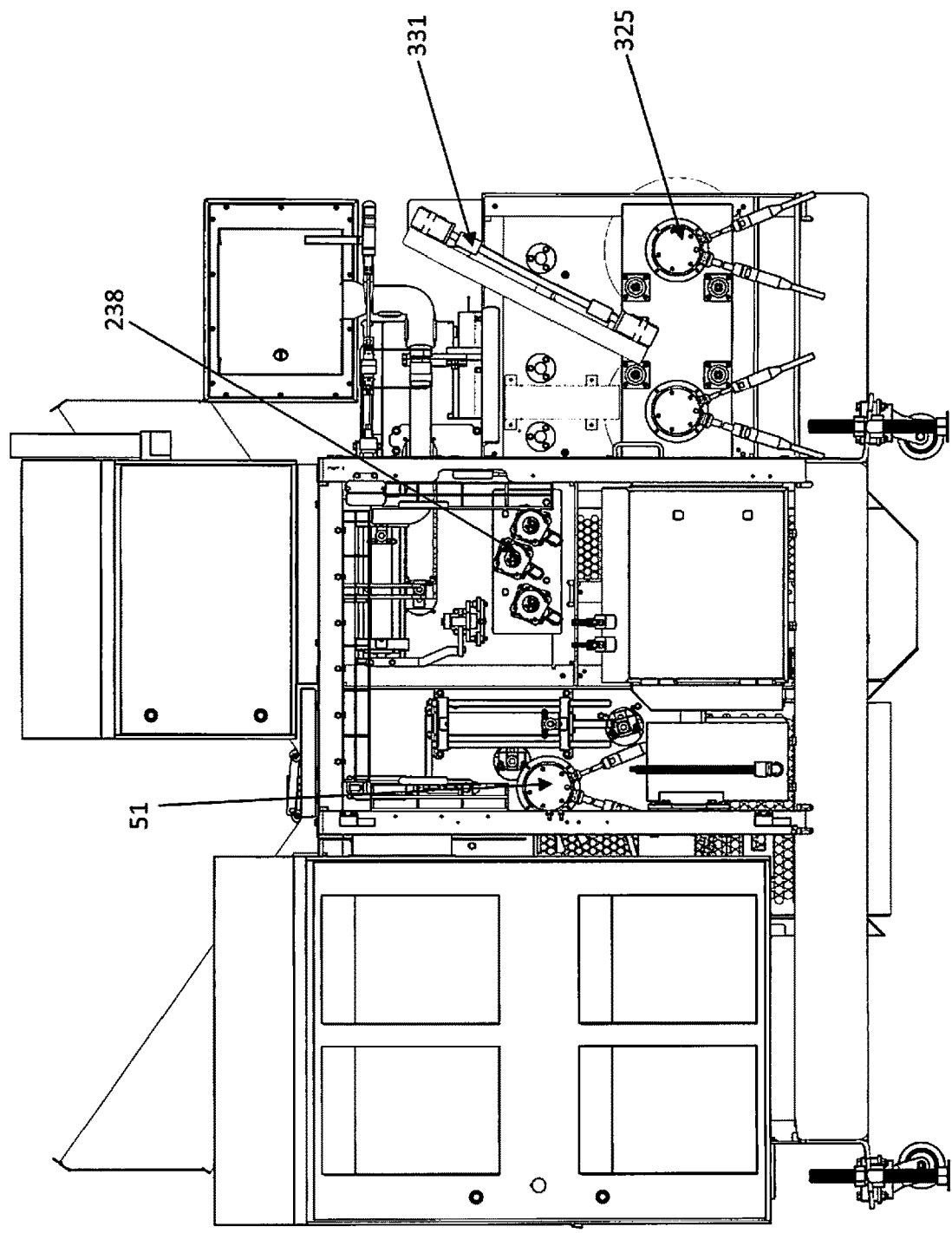
FIG. 18D is a rear perspective view of the apparatus show in FIG. 18C.

FIG. 18B-D is an illustration of another exemplary embodiment showing various servo drives and actuators to reduce the overall parts necessary and improve efficiency and flexibility of the apparatus of the present invention. The apparatus can include an indexing wheel servo assembly, a tucker drive assembly, a wafer pusher servo assembly, the bottom folding arm servo assembly, the indexing wheel ejector assembly, and the wrapper paper dispensing servo assembly. Some of the various assemblies can include linear actuators. The actuators can be powered by any suitable means, such as hydraulic, electromagnetic, servo, among others. In one exemplary embodiment, the actuators are electromagnetic linear motor actuators.

Figure 4A:
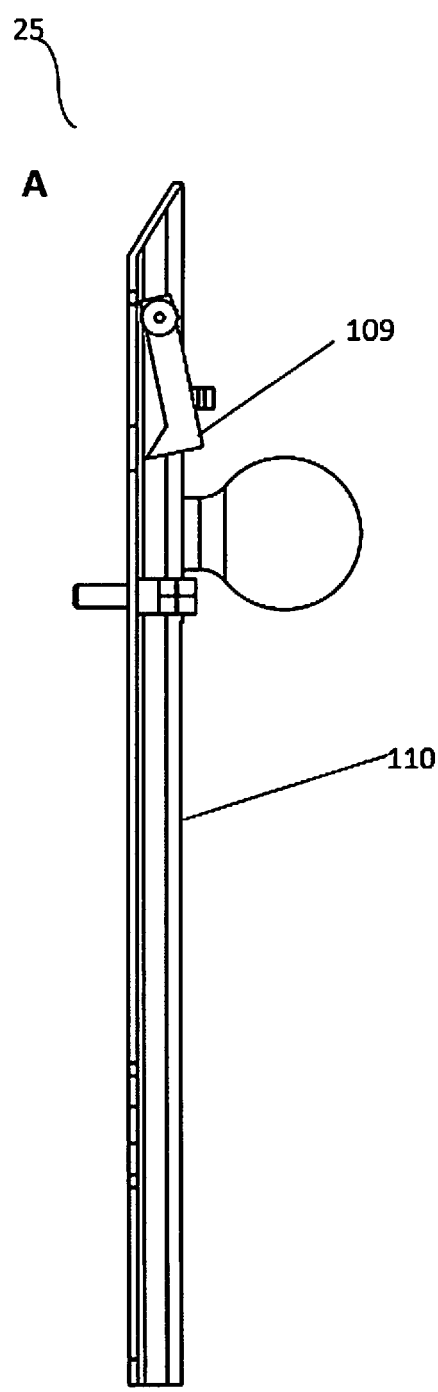
FIG. 4A is a side view of an exemplary embodiment of a component wrapping assembly showing the press plate assembly.
Figure 4B:
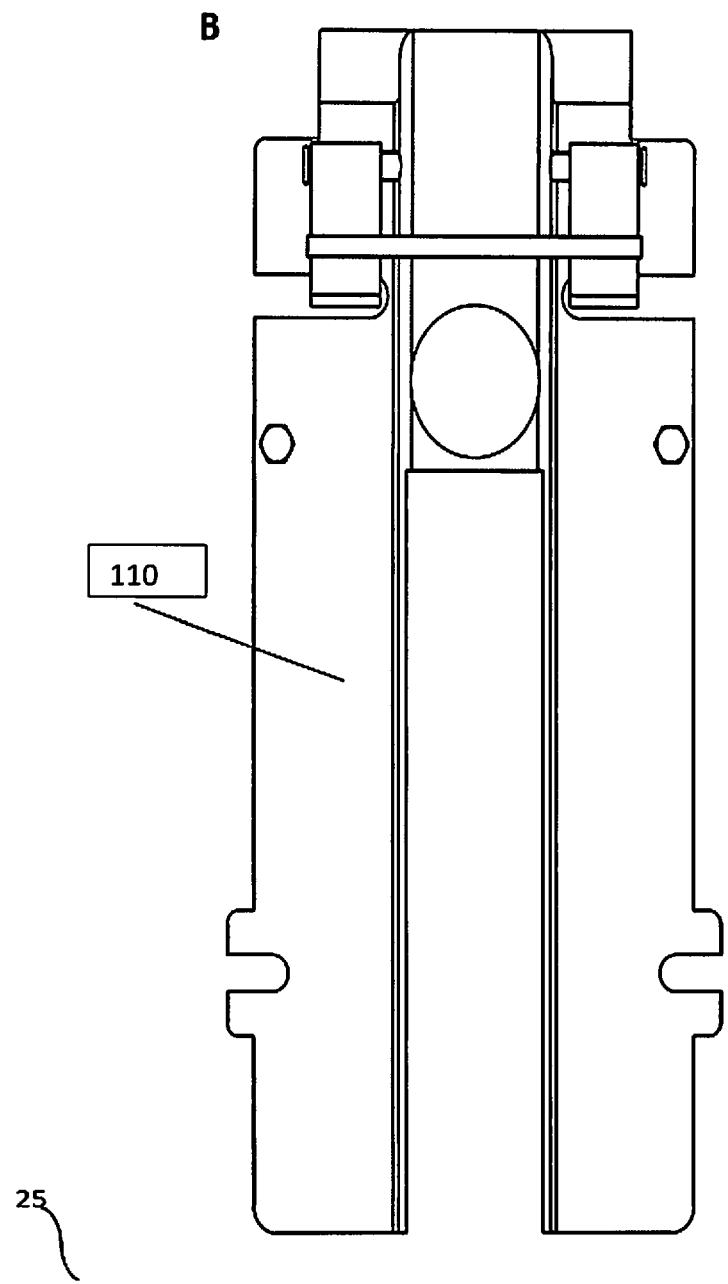
FIG. 4B is a top view of an exemplary embodiment of a component wrapping assembly showing the press plate assembly.

Referring further to FIG. 4A-B, a press plate assembly 25 can be used to engage the sandwich product while the pusher arm of the bottom folding arm assembly is withdrawing from the sandwich after pushing the sandwich of the wrapping station. The completely wrapped sandwich can then be transported using any suitable means such as a conveyor or angled chute. The press plate assembly 25 can include a top plate 110 and at least one pawl 109 or tang that engages the sandwich product to resist movement of the sandwich product in a direction opposite of the infeed direction while the pusher withdrawals. The top plate 110 that can go over the top and cover at least a portion of sandwiches as they are ejected from the wrapper head. Small delrin pawls 109 can raise up when the sandwich is pushed forward and underneath the top plate 110 by the bottom fold pusher. When the sandwich is pushed past the delrin pawls 109, they drop down behind the sandwich. The bottom fold pusher then retracts and the delrin pawls 109 stop the sandwich from retracting along with the bottom fold pusher. This improvement allows for the use of different types of wraps for the sandwiches, i.e. Poly wraps.

Similarly, in an alternative embodiment, a friction member can be used to actively engage the ice cream sandwich while the pusher withdraws after pushing the ice cream sandwich onto the conveyor surface. The friction member may take other additional forms. In another embodiment of the present invention, a friction member can extend into the frictional path from the inner surface of one of the conveyor walls. In yet another embodiment of the present invention, a conveyor wall has an aperture, and a friction member is configured to extend through the aperture and into the frictional path of the sandwich product.

Referring further to FIG. 1A, after the folding of the wrapping material is completed, the sandwich can travel forward to the output conveyor 107. The output conveyer can comprise a slide or tray, on its way to the discharge end of the apparatus. The optional tray is adjustable in width like the conveyor, and the outboard end thereof may be reciprocated in relation to the wall to affect such adjustment. The output conveyer is further illustrated in FIG. 14.

Regardless of the embodiment of the friction member, the friction member may include a rubber member that is configured to engage the ice cream sandwich when the ice cream sandwich is in the conveyor position. Likewise, the friction member may include a toothed member that is configured to engage the ice cream sandwich when the ice cream sandwich is in the conveyor position. In another exemplary embodiment, the friction member may take the form of a plate that is mechanically driven by a servo motor to operate in connection with the pusher to apply enough pressure to the top of the sandwich to prevent it from moving after the pusher moves back in the opposite direction. The friction member can also be incorporated into the heat platen assembly, wherein the heat platen assembly comprises a heated platen that heat seals the wrapper while also securing the sandwich.

As indicated earlier, the sandwich making apparatus of the present invention is fully adjustable to accommodate differences in the size of sandwich products being prepared. As indicated above, in some exemplary embodiments certain of the components are capable of direct removal and replacement, such as, e.g., the wafer trays, pusher means, wafer hold-down bars, extruder nozzle and indexing wheel of the sandwich product assembly station, the conveyor rails of the conveyor means and the sandwich wrapping head and, in particular, the elevator, the sandwich wrapping platform, the side tucking fingers, the pusher means and the cut-off gears associated with the wrapping paper feed and cutting assembly. Certain other components of the apparatus are otherwise adjustable to accommodate differences in sandwich size, such as, e.g., the conveyor means and, in particular, the first chain type in the conveyor.

Particularly, the chain type conveyor as discussed above is capable of adjustment by the movement of the chain sprockets along their axes of rotation. Specifically and with reference to FIG. 2a, the sprocket 17 that is outboard and distal to supporting wall 1 may be moved and thereby adjusted inward in the direction of the supporting wall to reduce the lateral distance and thereby the width of the conveyor. The adjustment means for the sprocket may comprise moveable dogs that are screw adjusted. In another exemplary embodiment, a servo motor can be used to provide a simple adjustment which causes corresponding dogs 11, shown in FIG. 2, to move either away from or into engagement with a corresponding slot. An axle can define a plurality of slots for the reception of dogs 11, to accommodate a corresponding number of predetermined widths for the chain conveyor assembly.

In another exemplary embodiment the conveyor can be driven or powered by a servo motor wherein the drive shaft of the motor is coupled to a roller. This can eliminate the need for a chain and chain ring to drive the top rollers of the conveyor. A belt can be used in connection with at least two rollers located distally from each other. The rollers can be adjusted to apply tension on the belt that creates enough friction between the belt and the roller such that upon actuating the servo drive for the roller, the belt is driven smoothly with little to no slipping.

Figure 28:
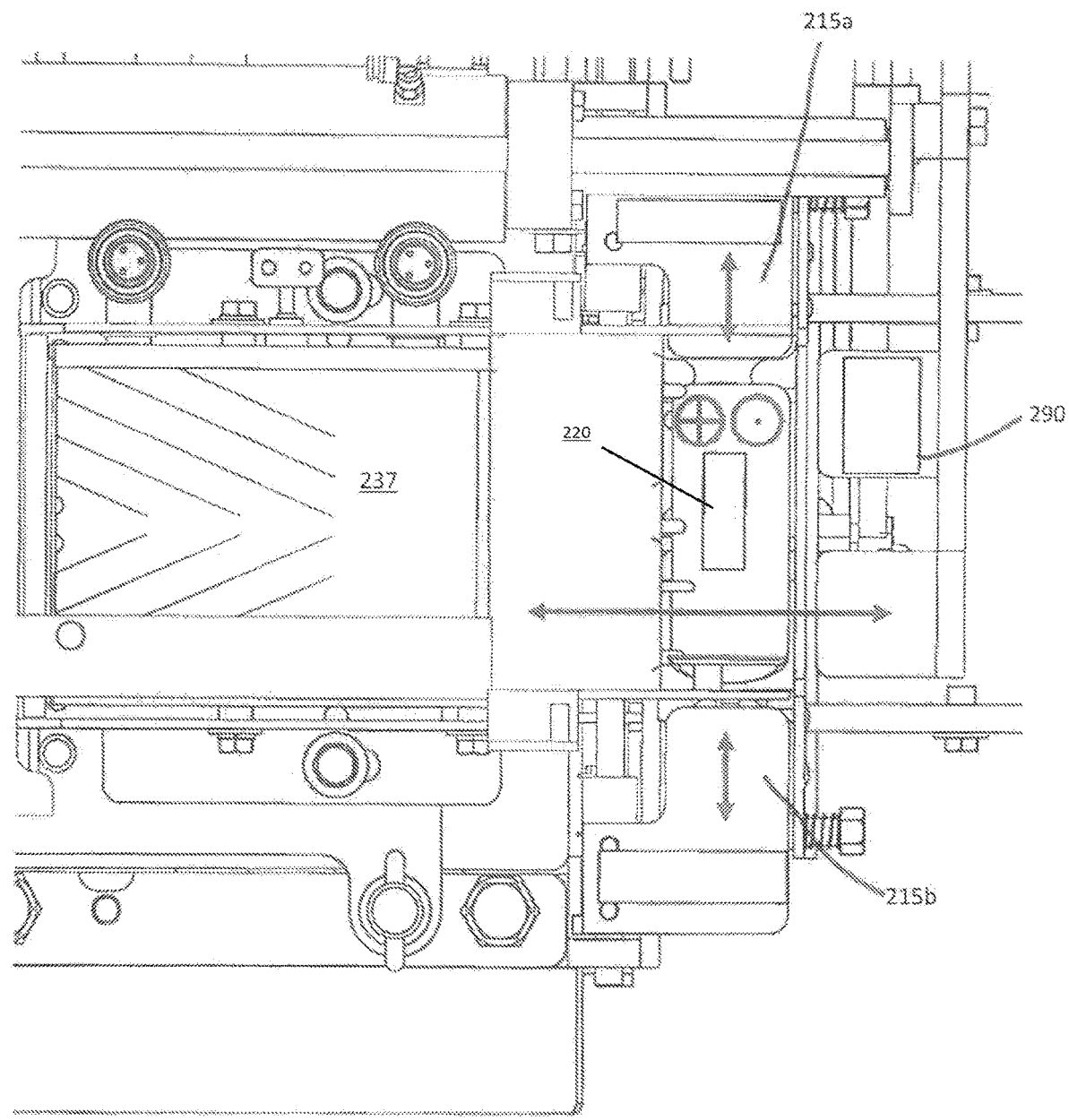
FIG. 28 is an illustration of a top view of the wrapping station of an exemplary embodiment of the present invention.

In other embodiments, some of the aforementioned components are not needed and are replaced. For example, some previous embodiments using a conveyor means to transport the ice cream sandwich, whereas FIG. 28 illustrates an embodiment using one or more actuators in place of the conveyor means for moving the ice cream sandwich from the indexing wheel and to the wrapper platform. Similarly, any cut-off gears associated with the wrapping paper feed assembly or the roller assembly may be replaced with an independent servo motor for providing greater control and modularity of the systems.

Figure 5A:
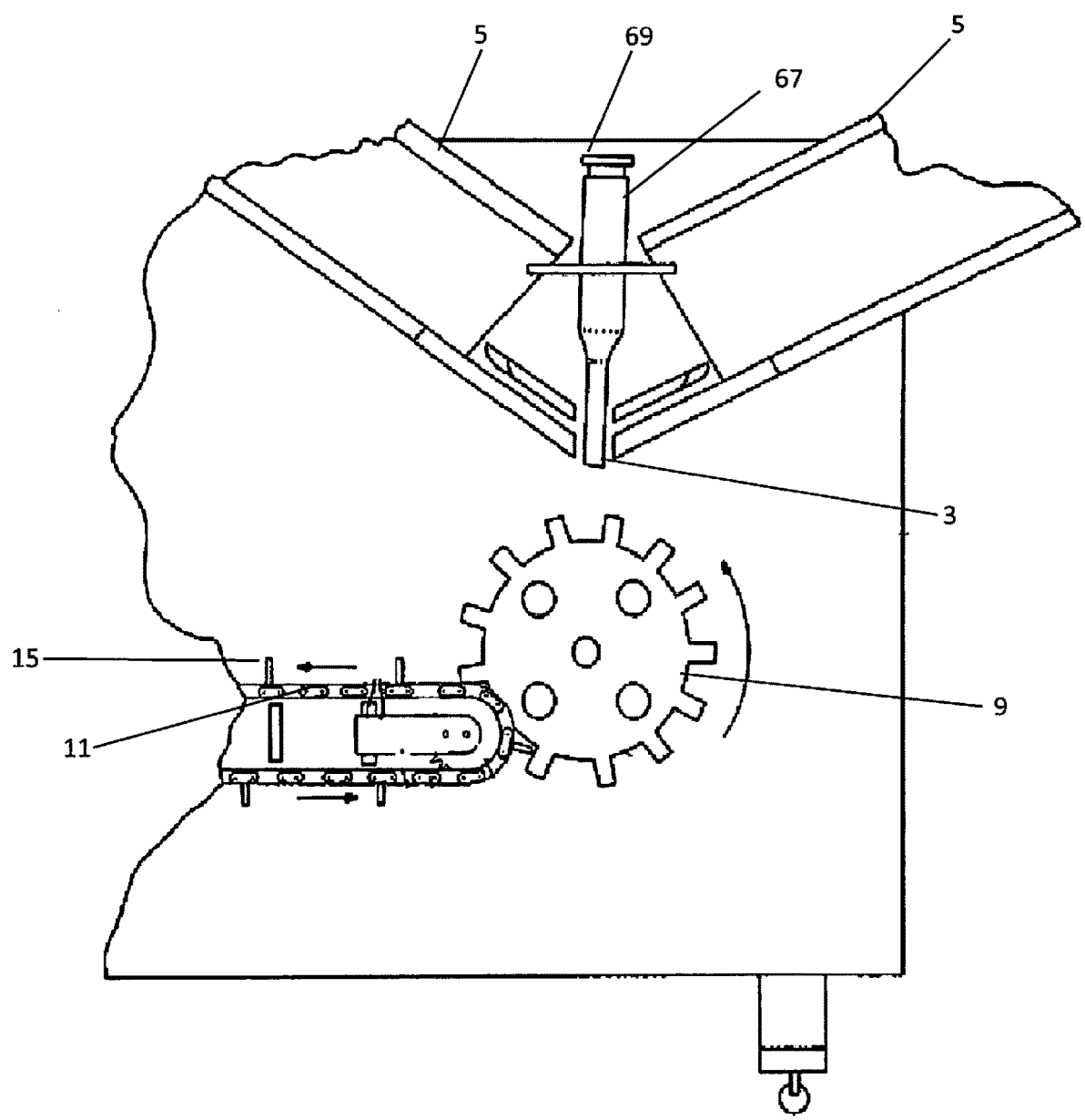
FIG. 5A is a front partial plan view of the apparatus of the present invention, illustrating the co-action of the indexing wheel and the conveyor, including the sprocket and chain.
Figure 5B:
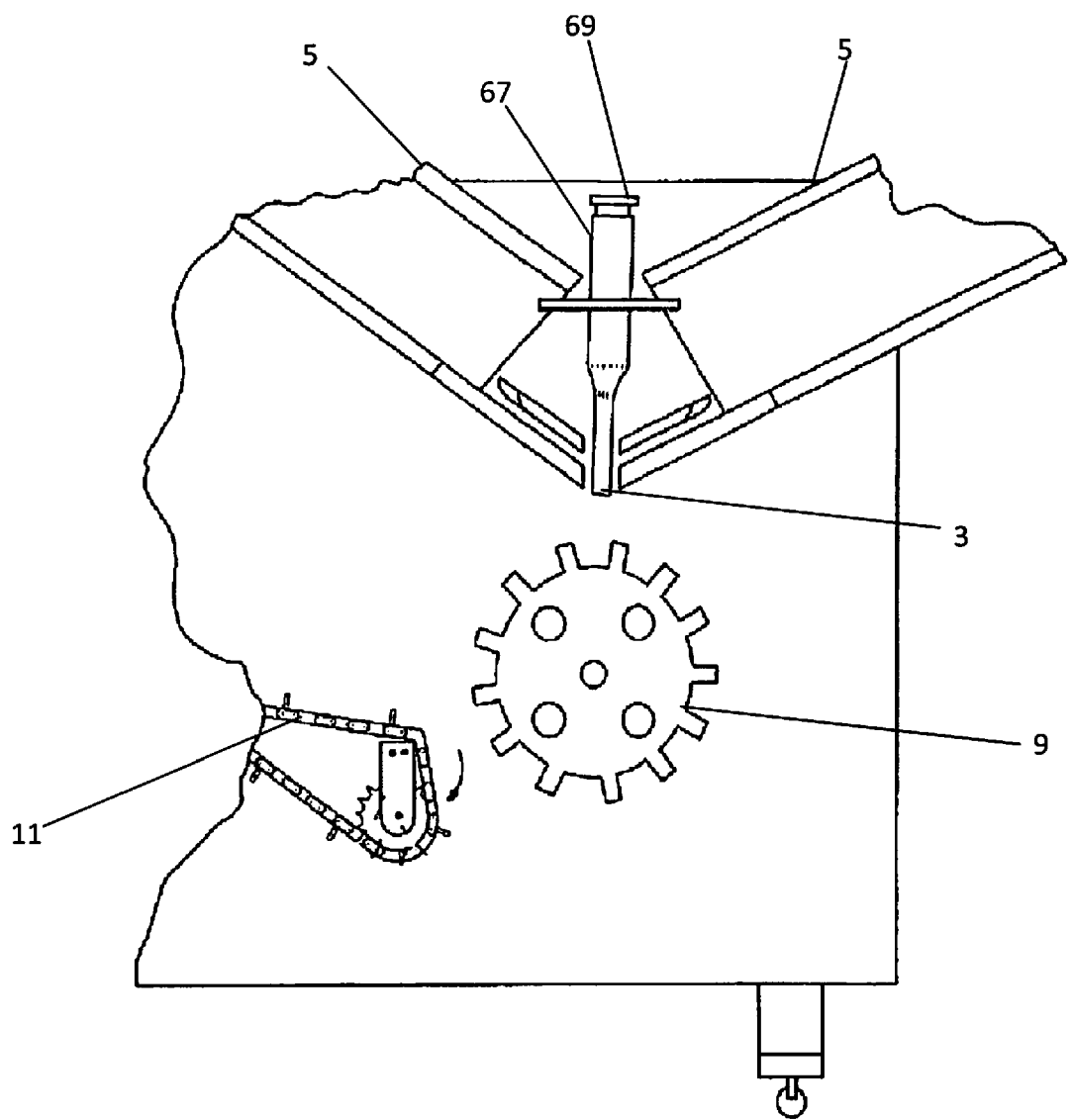
FIG. 5B is a partial fragmentary front view similar to FIG. 5A, illustrating the conveyor rotated downwardly and out of the way of the indexing wheel for removal of the latter.

Referring now to FIG. 5A, the conveyor can also provide a means for the pivoting movement of the end thereof positioned adjacent indexing wheel. Specifically, the infeed end of the chain is maintained on a support structure, which in turn is held secure to the remainder of conveyor by bolts or similar means of affixing. The support structure is capable of pivoting from the horizontal position in engagement with indexing wheel downward as illustrated in FIG. 5B, thereby out of the way of the indexing wheel during retrofitting of the apparatus to accommodate the manufacture of differently sized sandwich products. This pivoting function can be powered by an additional servo motor and assembly.

The output track that is disposed at the output end of the wrapping head or assembly is likewise laterally adjustable, and, like the conveyor, such adjustment is affected from the movement of the outboard edge of the conveyor. Referring again to FIG. 1A, the output conveyor 107 can define an outboard rail that may be adjusted by lateral movement inward along support rods. Thumb screw-type adjustments, not shown, are utilized, although it is to be understood that any suitable corresponding adjustable engagement means can be used as an alternative.

The apparatus of the present invention offers as part of its advantages ease of maintenance, by virtue of the reliance on a single vertical support wall for the mounting and maintenance of all operating components thereof. Unlike the equipment known in the art, the present apparatus does not require dual support from the lateral edges of the conveyor means, or from a second wall or like structure offering support to each of the rotating or translating components thereof. At most, the apparatus in use has an outer cover or structure about certain of the components thereof, such as the conveyor means, the wrapping head and wrapping assembly and the like, all of which may be easily removed for inspection and cleaning.

In operation, the comestible product is extruded and brought into contact with the corresponding wafers, is then delivered to the indexing means for delivery in turn to the first conveyor. The sandwich product thus disposed is delivered to the output end for the first conveyor for placement on the elevator of the wrapping assembly, where a quantity of wrapping material is disposed thereover and tucked and folded thereabout. Upon exiting the wrapping assembly, the sandwich is urged forward along the conveyor tracks for output to a packaging station.

Figure 26A:
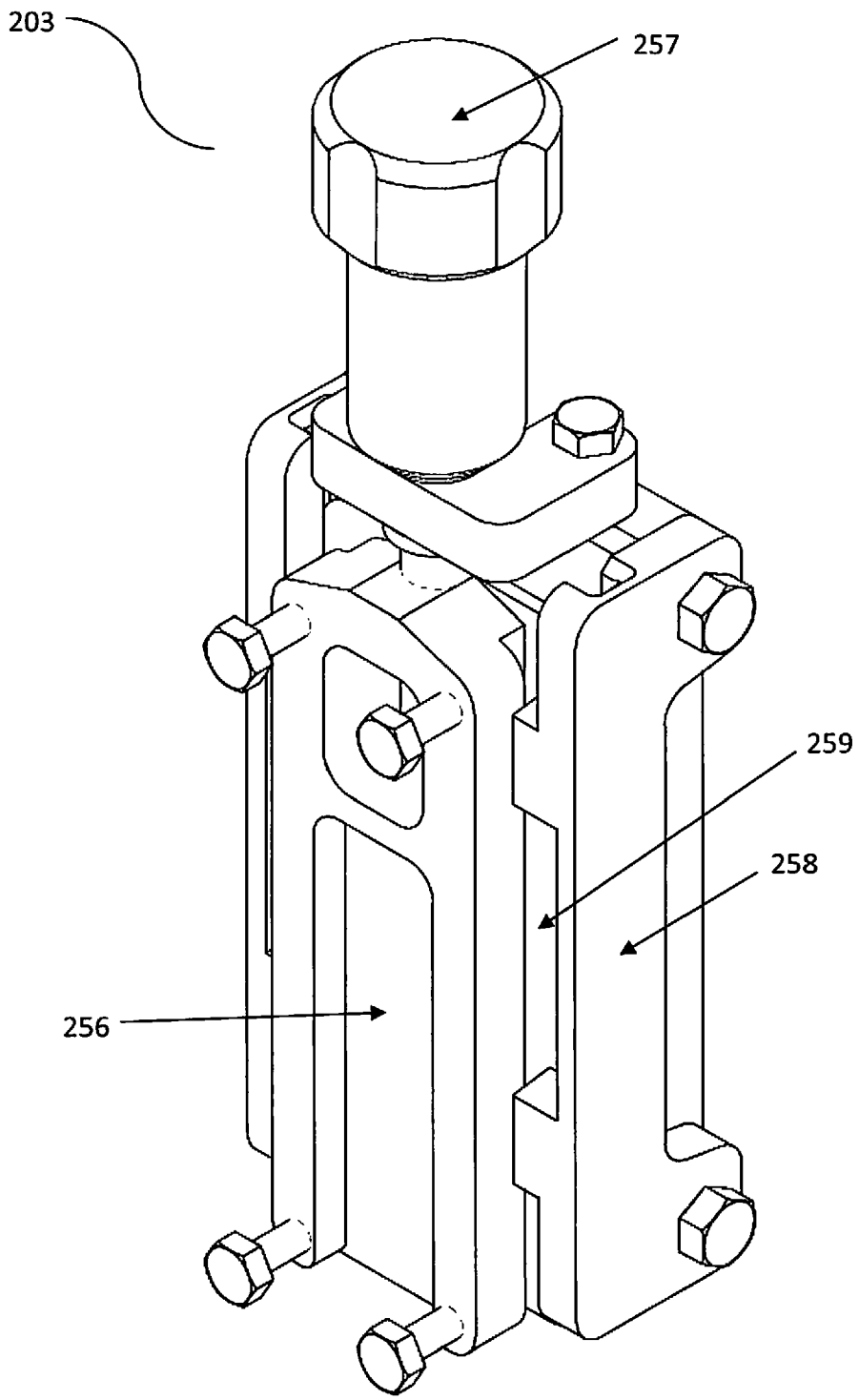
FIG. 26A is perspective view of an exemplary embodiment of an extruder assembly of the present invention.
Figure 26B:
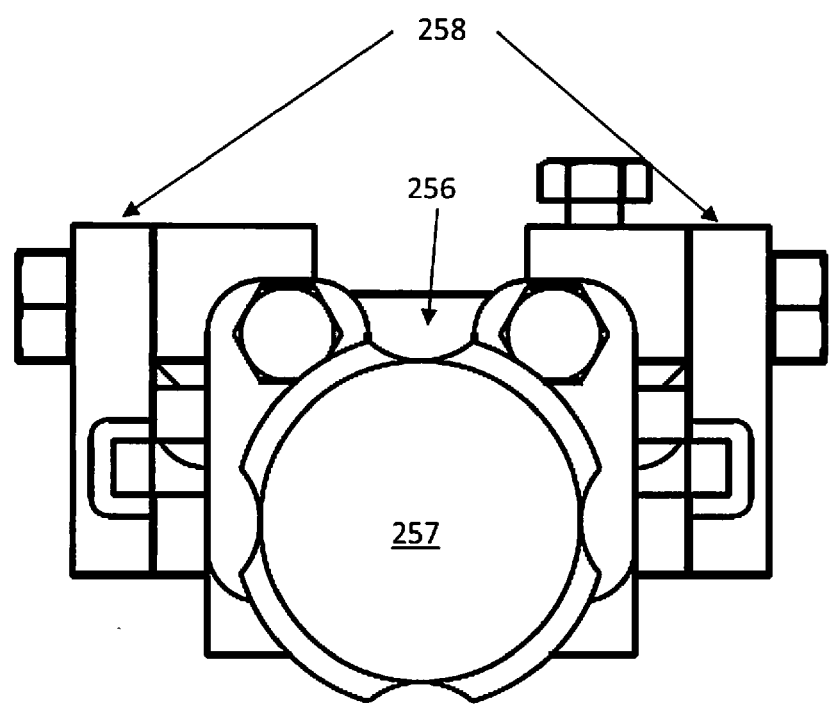
FIG. 26B is a top view of an exemplary embodiment of an extruder assembly of the present invention.

In one preferred embodiment, the apparatus for making comestible-containing sandwich products can have a base with infeed end and a discharge end. The apparatus can have a sandwich product assembly station with an extruder nozzle mounted for discharge of a comestible filling material in the vertically downward direction. A pair of wafer trays for feeding wafers against opposite sides of the extruder nozzle is located with one tray on each side of the extruder nozzle. A vertically reciprocal wafer pusher driven by a first servo motor has a wafer pusher blade acting in combination with the wafer trays and extruder nozzle to urge wafers downward into contact with the comestible filling material. In one exemplary embodiment illustrated in FIGS. 26A-B, an extruder assembly component can be machined and bolted/fastened together to reduce any potential distortion of the components. Similarly, the extruder can include spaced to more easily sanitize and clean unlike traditionally welded components. The extruder can have a body portion 256 that can be sloped in configuration as well as include cutouts to drain liquid from the extruder. The extruder assembly can also include one or more side guides 258. The side guides 258 can have one or more apertures 259 to allow a user to easily wash out the extruder assembly. As shown in FIG. 26B, the guides can be bolted together along with the body to maintain alignment. In some exemplary embodiments, the guides 258 can also be composed of a different material, such as Nitonic 60 stainless steel to prevent galling of the metal to metal contact.

In another aspect, the apparatus for making comestible-containing sandwich products can have a sandwich indexing member comprising an indexing wheel rotatably mounted and vertically below the sandwich product assembly station. The indexing wheel can have a plurality of circumferentially positioned pockets for receiving and transferring assembled sandwiches for conveyance toward the discharge end of the apparatus. The sandwich indexing member can be driven by a second servo motor.

A conveyor assembly can have an input end that extends from the indexing member and an output end proximal to the discharge end of the apparatus. The conveyor assembly can be driven by a third servo motor and comprise a movable conveyor for receiving the sandwiches from the indexing wheel and urging the sandwiches toward the discharge end. The conveyor can include a plurality of lugs of dogs projecting from the conveyor that are configured to cooperate with said indexing wheel to engage and urge said sandwiches out of the pockets, and the conveyor's track can be medially disposed in the conveyor.

A wrapping assembly is located at the output end of the movable conveyor. The wrapping assembly comprising a wrapping head having an upper platform. Additionally, the wrapping assembly has a shaft for the upward travel of a sandwich product to the platform that is uses an elevator member driven by a fourth servo motor for delivery of said sandwich product to the platform. A side tucking member is reciprocably mounted adjacent to the shaft wherein the side tucking member is driven by a fifth servo motor. Finally, a pusher bar, driven by a sixth servo motor can be reciprocably mounted adjacent to the platform that can urge the wrapped product off the elevator and toward the discharge end.

Additionally, an exit tray can be located at the discharge end and can include one or more heated platens. The heated platens can act to heat seal the bottom overlaps of the cut sheet of wrapping paper to each other, providing a secure wrap. A wrapping feeder means is included and can comprise a wrap roller driven by a seventh servo motor to feed a wrap to said wrapping assembly. The wrapping feeder can work in conjunction with a second roller that can be driven by an eighth servo motor.

Figure 6:
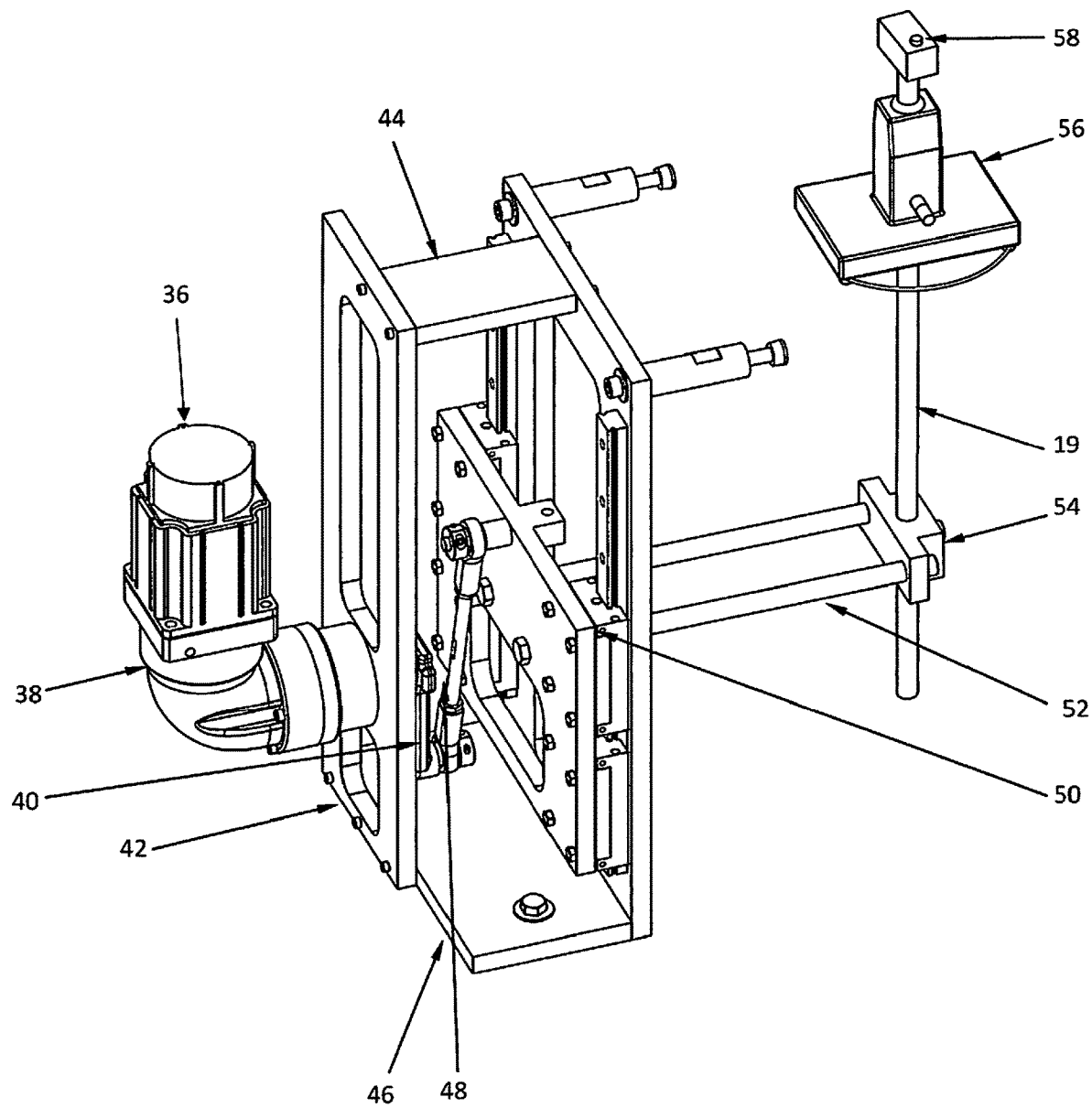
FIG. 6 is a perspective view of the servo motor drive for the elevator.

Referring now to more specific elements of the various assemblies that make up the apparatus, FIG. 6 illustrates an exemplary embodiment of the elevator drive servo assembly 35, having an elevator servo motor 36 coupled to a right angle gearbox 38. The right-angle gearbox 38 can be coupled to the motor crank arm 40. The right-angle gearbox 38 can be mounted on the elevator upright 42, which can be coupled to a top support 44 and base 46. The motor crank arm 40 can be coupled to the drive shaft 48, which can further be coupled to the carriage plate 50 that couples to the elevator shaft 19 via at least one tie shaft 52. A guide shaft mount 54 can be used to couple the tie shaft 52 to the elevator shaft 19. The elevator shaft housing 56 and the elevator platform 58 are located on the top end of the elevator shaft 19.

Figure 7:
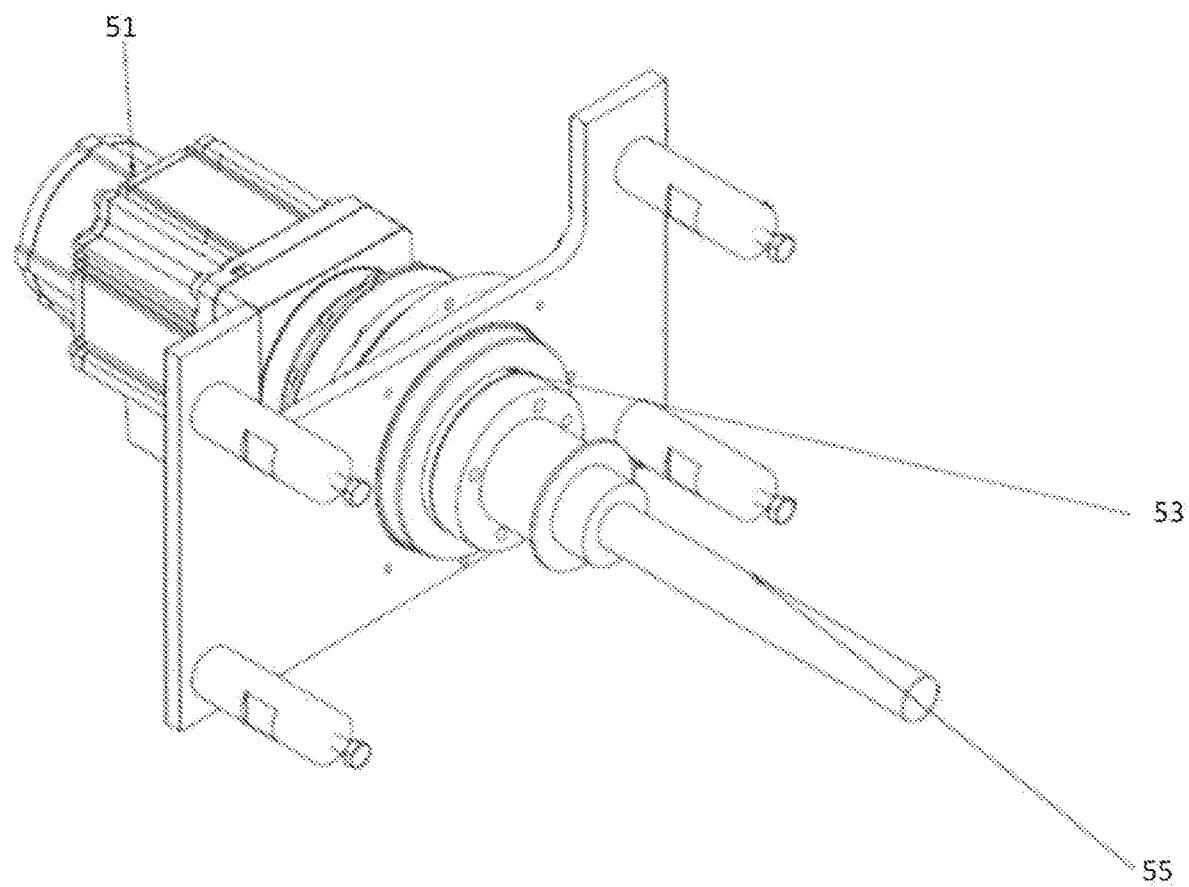
FIG. 7 is a perspective view of the servo motor drive for the indexing wheel assembly.
Figure 22:
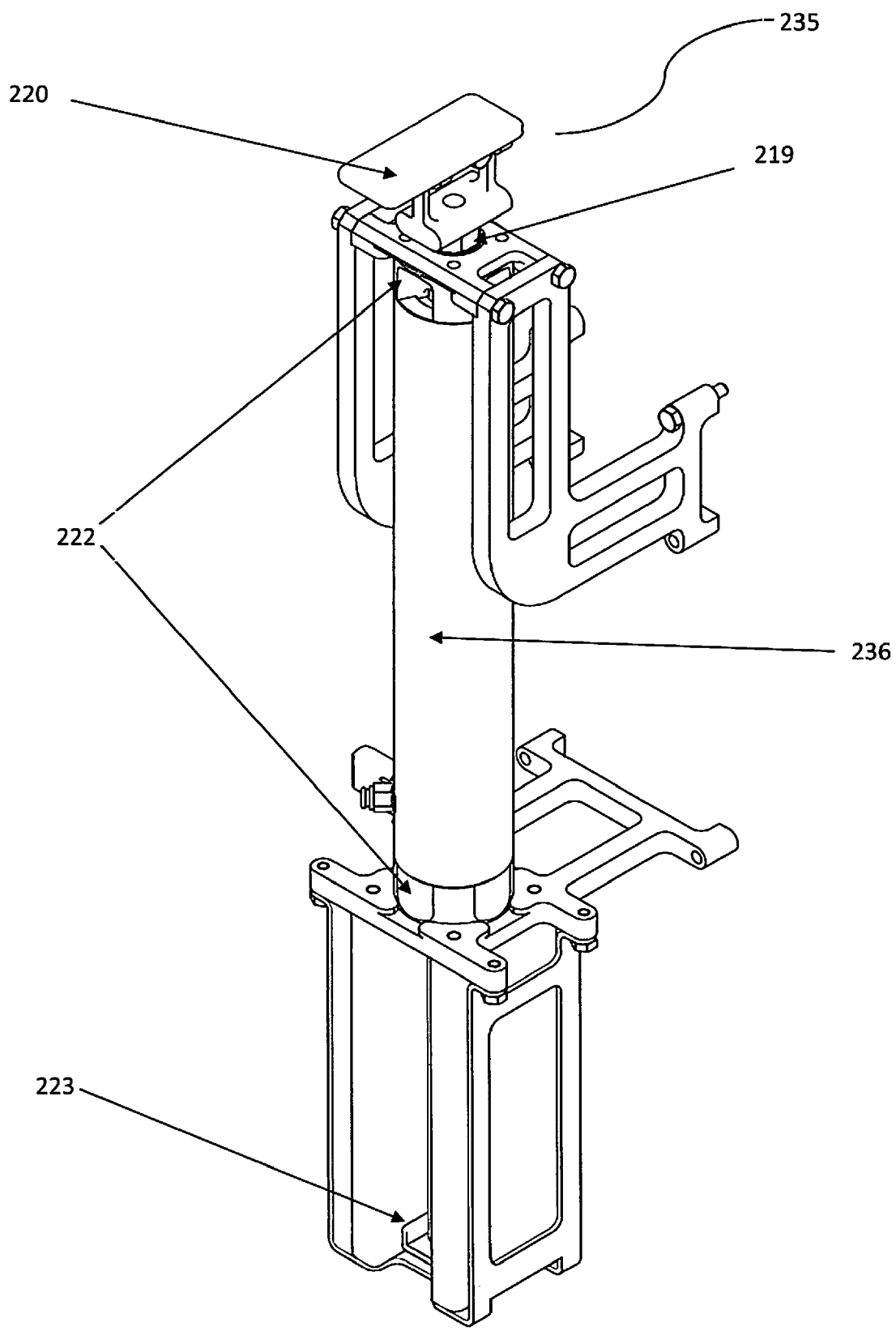
FIG. 22 is a perspective view of an exemplary embodiment of an elevator actuator of the present invention.

One exemplary embodiment as illustrated in FIG. 22, can use a linear actuator coupled to a servo to operate as the elevator of the assembly. The use of the actuator reduces the number of components needed to drive the elevator assembly. The elevator actuator assembly can include a stator shaft that is guided through the linear motor through two end bearings. The stator shaft can also function as the elevator shaft. A guide block mounted to the bottom of the motor can maintain the shafts position and prevent rotation to maintain alignment of the elevator pad. The elevator pad travels vertically, intercepting the sandwich from the inclined elevator axis and then carries it up through the wrapping throat/head. The inclined elevator can be angled at a pre-determined angle. In some exemplary embodiments, the inclined elevator can be at an angle between about 1 degree and 89 degrees, between about 5 degrees and 60 degrees, and about 15 and 45 degrees As illustrated in FIG. 7, the indexing wheel can be driven by the indexing wheel servo assembly 31. The indexing wheel servo assembly 31 can be powered by a servo motor 51 and drive a gearbox 53. The gearbox 53 is coupled to the indexing wheel shaft 55 to drive the indexing wheel. The PLC is communicatively coupled to the indexing wheel assembly servo 31 to control the speed of the indexing wheel in coordination with the other components of the apparatus. Similar to other servo motors of the apparatus can include power and/or signal cables extending form the motor assembly.

Figure 8A:
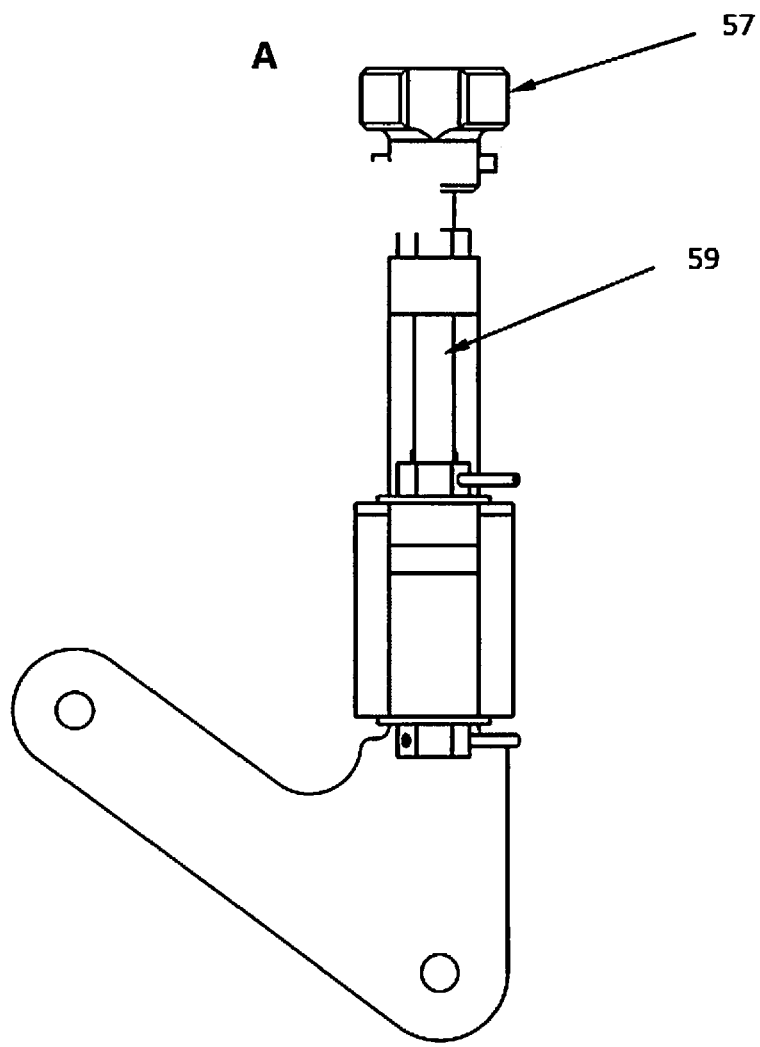
FIG. 8A is a front perspective view of the wafer break assembly.
Figure 8B:
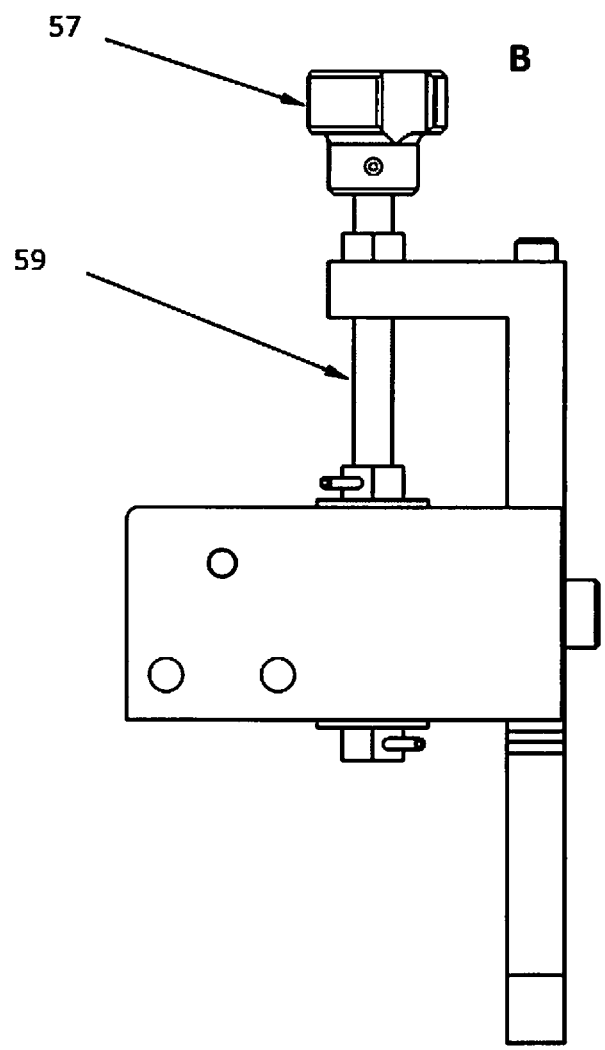
FIG. 8B is a side perspective view of the wafer break assembly.
Figure 9:
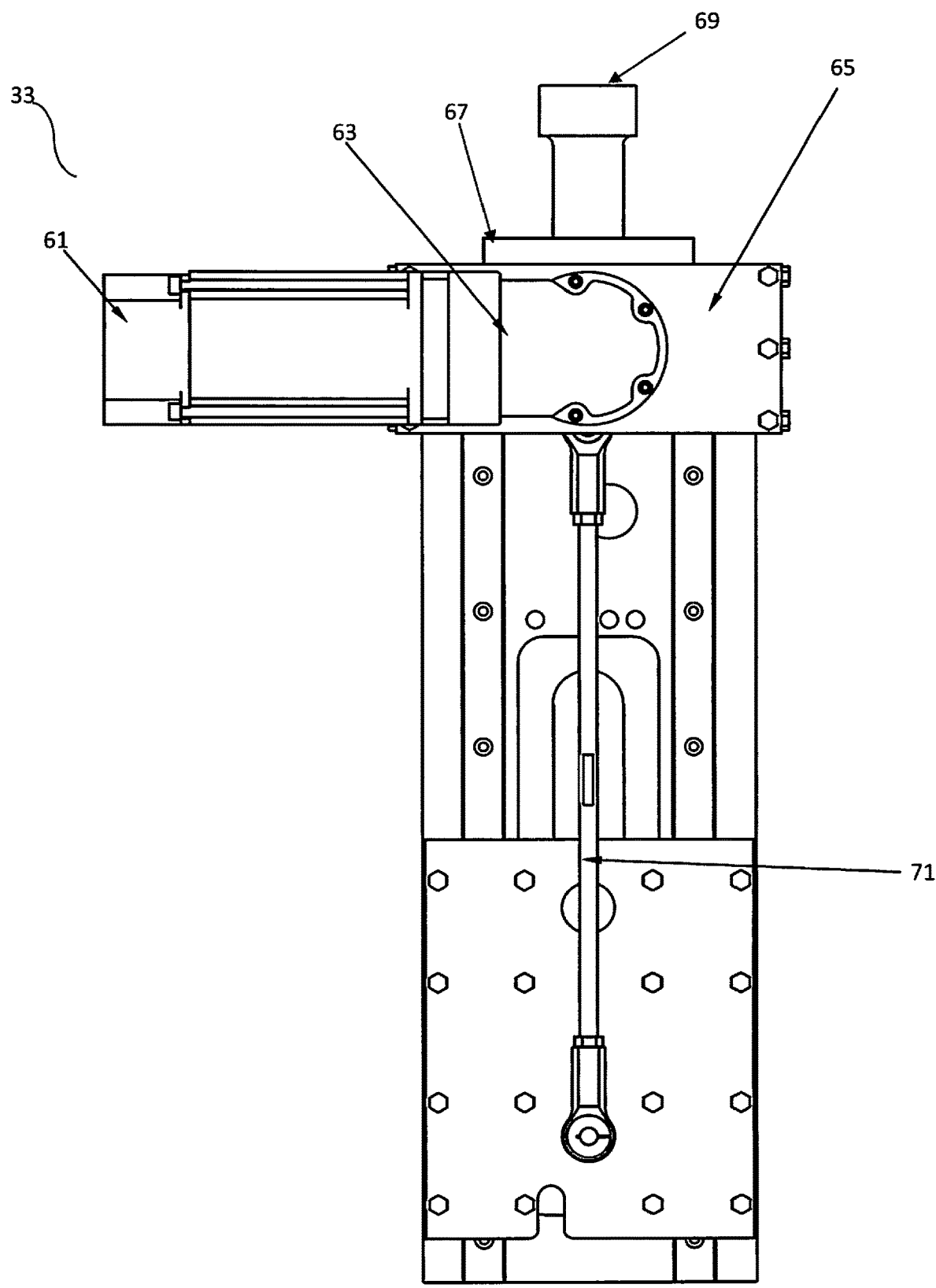
FIG. 9 is a perspective view of the servo motor drive for the wafer pusher assembly.

Referring to FIG. 8A-B, a wafer pusher 7 or wafer break assembly is shown. The wafer pusher can have a wafer adjuster knob 57 coupled to the wafer break adjustment screw 59. The wafer pusher 7 can be coupled to the wafer pusher servo assembly 33. Referring to FIG. 9, the wafer pusher servo assembly 33 can be comprised of wafer pusher servo 61 and a pusher gearbox 63, which is mounted to the servo motor mounting plate 65. The pusher gearbox 63 can be coupled to the drive shaft 71. The wafer pusher servo assembly can also include the extruder body 67 having an extruder adjuster knob 69. Similarly, in one exemplary embodiment, the wafer pusher assembly can use an actuator to drive the wafer pusher. In one exemplary embodiment, the rotary actuator shown in FIG. 9 can be replaced with a linear actuator shown in FIG. 24. The linear actuator can drive a stator up and down. The stator along with the two guide shafts can be supported by two bearing blocks on either end of the motor. All three of shafts can be connected together and attached to the existing wafer pushers.

Figure 10:
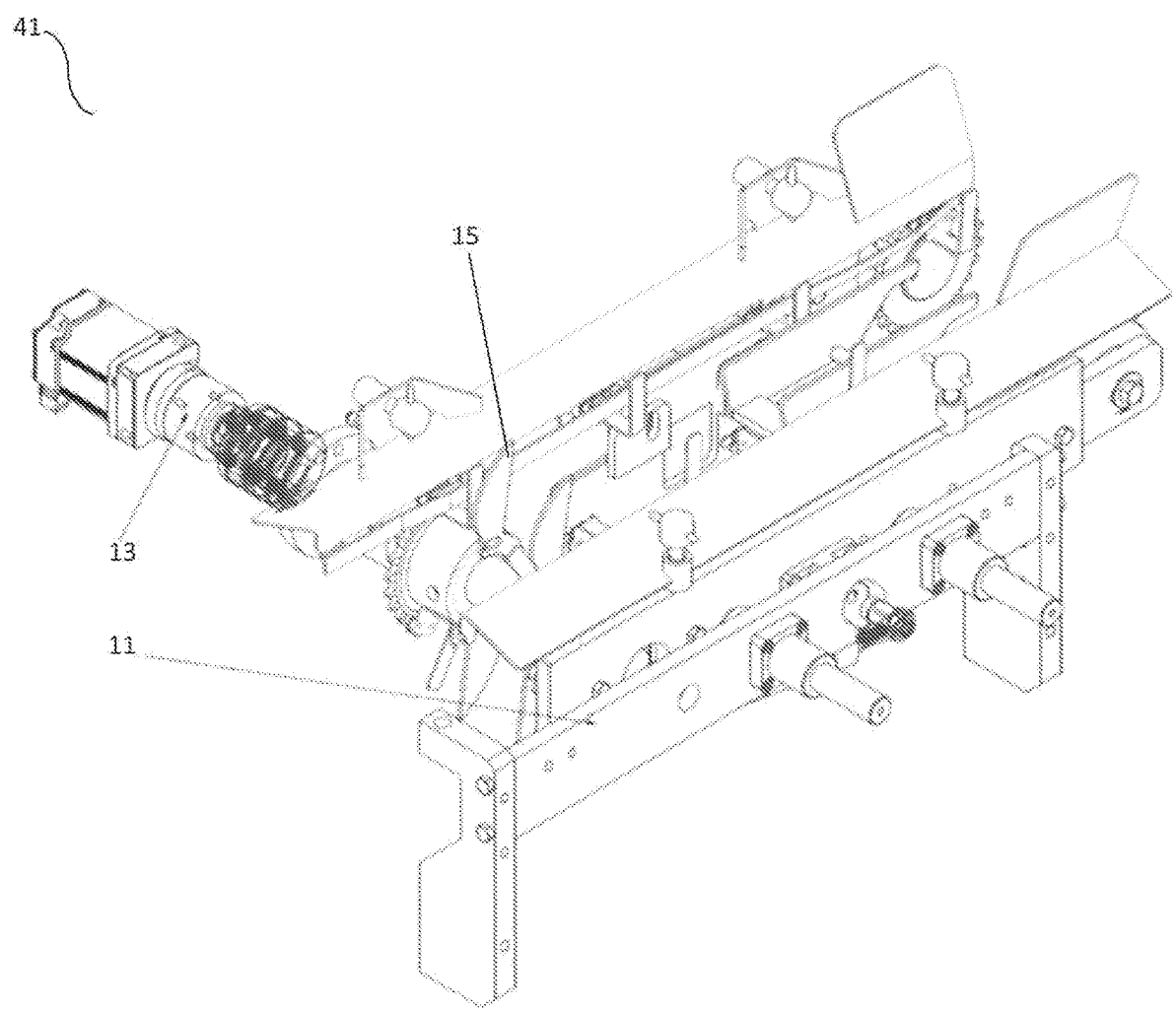
FIG. 10 is a perspective view of conveyor assembly and servo motor drive assembly for the conveyor.

FIG. 10 further illustrates one exemplary embodiment of a conveyor servo assembly. The conveyor can also include outer chains suspended along sprockets and driven by actuating means, such as a conveyor servo motor 13. Fingers disposed 15 on chains are, as indicated, regularly spaced and configured thereby to synchronously engage ice cream sandwiches for conveyance. The conveyor 11 also includes stationary conveyor track that are positioned medial of sprockets. Tracks support the sandwich products as they are urged forward along conveyor.

Figure 27A:
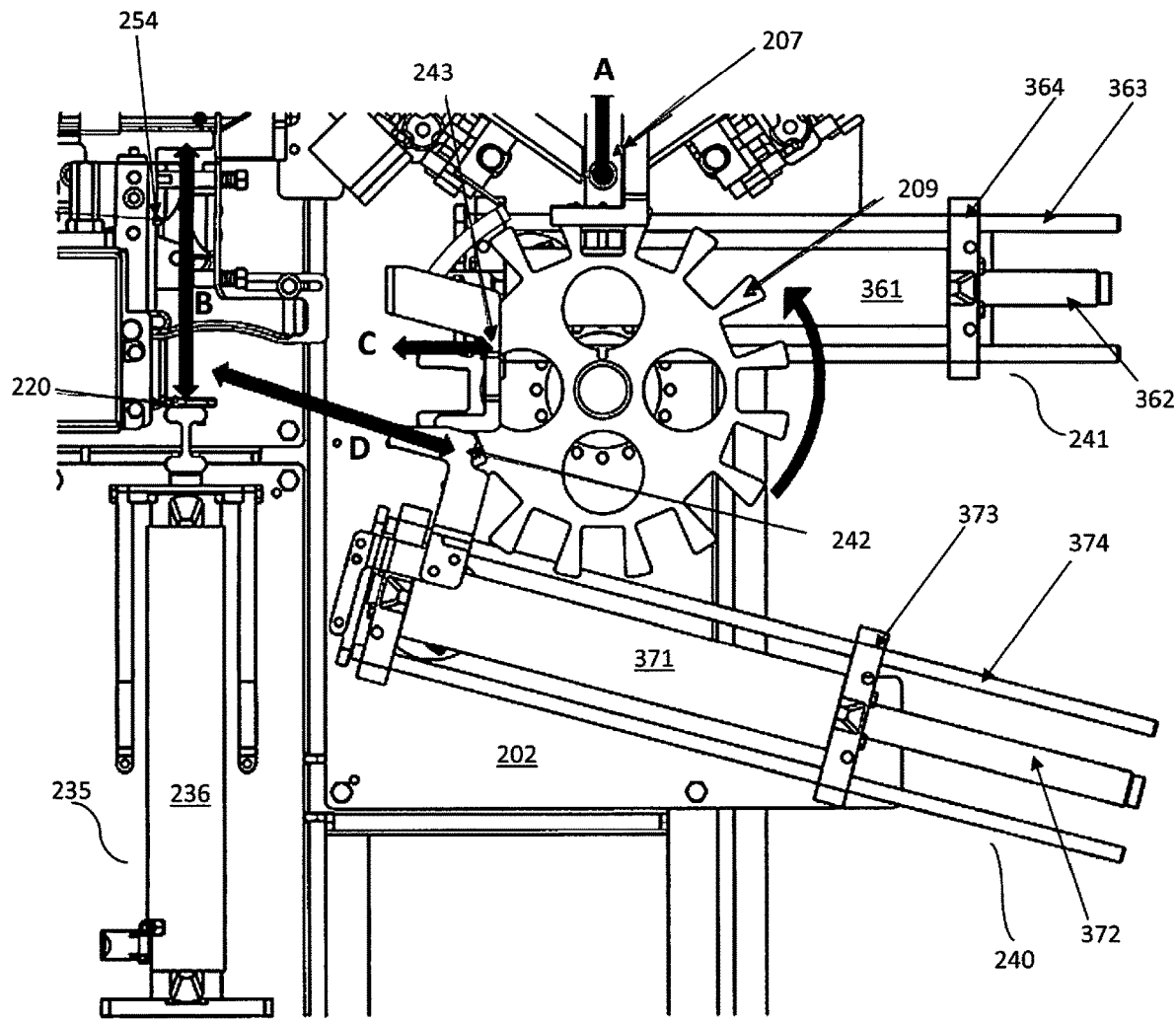
FIG. 27A is a front view of an exemplary embodiment of the improved pusher assemblies and axis of motion.
Figure 27B:
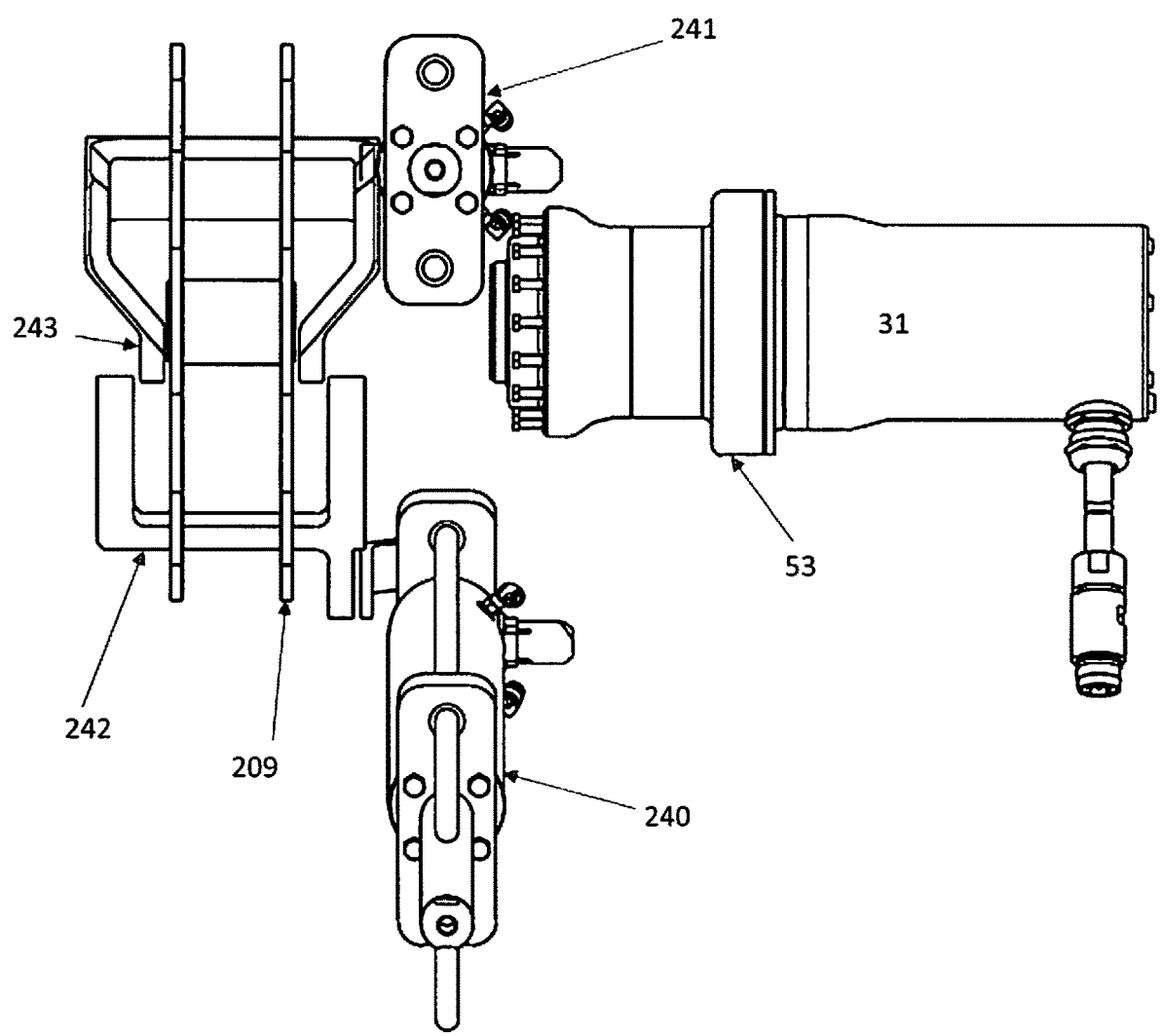
FIG. 27B is a side view of the indexing wheel assembly and pusher assembly of FIG. 27A.

In another exemplary embodiment shown in FIGS. 27B-C, a sandwich pusher assembly can be used in place of a conveyor assembly to aid in moving the sandwich from the indexing wheel. The sandwich pusher assembly can use one or more actuators. A first actuator can carry the sandwich out of the indexing wheel, while a second actuator in tandem with the first actuator can carry the sandwich into the elevator. The use of the pusher assembly allows for a reduced footprint of the apparatus and provides complete control of the comestible product throughout each cycle. Additionally, a user has unrestricted access to the elevator, roller assembly, and pusher area for maintenance.

FIGS. 27A-B, further illustrate the sandwich pusher assembly replaces the traditional conveyor assembly. A first actuator having an indexing wheel ejector portion can carry the sandwich horizontally out of the indexing wheel. A second actuator having an inclined elevator can extend up at a slight angle to intersect the ejector and carry the sandwich up to the elevator. Unlike other embodiments that throw the sandwich onto the elevator, the inclined elevator actuator intersects with the elevator and lifts the sandwich off and up through the wrapping head. The ejector portion can have a first and second support member spaced a fixed distance apart from each other. The first distance can be wider that the indexing wheel to allow the wheel to spin between the first and second support members of the ejector portion. Additionally, in some embodiments, the inclined elevator portion of the second actuator can be wider than the ejector portion to allow the two to intersect without the ejector portion and the elevator portion contacting. Similarly, in some embodiments, the elevator portion of the elevator assembly can be narrower than the inclined elevator to allow for the two portions to intersect without contacting one another.

Figure 11:
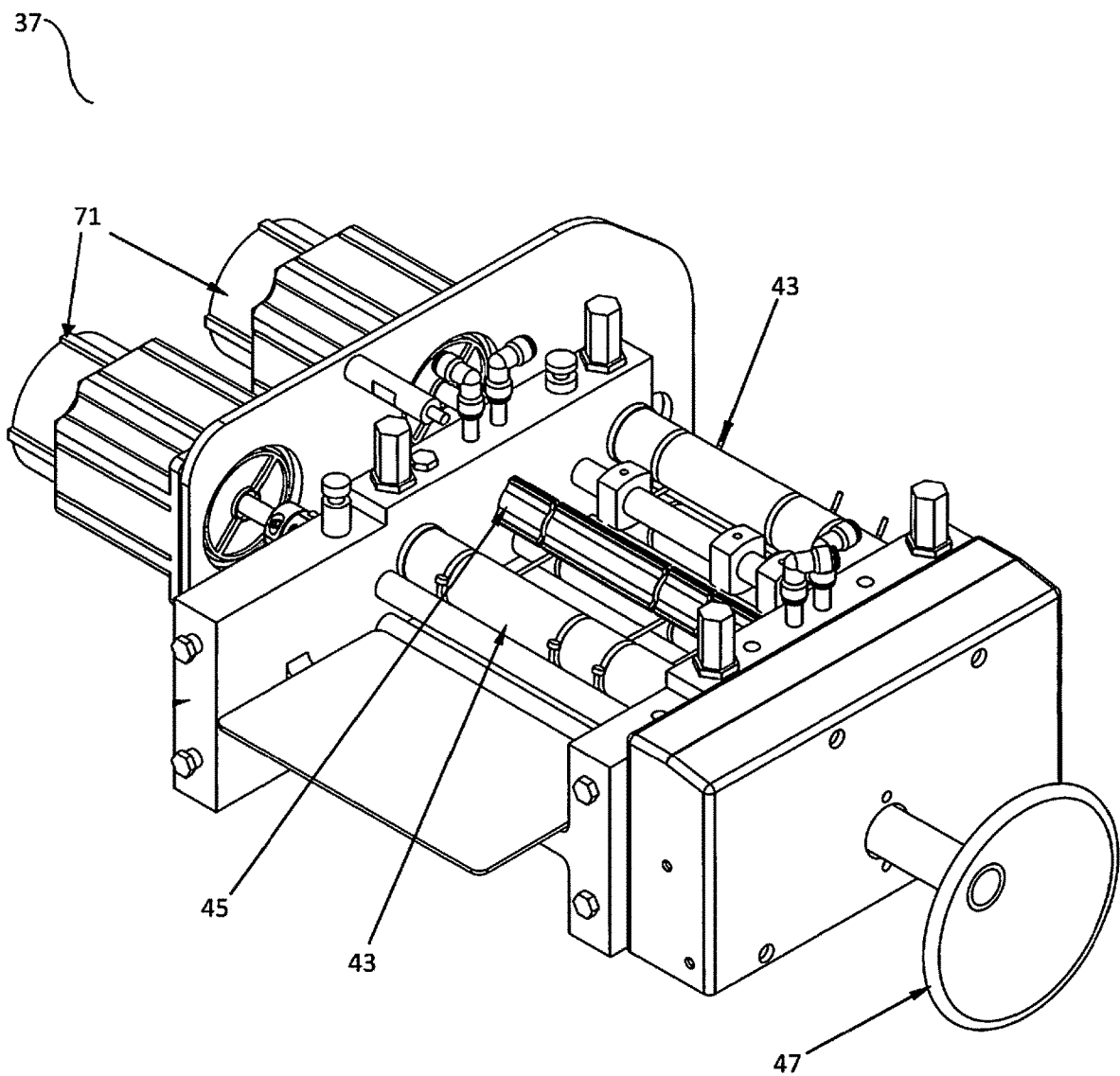
FIG. 11 is a perspective view of the servo motor drive for the roller assembly.

As shown in FIG. 11, the wrapping roller drive servo assembly 37 can further include a wrapping feeder means, such as a roller assembly for the dispensing and delivery of wrapping material of predetermined size for disposition over the sandwich product as it is located on elevator. The wrapping feeder means can have a wrap roller that is driven by a servo motor to feed the wrap to the wrapping assembly. Thus, referring to FIG. 1, a payout reel dispenses wrapping material in sheet form, traverses pulleys, and is directed into the wrapping head area via wrapping feeder means. The wrapping material, not shown, is severed to seize upon exiting the wrapping feeder means and is then disposed on top of the sandwich product which in turn rests on the elevator. As the elevator moves upward, the sandwich product passes through the elevator shaft not shown, until it reaches the platform.

In one exemplary embodiment of the present invention, the wrapping feeder means dispensing wrapping to the roller assembly having at least two rollers 43, a first roller and a second roller, and a rotary or roller knife 45 can be driven by two individual servo motors to provide greater control. In the two-axis embodiment, shown in FIG. 11, the rotary knife and one of the rollers can be driven by a single servo motor and the second roller can be driven by a separate servo motor. The roller knife can be driven off of an idler gear from the second roller set at a fixed ratio, such as, e.g., about 2:1. The additional servo motors 71 can also reduce wear when advancing and or retarding the wrap tension. This provides greater reliability and reduces cost associated with the component wear and the downtime of the apparatus for maintenance. The roller assembly 237 can also have a roller handle 47 to manually turn the roller when the assembly is not driven by the servos for any maintenance or service procedures.

The roller assembly 37 assembly can include one or more servo motors to drive the roller assembly spools. In one exemplary embodiment illustrated in FIG. 20, the roller assembly 237 can include a three individual servo motors 238. The third roller servo can replace an idler gear and reduce the overall motor size and gear boxes. The additional third roller servo can allow for greater control over the wrap cutoff, and allow for more evenly dispersed wear between the first and second roller servos for driving the rollers, where in previous embodiments, one of the two original roller servos were required to be ran at twice the speed of the other roller servo. The additional servo can provide greater modulation in desired tension, which can provide smoother operation and increased performance. The roller assembly 237 can also include a drip plate 288 that is located above the rollers to divert any fluids away from the rollers to keep the rollers clean and dry during operation. Additionally, the roller assembly can include an infeed tray 298 for providing the paper to the roller assembly. In some exemplary embodiments, a fourth servo can control the rotary knife 45.

Figure 19:
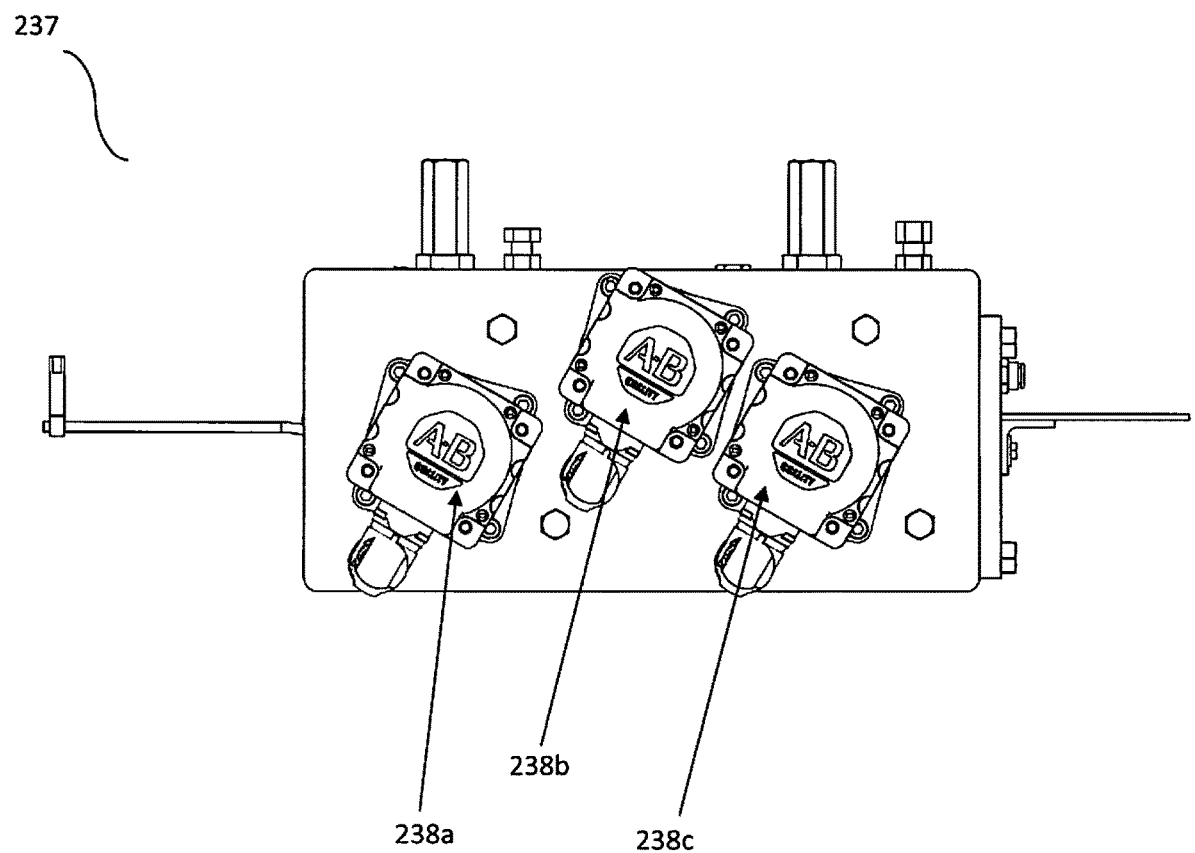
FIG. 19 is side view of 3 axis roller assembly have three independent servo motors.
Figure 20:
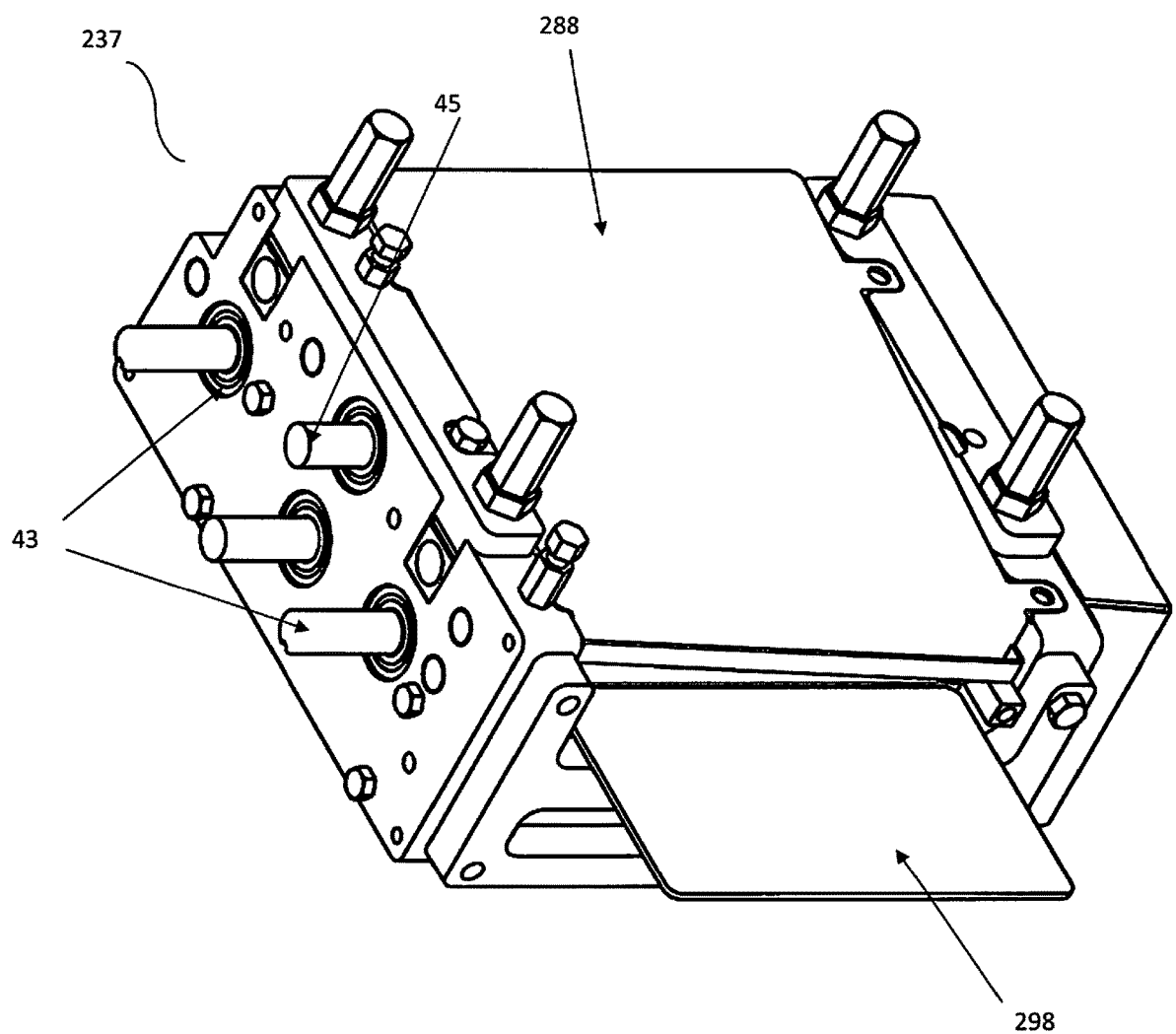
FIG. 20 is a perspective view of an exemplary embodiment of a 3-axis roller assembly of FIG. 19.

Previous embodiments of the roller assembly required a fixed gear ration between the knife and one of the paper feed rollers. The fixed gear ration required speeding up or slowing down that roller in order to adjust the paper cutoff. As shown in FIGS. 19 and 20, one exemplary embodiment having a third servo motor allows for a separate control to the knife allows us to slow the second roller down to where it just creates enough tension to cut the wrap. The three axis roller assembly 237 can replace the idler gears of previous embodiments with a third independent servo motor which reduces motors sizes, provides more control over wrapper cutoff, while also enabling smoother performance of the wrapping roller servo assembly 237. Previously embodiments required one roller spinning up to twice as fast as the other and needed to set the pressure between the rubber and steel rollers sufficiently to allow the faster roller to slip and the slower roller not to slip. The three axis servo roller assembly of FIG. 19C can provide a fixed speed ratio between the 2 rollers that is closer to 1:1. The additional servo/axis reduces or eliminates slip on the wrap on the one roller, while also eliminating or reducing the need to resist slipping as much on the other roller. Additionally, roller tension can be better balanced which can reduce roller wear and also simplifies setup. Additionally, the bearing used within the roller assembly can be solid lube bearings and replace previous bushing used in the industry. Each side plate of the roller assembly can include solid lube bearing 238. The solid lube bearings eliminate the need for all oil on the machine allowing for cleaner apparatus requiring less maintenance and increased efficiency. In another exemplary embodiment, the wrapping roller drive servo assembly can have three axes wherein a separate individual servo motors are provided to drive each roller and a separate servo motor is provided to independently drive the roller. In the three-axis embodiment of the wrapping roller drive servo assembly, three servo motors are provided. The first servo 238a drives the first roller 239, the second servo 238c drives the second roller, and the third servo 238b can drive the roller/rotary knife 45. By eliminating the idler gear in the three axis embodiment there is much greater control of the second roller and the rotary knife.

The two-axis embodiment requires the second roller set rotate between about 1.2 to about 2 times faster than the first roller set, depending on the paper cut length. The ratio is a direct result of having a fixed gear ratio between the roller and knife that dictated the speed to keep the knife synchronized. With the speed difference between the rollers, the first roller set may require more compression while the second roller set requires less. With previous roller dispensers, the first roller puts out the correct length of paper without slipping and the second rollers could slip against the wrap depending upon the type of wrap used.

The use of new types of wrap, such as poly wrap, have led to an increase in wear on the rubber rollers in the form of flat spots. This can be attributed to a combination of the rollers slipping against the poly wrap and the high rubber roller compression forces required for the poly wrap. The three-axis setup shown in FIGS. 19-20 can allow for a user to infinitely adjust the speed ratio between the first roller 43a and second roller 43b. In one particular embodiment, the second roller set may be set to run at about 10% faster than the first set. In some embodiments, the second roller set needs to run slightly faster to aid the knife in cutting the paper. Running at this lower ratio, the compression force can be greatly reduced along with a reduction in the amount of slipping that may occur between the second roller and the wrap. In the configuration according to this embodiment, the ratio is no longer affected by the length of the paper because the knife is controlled separately. This provides for greater control over the roller assembly and its functionality along with greater reliability and reduced cost associated with the component wear and the downtime of the apparatus for maintenance.

Figure 12:
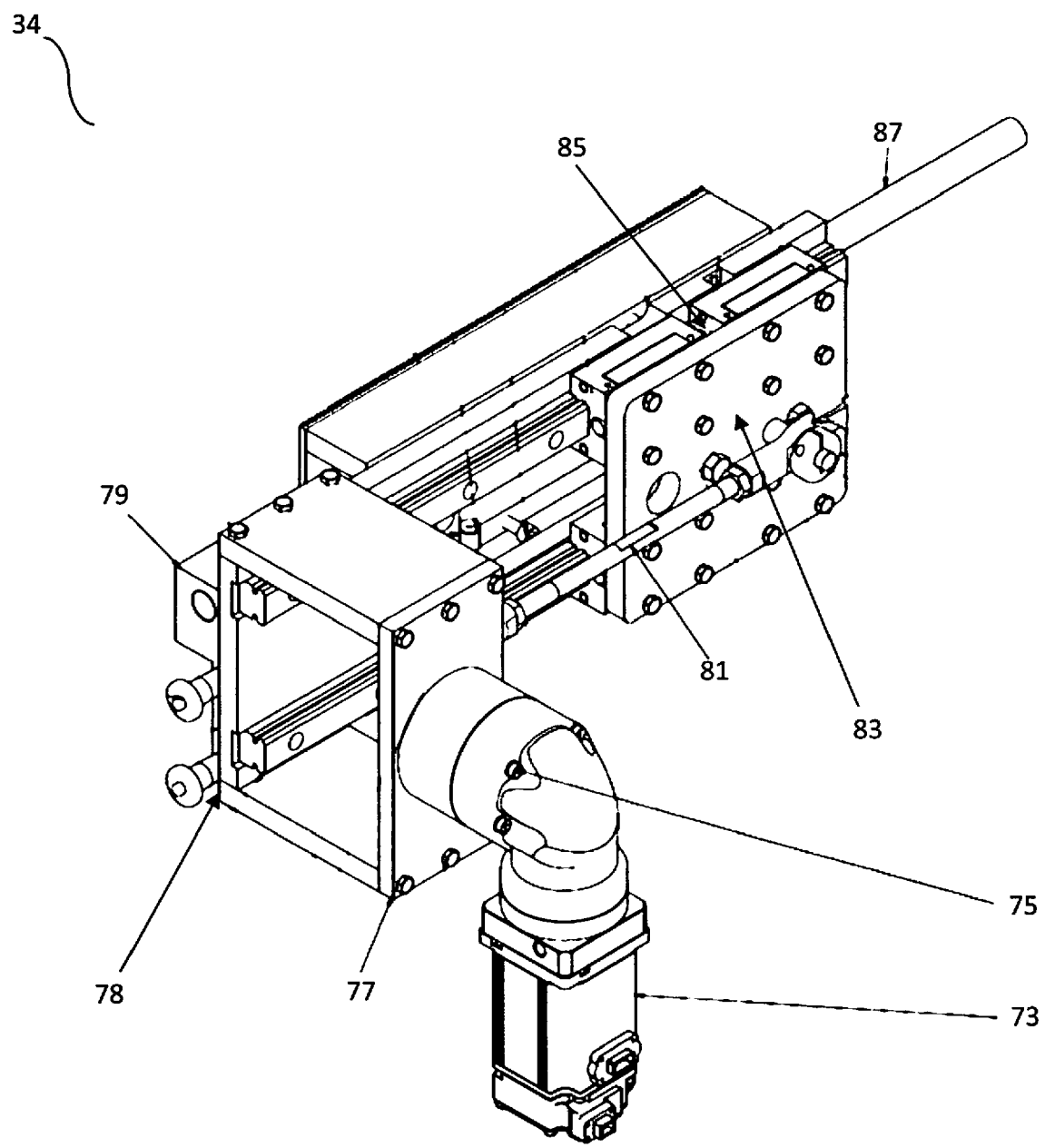
FIG. 12 is a perspective view of the servo motor drive for the bottom folding arm assembly.

A bottom folding arm servo assembly 34, shown in FIG. 12 can be used to control the folding of the wrapper around the sandwich prior to reaching the output conveyor. The bottom folding arm servo assembly can comprise a folding arm servo motor 73 and a gearbox 75, where the gearbox 75 is mounted to a mounting plate 77. The mounting plate can be coupled to the slide block 78 and pusher arm bracket assembly 79. The motor 73 and gear box 75 can drive the guide rail 81, which is coupled to the connector block 83.

Figure 13:
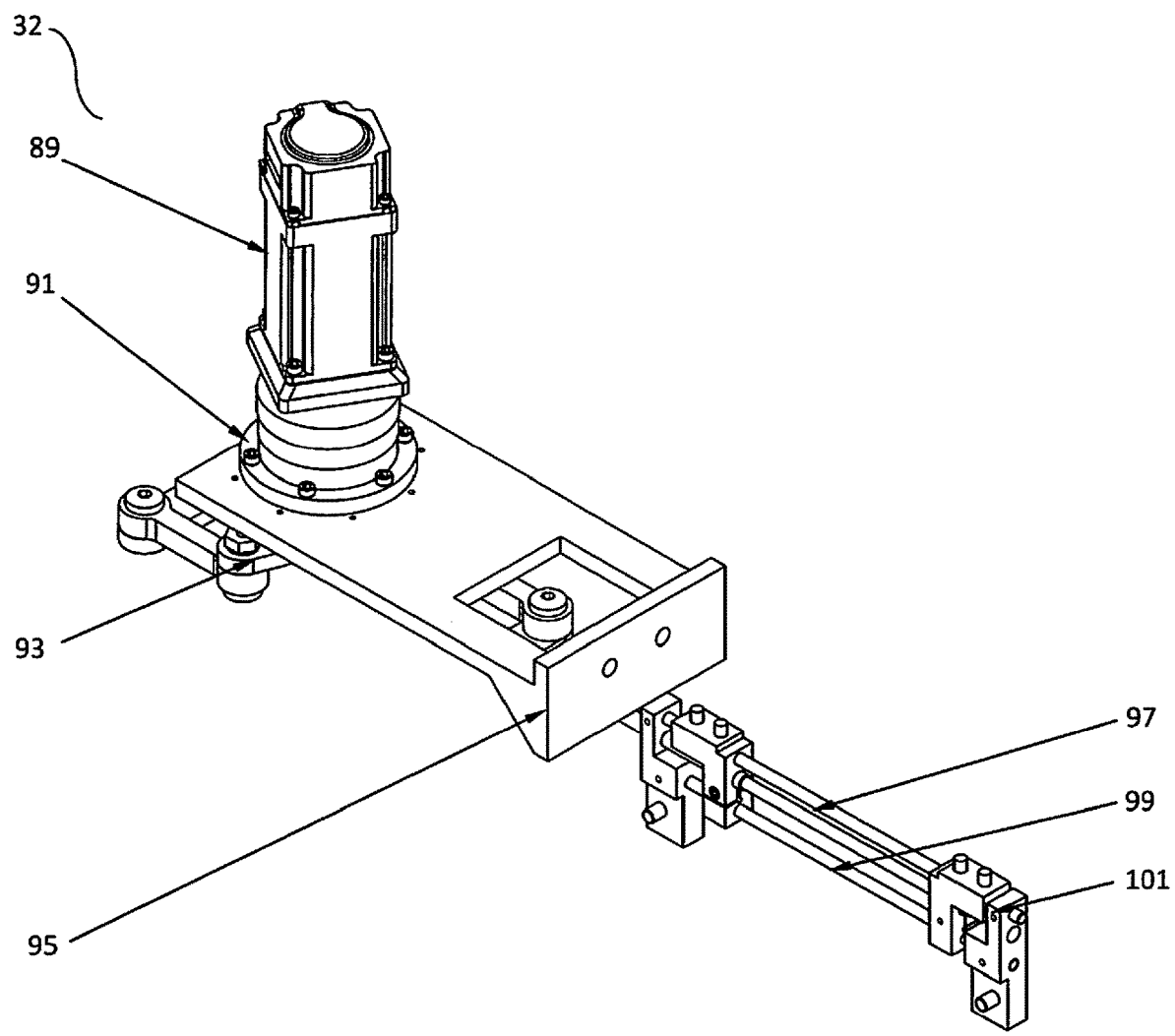
FIG. 13 is a perspective view of the servo motor drive for the tucker assembly.
Figure 25:
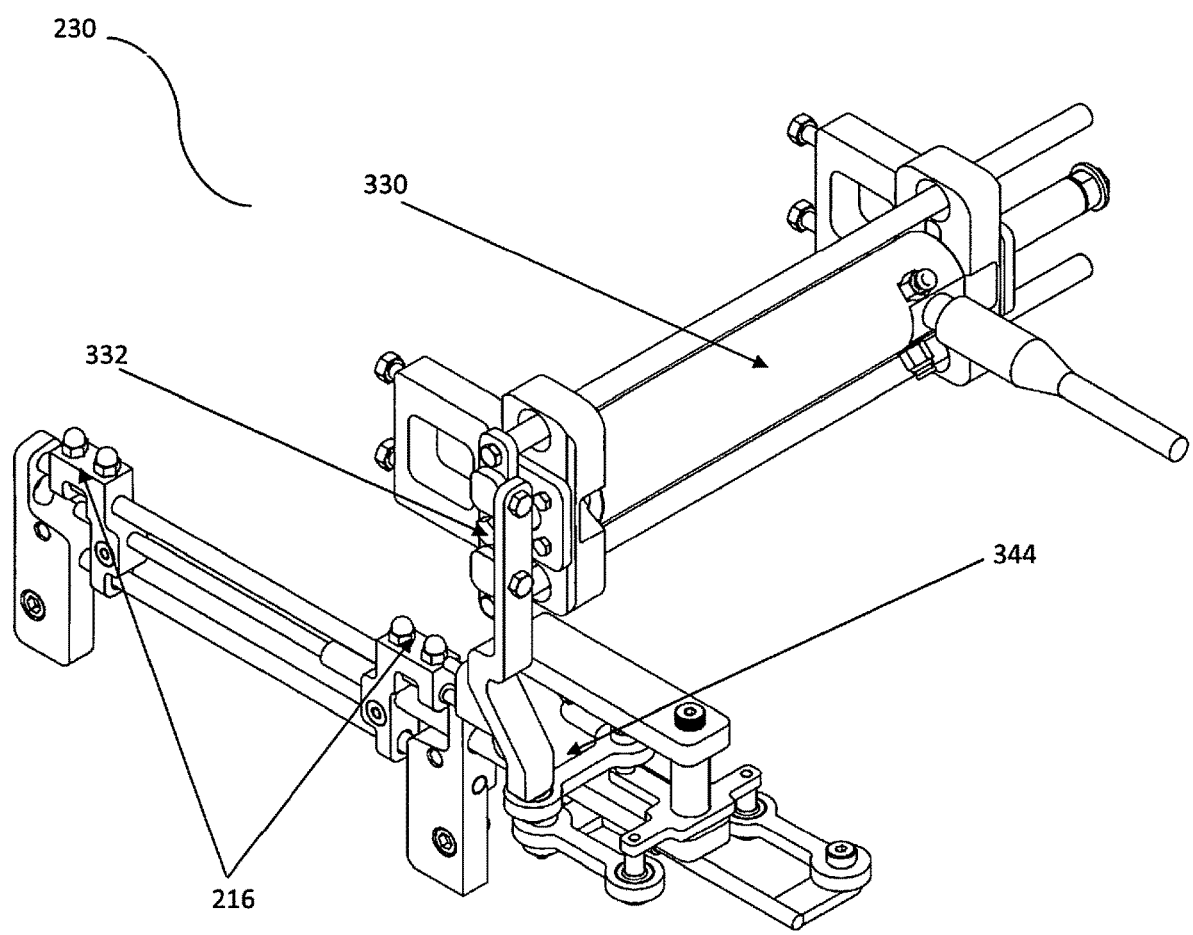
FIG. 25 is a perspective view of an exemplary embodiment of a side tucker assembly having an actuator assembly.

The connector block can be coupled to a carriage block 85. The carriage block can further be couple to the bottom fold arm shaft or pusher shaft 87. The tucker drive servo assembly 32, as shown in FIG. 13 can then be used to assist with tucking the wrapper around the sandwich. The tucker drive servo assembly can have a tucker servo motor 89 coupled to a gearbox 91. The gearbox can be coupled to a tucker swivel rocker arm 93. The gearbox can be mounted on the tucker mount arm 95 that can be coupled to the wall 1. The swivel rocker arm can be coupled to an upper tucker shaft 97 and a lower tucker shaft 99, wherein both shafts are coupled to the tucker slide block 101. In another embodiment shown in FIG. 25, the tucker drive servo assembly 32, can use a linear actuator to drive the tucker side block. The tucker driver servo assembly 32 can also including mounting portions/ blocks 216 for the tucker blades 215 to allow for the blades to be easily removeable from the assembly.

Figure 23:
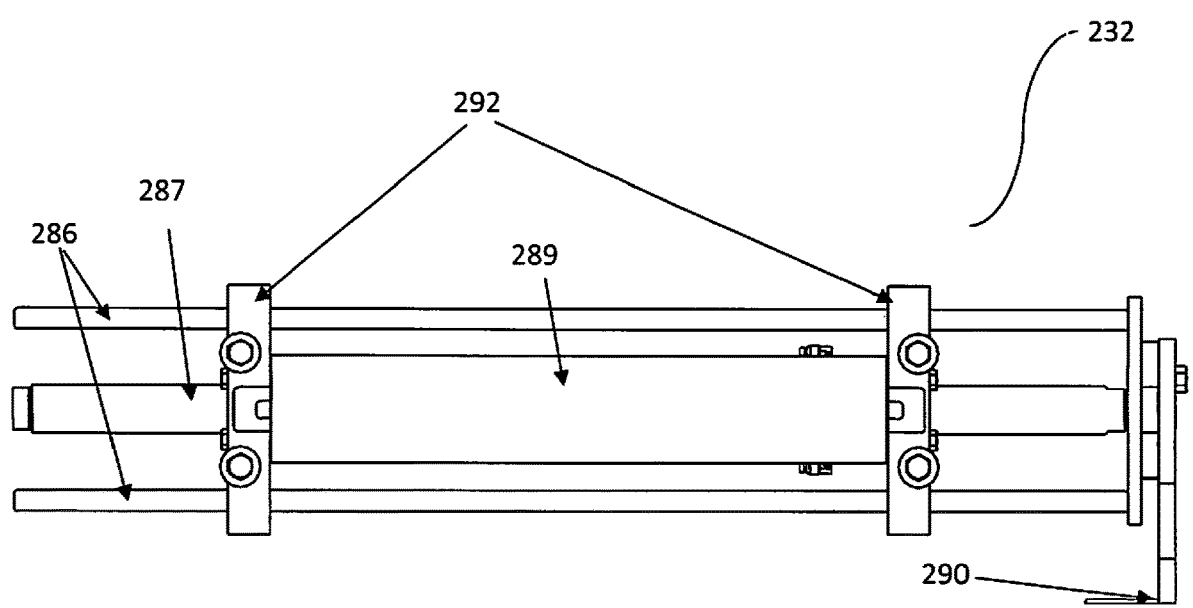
FIG. 23 is a perspective view of an exemplary embodiment of an actuator assembly for a bottom fold assembly.

Similarly, a bottom folding arm servo assembly 232, shown in FIG. 23 can additionally or alternatively include a bottom tucker actuator assembly 232 to drive the pusher shaft 87, wherein the actuator end bearings can operate as guides 81 for the shaft 87 and eliminate the need for a slide block. A bottom folding arm portion 290 can be coupled to one end of the linear actuator shaft. The bottom folding arm can supply enough energy to simultaneously fold the wrap around the sandwich and push the sandwich off of the wrapper assembly thereby eliminating the need for an additional element to push the sandwich off the wrapper assembly.

Condensation can develop from the heat of the heated platen when sealing, which can lead to an impediment of the wrapped sandwiches when exiting the from the discharge end of the wrapping assembly. Similarly, the wrapper itself can have a certain coefficient of friction (COF) that can prevent the sandwich from exiting the discharge end. In one preferred embodiment illustrated in FIG. 14, the exit tray can be a roller tray that is configured to have a series of rollers designed to prevent wrapped sandwiches from sticking within the exit tray, thus preventing damage to the sandwiches and ensuring continuous operation of the apparatus. Similarly, the roller tray can comprise a continuous conveyor belt driven by a servo motor.

Figure 14:
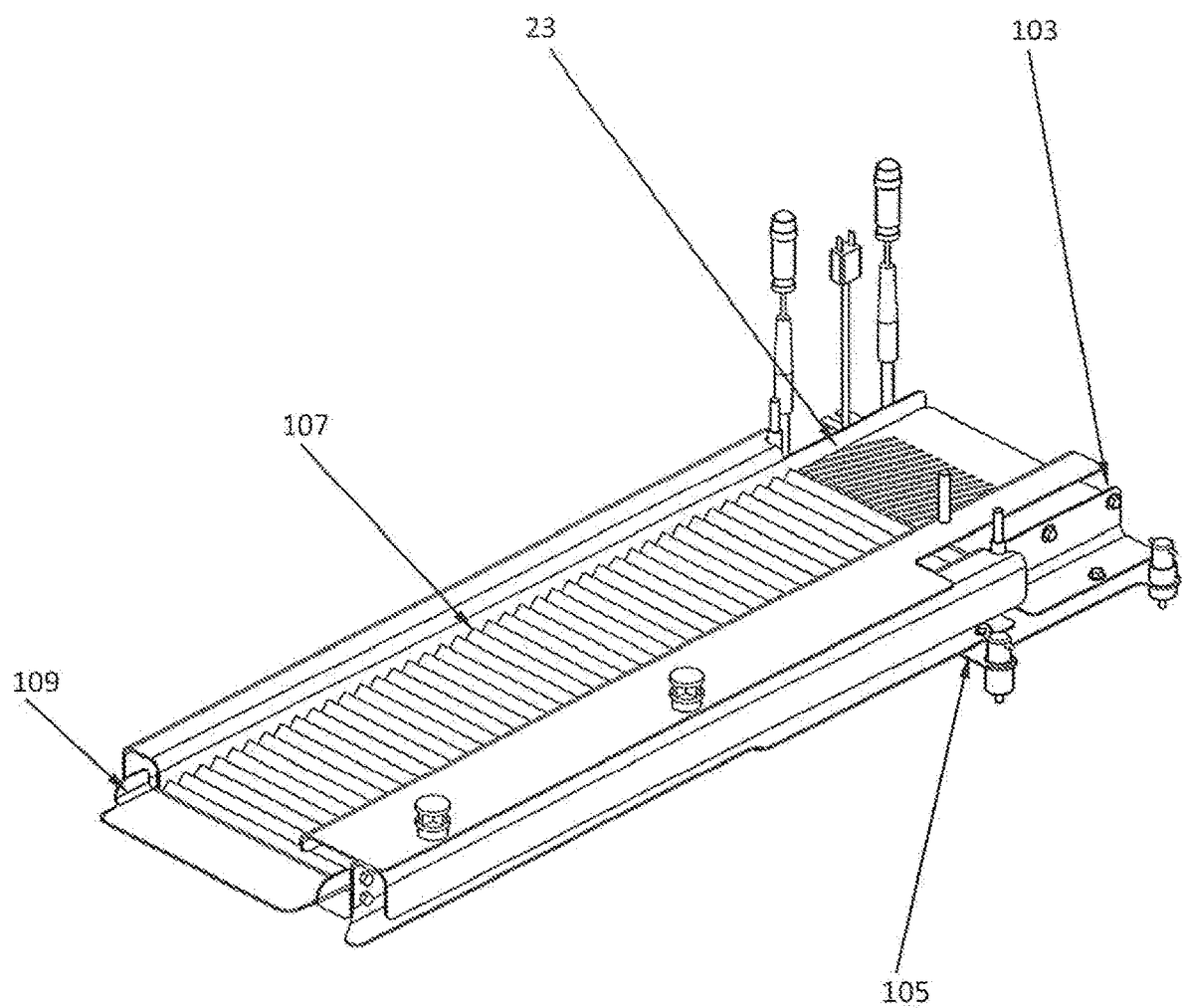
FIG. 14 is a perspective view of the discharge tray of the roller assembly.
Figure 15:
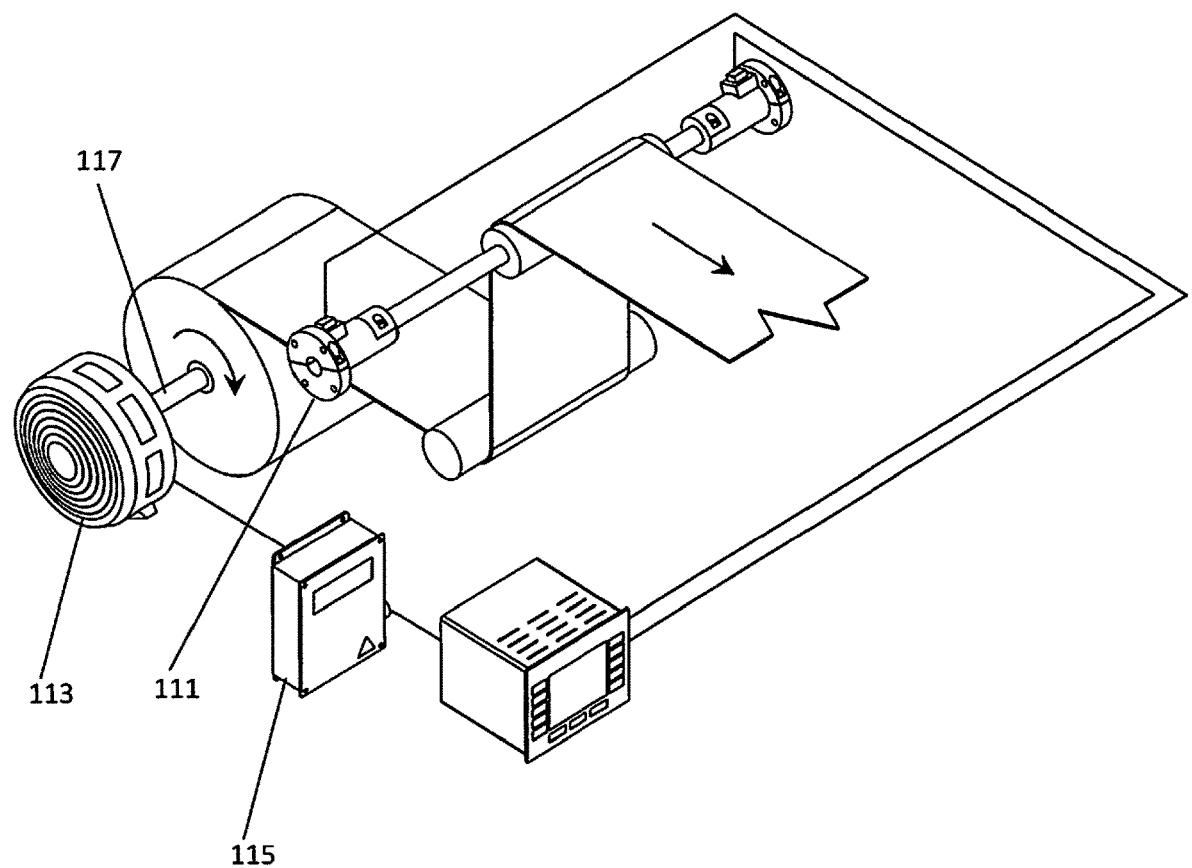
FIG. 15 is an illustration of a tensioning means having a braking means and load cell configured to provide a tension to a wrapping material.

As illustrated in FIG. 14, one exemplary embodiment of the output conveyor can have a heat platen 23 proximate to the discharge tray 103. The heat platen 23 and discharge tray 103 make up the heater block assembly 105. After the sandwich exits the heater block assembly it can travel down the roller tray or conveyor 107, and then exit at the discharge tray roller dead plate 109. As previously state, the output conveyor 107 can comprise a conveyor belt driven by a separate servo motor or can comprise a plurality of rollers the sandwich can passively roll down after being pushed of the heat platen 23.

In one exemplary embodiment, the rollers or the roller tray can also be driven by a servo motor or other mechanical drive. A single servo can drive multiple rollers where the rollers can use a belt drive or mechanically interlocked to allow for the movement of multiple rollers while only apply the servo to a drive roller, belt drive, or other suitable means.

Similarly, a tensioning means can be used with the wrapping feeder in the form of an additional servo motor or other component controlled by the PLC that can be used to adjust the tension of the wrap proximate to where the wrap unwinds. The tensioning means can be controlled by measuring or metering a load cell that sends corresponding load data to the PLC and human machine interface (HMI), which can communicate to the servo motor to control the unwind tension. Similarly, the tension can be applied to the roller using a braking system, such as a magnetic particle brake or disc braking system. The additional tensioning means can also incorporate sensor, such as a load cell or other suitable sensor, which provides feedback and data on the tension of the wrapping material. The sensor can trigger the PLC to adjust the tensioning means when a predetermined threshold is reached. In one exemplary embodiment of the present invention shown in FIG. 15, the load cell 111, a braking system 113, and PLC 115 are communicatively connected to allow the PLC to trigger a braking event upon receiving a signal from the load cell when a predetermined threshold is exceeded. The braking event can involve the braking system applying a braking pressure or torque to the roller 117.

Figure 16:
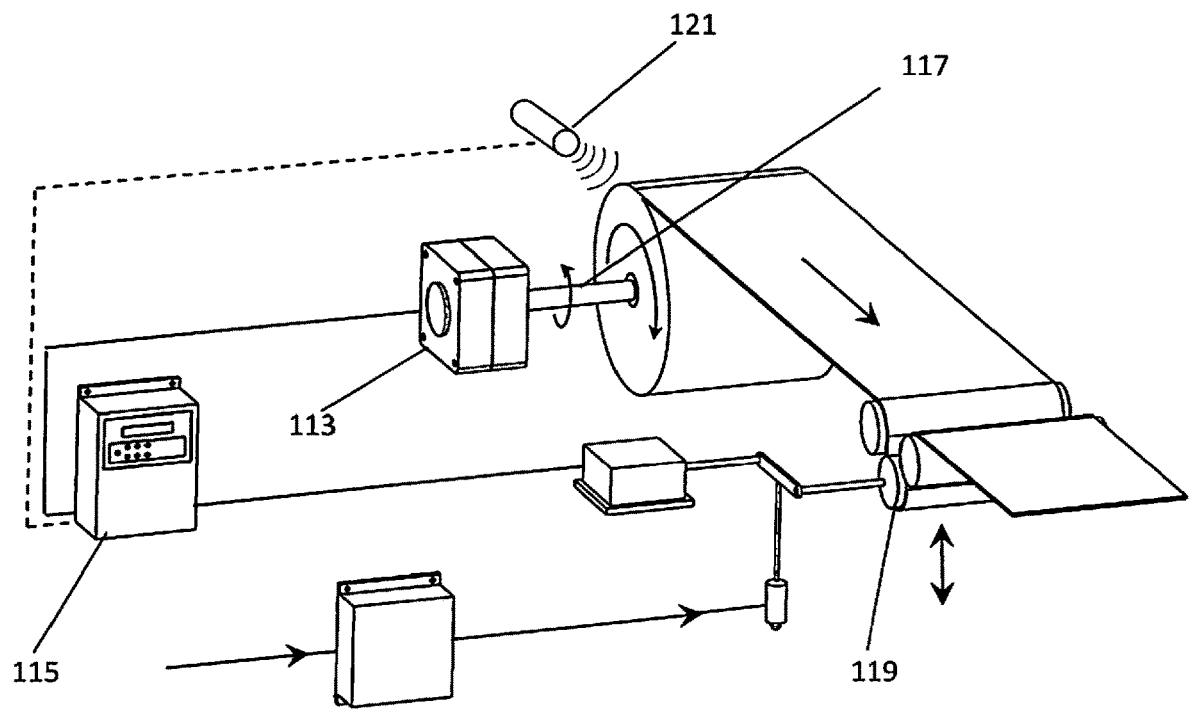
FIG. 16 is an illustration of tensioning systems have a braking means and dancer arm configured to provide a tension means to a wrapping material.
Figure 17:
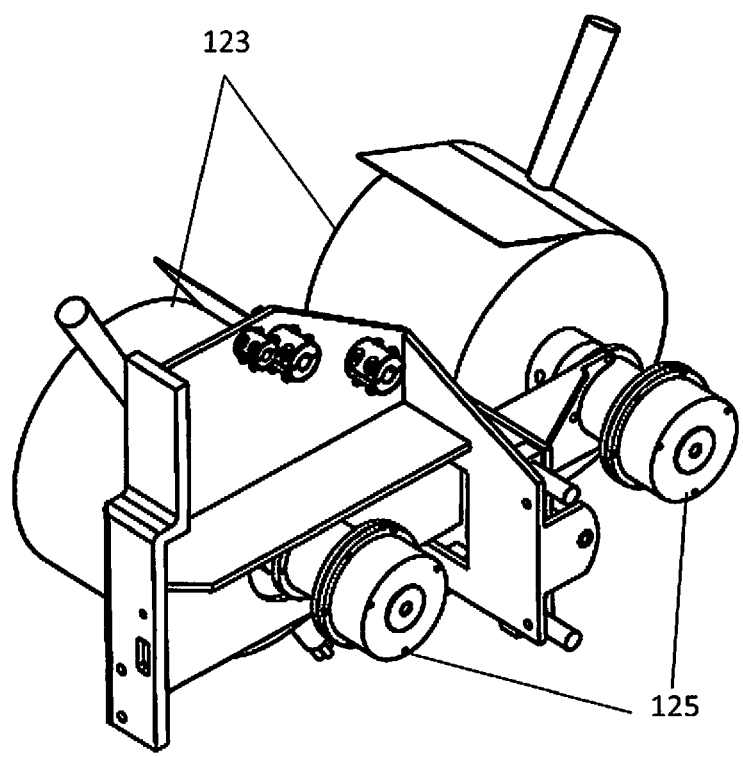
FIG. 17 is an illustration of a wrapping assembly configured to unwind a wrapping material.

Similarly, as illustrated in FIG. 16, a dancer arm 119 can be used in connection with the braking system 113 and PLC 115 to help control tension of the wrapping paper. A servo can be used to control or maintain the dancer arm 119 position. The dancer arm 119 can allow for increased accuracy in tension control, while also furthering the automation of the tensioning means by automatic control of the braking torque on the wrap roll, resulting in constant tension. Also, an ultrasonic sensor 121 that can be communicatively coupled to the PLC may be used to monitor the diameter of the wrap roll. The ultrasonic sensor can signal the PLC 115 to trigger a notification before the wrap roll becomes empty. Various other embodiments and combinations of the above embodiments can be used dependent upon the application needs. FIG. 17 further illustrates the dispensing means for the wrapping feeder, wherein two spools 123 of wrapping paper can be hung on the apparatus and individual servo motors 125 can be used to dispense or brake the spool in order to provide the appropriate tension to the paper as it is dispensed. Additionally, the servos can be coupled to a wrap tension feedback sensor, which can relay instructions back from the controller to maintain the tension on the wrap using the speed of the first and second wrapping paper servo. The first and second wrapping paper servos can be integrated directly into one or more support members of the frame to provide greater rigidity and alignment of the first and second wrapper paper servos thereby improving efficiency and consistency of wrapper distribution. The wrap tension sensor allows for better control of wrap distribution which is necessary depending upon the type of wrap being used.

Figure 21A:
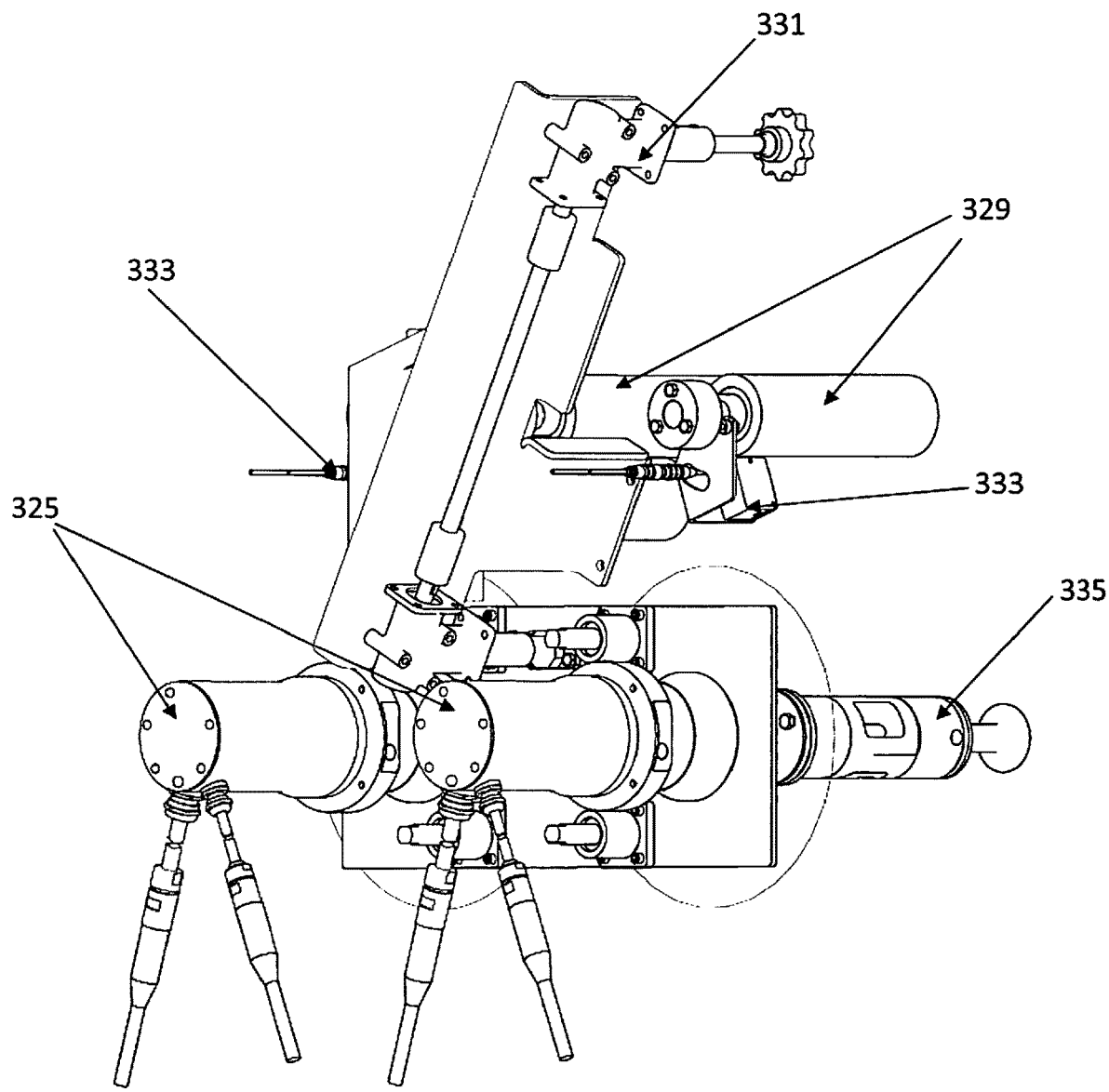
FIG. 21A is a rear perspective view of an exemplary embodiment of a paper arbor having two independent servo motors.
Figure 21B:
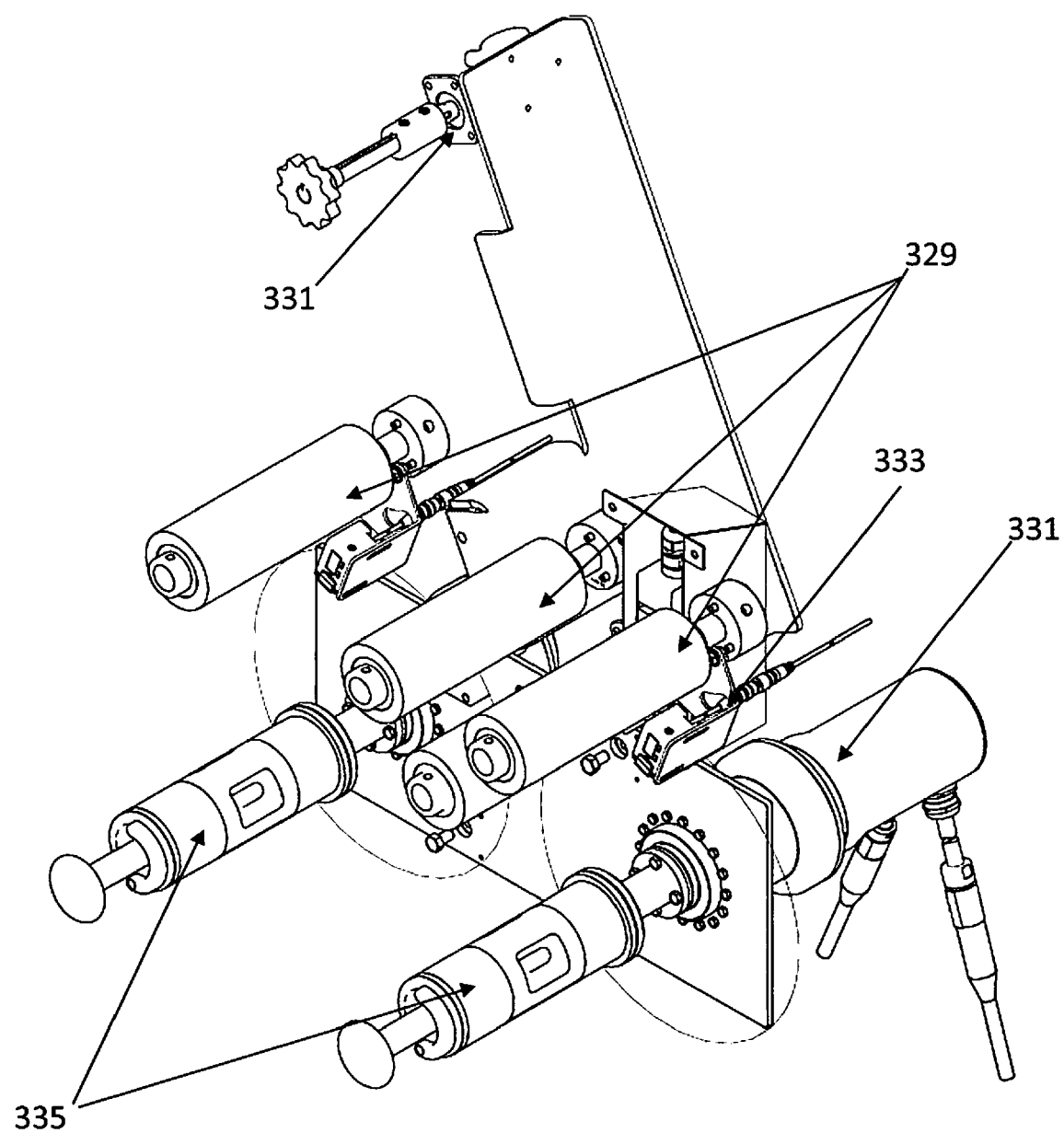
FIG. 21B is a front perspective view of an exemplary embodiment of the paper arbor of FIG. 21A.

In one exemplary embodiment shown in FIGS. 21A-B, paper can be fed by a first servo motor and/or gear box through a series of idler rollers 329. In some exemplary embodiments, the idler rollers 329 can utilize bearings to spin freely as the wrap is being distributed by the apparatus. At least one of the rollers is connected to a load cell 327. The load cell provides a feedback reading to the PLC/controller 500. The PLC can command a torque value to the motor to maintain a desired tension to the paper/wrap. The tension can be adjustable and set on the HMI. The arbor assembly can have one or more paper arbors 323 can be driven by an individual servo motor 325 and/or gear boxes. The individual servo motors 325 can also include one or more power and/or signal cables 398. In one exemplary embodiment, the apparatus will have a first and second paper arbor driven by a first and second servo respectively. The two paper arbors can share a single load cell 327. In some embodiments, only one paper arbor will feed wrap/paper at a time. This allows for a user to change the wrap/paper without shutting down the apparatus. An adjustment arm 331 can be used to allow for a user to adjust the feed position of the wrapping paper.

Figure 29A:
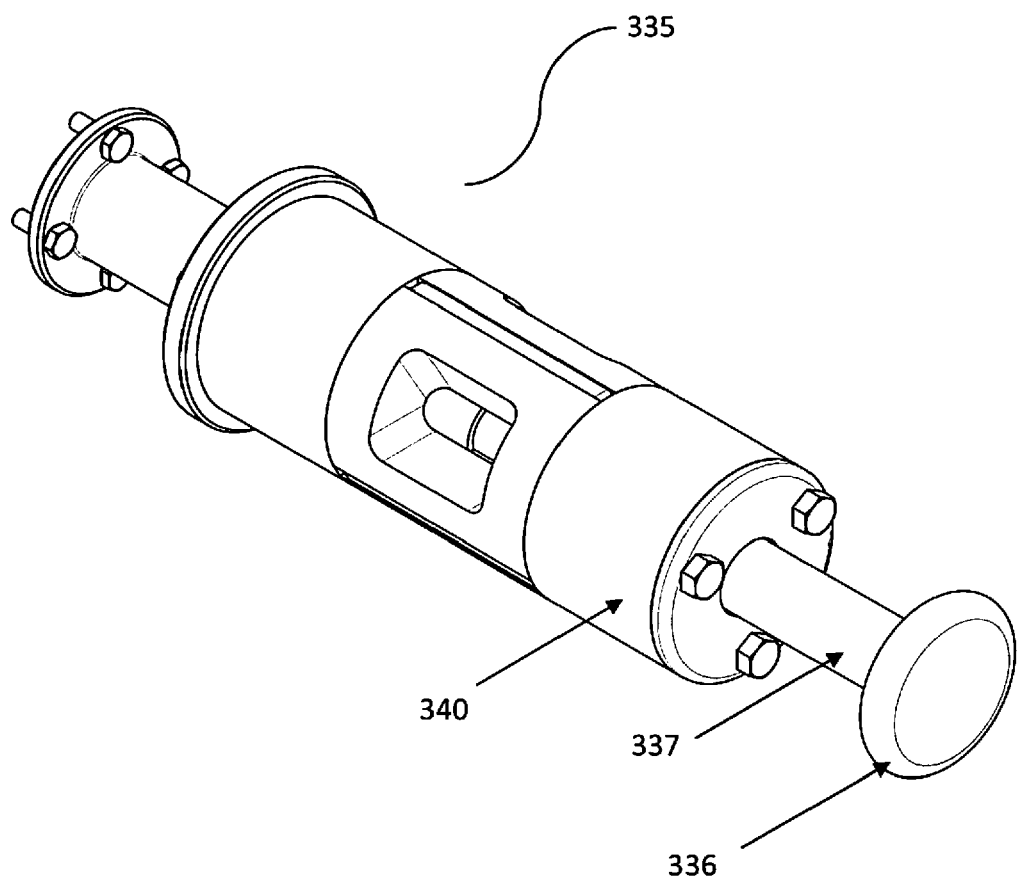
FIG. 29A is a perspective view of an exemplary embodiment of a paper core chuck of the arbor assembly shown in FIG. 21A-C.
Figure 29B:
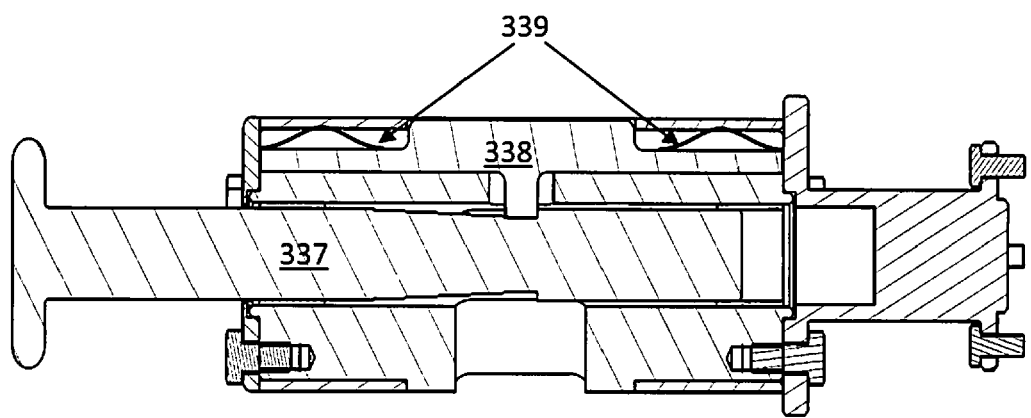
FIG. 29B is a cross-sectional view of the paper core chuck of FIG. 29A.
Figure 29C:
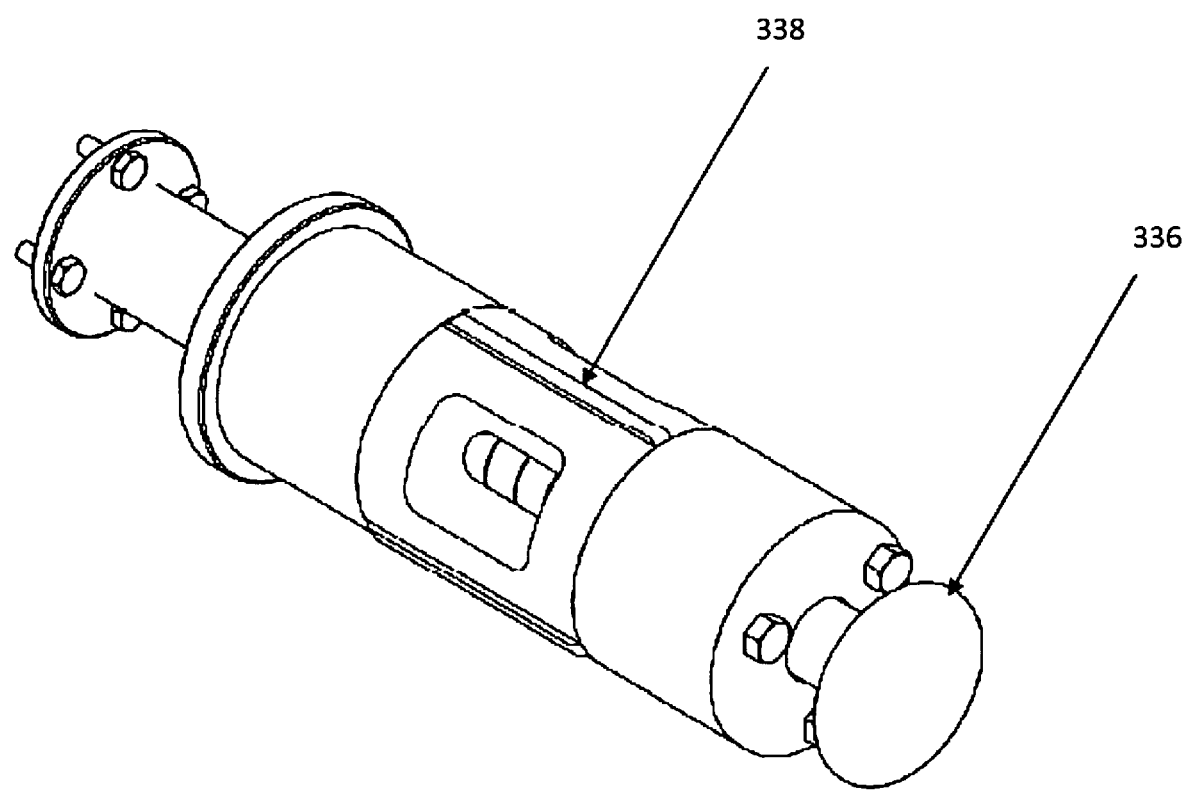
FIG. 29C is a perspective view of an exemplary embodiment of a paper core of the arbor assembly shown in FIG. 21A-C with the plunger in a fully depressed position.
Figure 29D:
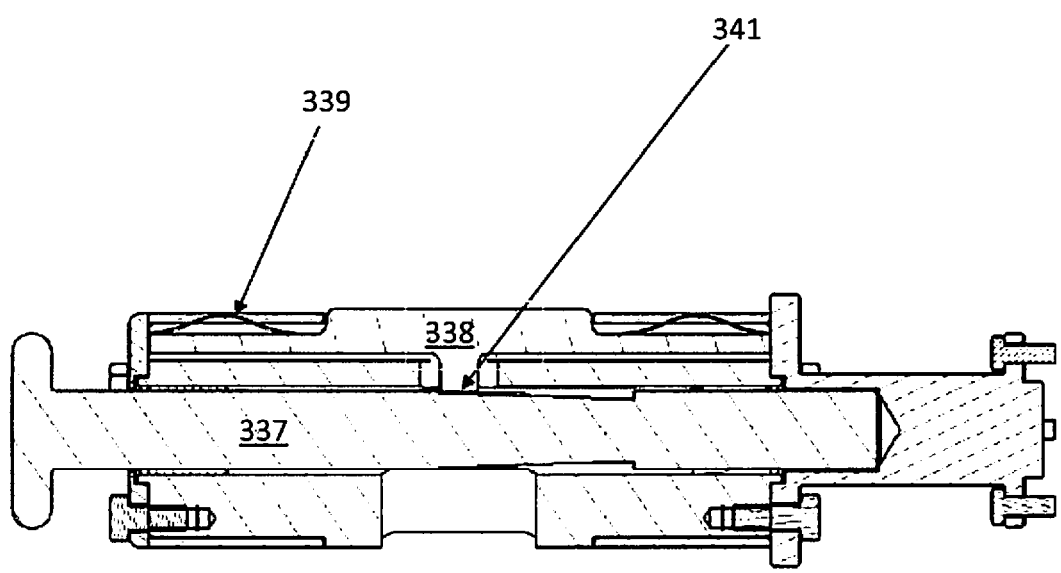
FIG. 29D is a cross-sectional view of the paper core chuck of FIG. 29A with the plunger in a fully depressed position.

In some exemplary embodiments, the arbor assembly can use a centering paper core chuck as shown in FIGS. 29A-D. The paper core chuck 335 can include a plunger 336, shaft 337, and clamping jaws 338. The plunger can be pressed in, which steps on the plunger shaft gradually push out one or more clamping jaws 338 equally around the diameter of a paper core. The jaws 338 can have an interfacing portion 341 that contacts the steps of the plunger shaft 337 The chuck can clamp the core onto the servo motor while keeping the paper centered. When the plunger is pulled out, one or more springs 339 can force the jaws to retract releasing the paper core for removal. In some exemplary embodiments, the shaft 337 can be stepped to gradually push out the clamping jaws 338 as the plunger is pushed and the shaft is further depressed within the housing 340. The plurality of steps can interface with or contact the interfacing portion 341 of the claiming jaws to further extend the jaws as the plunger is further depressed. As shown in FIGS. 29C-D, when the plunger is full depressed, the jaws 338 are fully extended out to contact the paper core when the springs 339 are compressed further. The jaws 338 will be extended to contact in inside diameter of the paper core.

During the travel of the sandwich, the wrapping material is forced downward and into contact with the peripheral edges of the sandwich product. As previously described, laterally disposed side tucking fingers force the corresponding ends of the wrapping material between the bottom of the sandwich product and the top surface of the elevator. At the top of the cycle of the elevator, the sandwich product is in alignment without set conveyor, and is then urged forward by the motion of pusher means. An example of an assembly of a wrapping head and corresponding pusher element is schematically disclosed in U.S. Pat. No. 4,628,664 to Price, and such disclosure is incorporated herein by reference.

In accordance with the invention, the wrapping material feeder assembly is likewise adjustable by means of adjusting the speed of the servo motor powering the wrapping material feeder assembly. Because the servo motors can vary the operating speed of the assembly itself, including the rollers and other means for indexing and cutting the wrapping material, these components are not in need of direct replacement and the gears that would normally need to be switched out and indexed are also not in need of replacement. Such replacement would effect a corresponding change in the frequency of paper indexing and cutting to accommodate corresponding differences in product size.

A controller is communicatively connected to each servo motor and is configured to control the servo motors and timing of each servo motor relative to each other according to a pre-determined program. The controller can allow a user to manually slow down or speed up the program as determined by the user. Pre-determined programs can be entered into the controller to allow the apparatus to operate properly with various sized sandwiches. A graphical user interface can be connected to the controller to provide the user and easy operating interface.

The base of the apparatus has at least one vertical wall member. The sandwich product assembly station, the sandwich conveyor member, the sandwich wrapping assembly, the wrapping feeder, the conveyor, and the controller can all be mounted in cantilevered relationship on the base.

Figure 24:
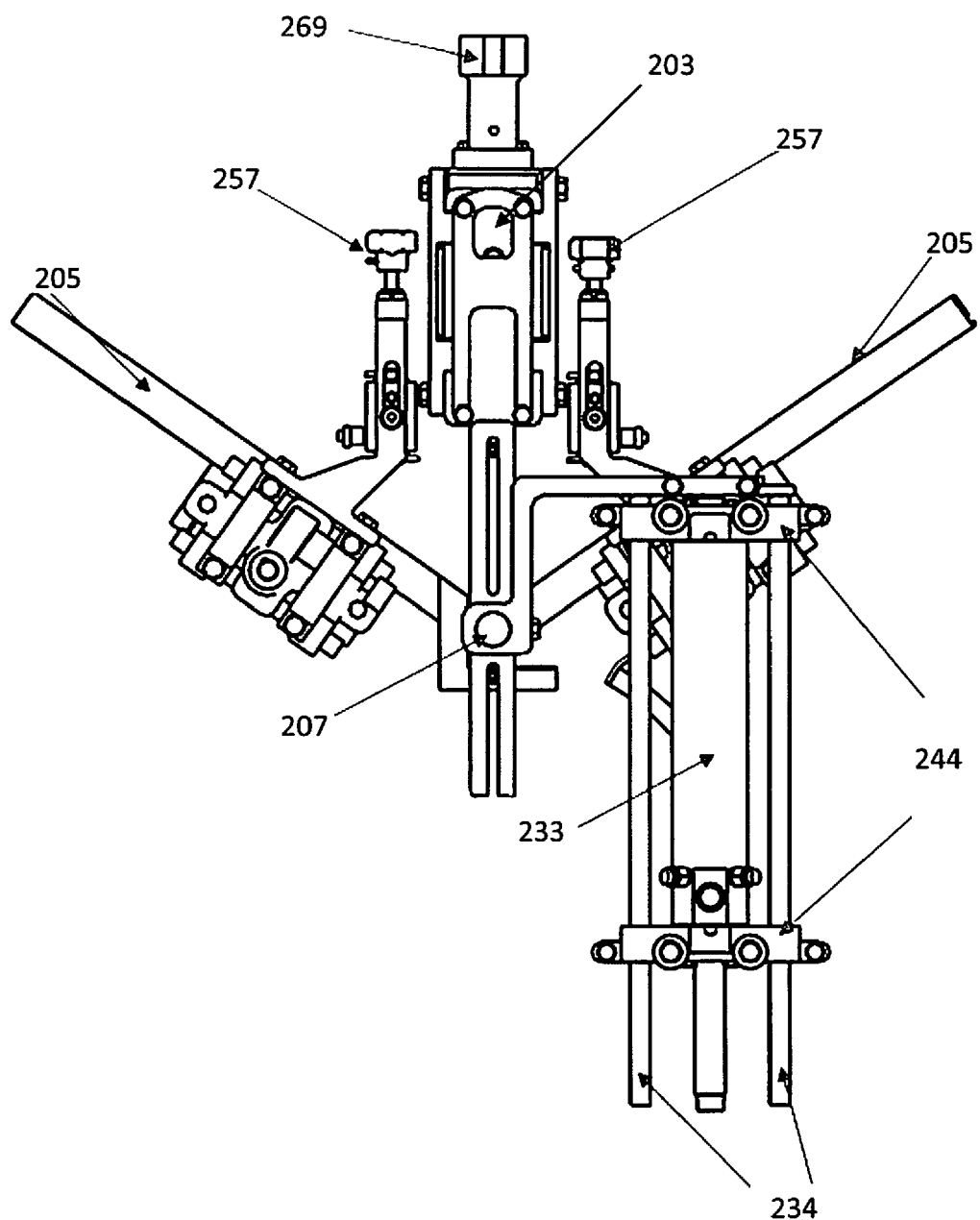
FIG. 24 is a perspective view of the wafer pusher assembly of integrated with the extruder and wafer tray assemblies.

In another exemplary embodiment, illustrated in FIG. 18A-D, the apparatus as a base, at least one vertical wall member, a sandwich product assembly station, sandwich transport station, a sandwich wrapping assembly, a wrapping feeder, and a controller, wherein the various components can be mounted in a cantilevered relationship on the base. The sandwich product assembly station can include an extruder (FIGS. 26A-B), one or more water trays, a wafer break assembly, a wafer pusher assembly shown in FIG. 24. The wafer pusher assembly can be driven by an actuator (FIG. 24).

Figure 21C:
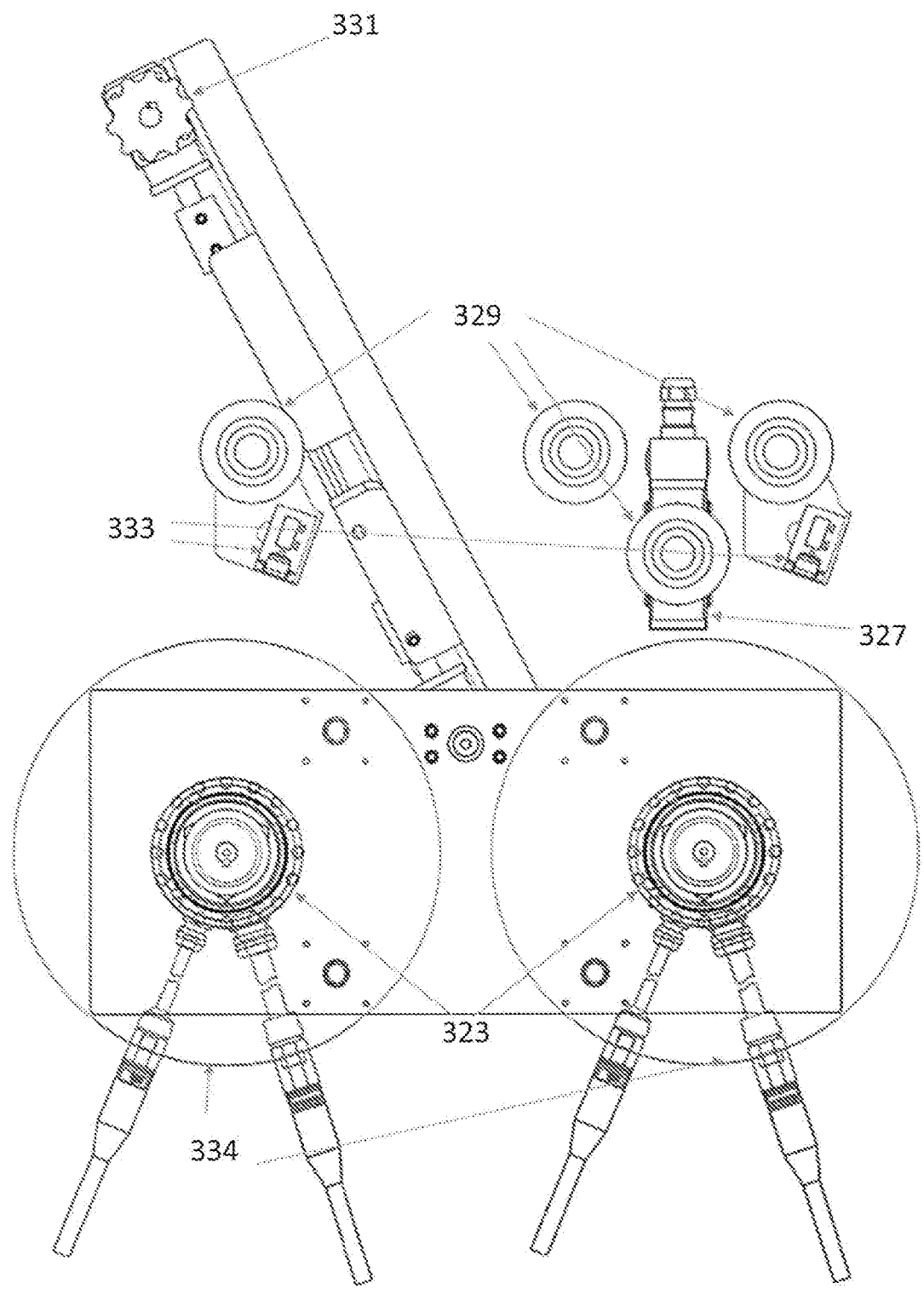
FIG. 21C is a front view of the paper arbor assembly of FIG. 21B.

The sandwich transport station shown in FIG. 27A, can include an elevator assembly (FIG. 22), an inclined elevator assembly, and an indexing wheel ejector assembly (FIGS. 27A-B). The sandwich transport station can move sandwiches from the indexing wheel to the wrapper head 254 of the sandwich wrapping station. The sandwich wrapping assembly can include a bottom fold portion (FIG. 23) and a tucker portion (FIG. 25), and a roller assembly portion 237, wherein the sandwich wrapping station provides a wrapped ice cream sandwich. The wrapper feed station shown in FIGS. 21A-C provides wrap/paper to the roller assembly 237 that is used to wrap the ice cream sandwiches as they are transported to the sandwich wrapping station. As further shown in FIG. 21C, the roller assembly 237 can have one or more sensors 333, such as laser distance sensor 333.

As shown in FIGS. 18A-C, an exemplary embodiment of an improved apparatus for the assembly of comestible-containing sandwich products such as ice cream sandwiches and wrapping of comestible-containing sandwich products. The apparatus disclosed is constructed about a vertical support or wall having attached thereto in cantilevered fashion a sandwich assembling station. The apparatus can include a frame which can be comprised of a plurality of assemblies. The frame 200 can consist of an outer layer 202, an inner support structure 204, and a base portion 206. The outer layer 202 can be comprised of composite, metal, plastic, or any other suitable material. The support frame can have a base portion 206. The base portion 206 can include one or more wheels 208 to allow for easy mobility of the apparatus throughout an area. Additionally, the base portion can include a braking or leveling means 210 to maintain the apparatus at a constant level.

A sandwich assembling station comprising a central extruder 203 with a nozzle for the discharge of a comestible of a predetermined shape and a sandwich wafer dispensing means 205 comprising inclined wafer trays configured to stably support a plurality of wafers for delivery against the corresponding opposite ends of the extruded comestible product out of the extruder 203. The extruder can comprise and extruder height adjustment member 269 The sandwich assembling station further comprised of an indexing means 209 comprising an indexing wheel that is disposed vertically below the sandwich assembling means, the indexing means 209 comprising an indexing wheel defining a plurality of circumferentially positioned pockets or slots for receiving and transferring sandwiches for horizontal conveyance. The indexing means 209 can rotate around an axis as illustrated in FIG. 27A.

The sandwich product assembly station can include an extruder 203 (FIGS. 26A-B), one or more wafer trays 205, a wafer break assembly, a wafer pusher 207, one or more guide bearings, one or more guide shafts, wherein the wafer pusher shaft is coupled to the wafer pusher attachment 207 as shown in FIG. 24. The wafer pusher assembly can be driven by a wafer pusher actuator/linear motor 233 (FIG. 24). The wafer pusher assembly 207 can include a wafer break having a knob 257 to adjust the wafer break adjustment. Additionally the wafer pusher assembly 207 can include guide shafts 234 and guide bearings 244. The wafer pushers 207 can travel along an axis, such as a vertical axis A A transport assembly station communicates with the indexing means 209 for receiving ice cream sandwiches from the discharge end thereof and moving them to a wrapping assembly, where the transport assembly station comprising one or more actuators means for receiving and moving said ice cream sandwiches forward, to be interfaced by an elevator actuator assembly 235. In one exemplary embodiment, the transport assembly station can include an inclined elevator assembly 240 and an indexing wheel ejector assembly 241. The indexing wheel ejector assembly 241 can include an ejector head portion 243, a linear motor/actuator 361, an ejector shaft 362, one or more guide bearings 363, and one or more guide shafts 364. The ejector head portion 243 can be coupled to the end of the ejector shaft that is driven by the linear motor. In one exemplary embodiment, the ejector head 243 can be wider in diameter than the width of the indexing wheel 209 to allow for indexing wheel 209 to rotate within the opening of the ejector head portion as illustrated in FIG. 27B. The inclined elevator assembly 240 can include an inclined elevator head portion 242, a linear motor/actuator 371, an ejector shaft 372, one or more guide bearings 373, and one or more guide shafts 374. The ejector head portion 242 can be coupled to the end of the inclined elevator shaft that is driven by the linear motor 371 along an axis, such as axis D shown in FIG. 27A. In one exemplary embodiment, the inclined elevator head 242 can be wider in diameter than the width of the ejector head to allow for indexing wheel to rotate within the opening of the ejector head portion and the inclined head to guide the sandwich to the path of the elevator pad without contacting the ejector head portion as illustrated in FIG. 27B. The linear motor 361 can drive the ejector head portion 243 coupled to the shaft 362 along an axis, such as axis C.

A sandwich wrapping assembly is located at the discharge end of the transport assembly actuator(s) when fully extended, the wrapping assembly comprising a vertically reciprocable elevator actuator assembly 235 (FIG. 22) for receiving the sandwich and a sheet of wrapping material and conveying the sandwich and the wrapping material to a tucking mechanism. The elevator actuator assembly 235 can be mounted to the outer layer 202 or support structure using a mounting bracket 295. The elevator actuator assembly 235 can include an elevator pad 220, an elevator shaft 219, one or more stator guide bearings 222, an anti-rotation guide member 223, and a linear drive motor 236. In some exemplary embodiments, the elevator pad 220 can travel vertically along an axis, such as axis B, intercepting the sandwich from the inclined elevator axis and then carries it up through the wrapping throat/head. The inclined elevator 240 can be angled at a pre-determined angle. In some exemplary embodiments, the inclined elevator can be at an angle between about 1 degree and 90 degrees, between about 5 degrees and 60 degrees, and about 15 and 45 degrees.

The tucking mechanism can be comprised of two laterally disposed and reciprocal side tucking fingers for urging said wrapping paper about the opposite ends of said sandwich, and a bottom tucking assembly 232 (FIG. 23) in a direction from the side tucking assembly 230, and co-acting therewith to complete the wrapping of the ice cream sandwich and pushing the sandwich off of the assembly. The bottom tucking assembly 232 can include a linear motor 289, a bottom fold arm 290 coupled to the end of a pusher shaft 287, one or more guide shafts 286 to help maintain the linear movement of the pusher shaft 287, and one or more actuator guide bearings 292.

The sandwich transport station can move sandwiches from the indexing wheel to the wrapper head of the sandwich wrapping station. The sandwich wrapping assembly can include a bottom fold portion (FIG. 23) and a side tucker assembly 230 (FIG. 25), and a roller assembly portion, wherein the sandwich wrapping station provides a wrapped ice cream sandwich. The wrapper feed station 325 shown in FIGS. 21A-C provides wrap/paper 334 to the roller assembly that is used to wrap the ice cream sandwiches as they are transported to the sandwich wrapping station (FIG. 19-20). In one exemplary embodiment, the roller assembly 237 can include three axes using a first servo motor 238a, second servo motor 238b, and third servo motor 238c to drive each axis individually without the need of using a gears as previously discussed. The roller assembly 237 can further include solid lube bearings 239 to help minimize wear and the need for oiling or lubricants that could potentially contaminate products and need more maintenance. The side tucker portion 230 can include a linear actuator 330 to drive a rod 332 coupled to a rotational connecting assembly 344 that allows for the side tucker fingers 215, which can include an inside tucker 215a and an outside tucker 215b to simultaneously tuck the paper under the ice cream sandwich or comestible product.

The invention further extends in a first aspect to the modular construction of the described apparatus, in that the sandwich assembling station, sandwich indexing means and the sandwich wrapping means are all removable from the apparatus and replaceable with corresponding components of different size to accommodate the manufacture of differently sized sandwich products. Thus, the wafer trays, extruder nozzles, indexing wheel, elevator, side tuck fingers and bottom tuck device may all be removed and replaced with like components of different dimension. Similarly, the outer layer can be removeably itself and allow for a user to replace an entire outer layer already having various elements coupled to the outer layer, without having to replace each individual element. Additionally, the outer layer allows for better maintenance and cleaning practices.

The exemplary embodiment shown in FIG. 18A-C further illustrates improvements to the drivetrain systems of the apparatus by supplying each individual station with a one or more servo motors or linear actuators to drive each respected station in communication with each other. The apparatus described above comprising a plurality of servo motors drives for driving the various stations and components within each station, of the apparatus. The servo motors may be communicatively coupled to and coordinated by a controller such as a programmable logic controller ("PLC") 500 that provides a variety of custom and/or complex controls. Increasing the number of servo motors 503 and the manner of the application of the servo motors provides increased control of each station and component within the station of the apparatus, allowing a user to optimize the functionality of the apparatus based on variables in sizes of sandwich products. The additional functionality provided by the servo motors can provide higher production rates, easier repair, and adjustability of timing requirements for the apparatus throughput requirements.

Figure 30:
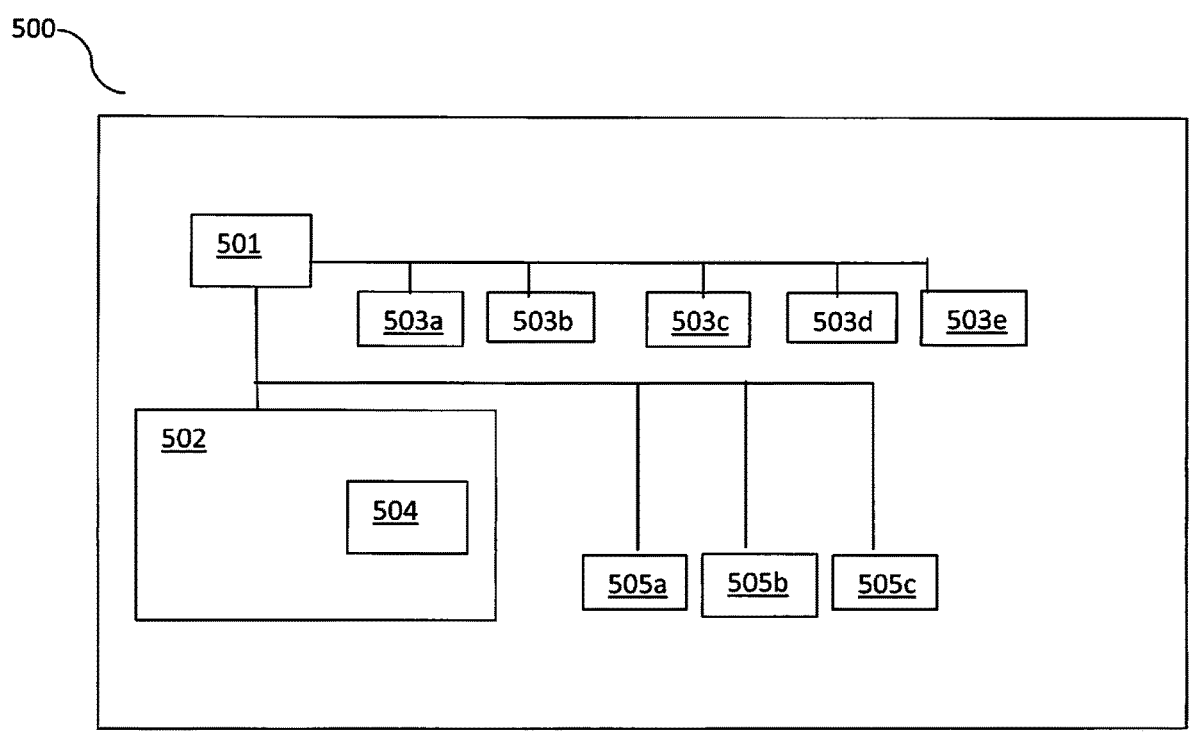
FIG. 30 is a diagram of the controller system of an exemplary embodiment of the apparatus of the present disclosure.

A shown in FIG. 30, the controller 500 can be any suitable means such as a computer and can include a processing means 501, memory 502 for storing pre-determined programs, and communicatively coupled to the various servo motors 503 and/or sensors 505 of the apparatus. The motors can include the linear motors or servo motors used by various assemblies of the apparatus. Similarly, the sensors can include load cell sensors, ultra-sonic sensors, brake sensors, wrap tension sensors, distance sensors, and other sensors the apparatus may incorporate in order to optimize the function of the apparatus.

In some exemplary embodiments, a logic controller 500 can include a wrap tension logic system 504, which can be stored on the memory 502. In some exemplary embodiments, the wrap tension logic 504 be stored on the memory and can allow the apparatus to provide a steady and consistent tension to the wrapping paper. A user can first input one or more parameters, including machine speed (cycles per minute) and a wrap cut length. These (2) parameters define a linear wrap feed rate that must be provided by the system for the correct amount of wrap for each sandwich.

The wrap feed system can be controlled by about five servo axes in one exemplary embodiment. Two of the servo axes can be directly coupled to the rolls of paper via paper arbors and chucks 335. Only one is used at each time based on which roll is selected, however, both can operate for about 10 seconds while changing wrap. One or more laser distance sensors 333 above each roll measure the diameters of the rolls. With the measured diameter and the calculated wrap feed rate, the controller 500 can calculate a speed to spin the roll to provide the correct amount of wrap. A load cell 327 provides feedback and based on an operator-set tension, the speed of the paper feed is slightly increased or decreased to decrease or increase the tension in the web using a PID loop (proportional, integral, and derivative). The wrap 334 can then be fed into a roller assembly 237 that in some exemplary embodiments can include three or more servo axes driven by individual servo motors 238 as shown in FIG. 19. The first motor in the roller assembly spins at the feed rate of the wrap calculated from the wrap feed rate and the roller's fixed diameter. The second motor controls a knife blade and spins at a rate of 1 cut per cycle of the machine. The third can spin at a rate about 5-30%, or about 10-20% faster than the first to create tension when cutting and also to get the wrap into the wrapping head quick enough. A contrast sensor 388 can optionally be used to detect registration marks on certain printed wrap. The contact sensor can be located between the paper feed and the roller assemblies proximate to the infeed plate. This sensor is immediately before the wrap enters the roller assembly and just after the load cell. When a registration adjustment is made, the first and third motors of the wrapping assembly as well as the active wrap feed servo motor are incrementally pulsed forwards or stopped based on the registration contrast sensor reading to shift the location of the cut. The knife servo may not be adjusted ensuring that the timing of the paper relative to the rest of the machine is not affected. Also, the data provided by the load cell is run through a filter to isolate out impulses incurred when making registration adjustments.

The drivetrain of the apparatus is less complex and there is less congested by eliminating the multiple chains, belts, and gears necessary to properly coordinate the interaction between the stations and components therein. The less congestion allows for easier access for repair, replacement, and modularity of the parts cantilevered to the wall. The servos also prevent the need to re-gear the drivetrain mechanism to conform to the type and size of sandwich being produced and can easily be adjusted using the PLC to control the speed of the individual servo motors. The timing and coordination of the various servo motors are capable of being performed rapidly through the PLC that can be connected to an electronic interface, such as a graphical user interface, thus allowing a user to manual control or load a pre-set program to be performed by the PLC.

The present apparatus may thereby be easily converted to accommodate the need for the production of ice cream sandwiches of different size, simply by the removal and replacement of the key elements of the sandwich fabricating process, as described above. The ability for the PLC to have pre-determined programs for various sized sandwiches, and thus, powering the individual servo motors accordingly eliminates the need to retime the apparatus using different sprockets required by a typical chain driven apparatus. Thus, the extruder, the wafer trays, the indexing wheel, the sandwich elevator and the support for the side tucking devices and bottom tucking devices may all be easily removed and replaced with corresponding elements of different size. Likewise, the conveyors may be adjusted as indicated above by the slidable movement and locking down of the respective guard rails and conveyor sprockets. More generally, the disposition of the entire apparatus in cantilevered fashion, extending from the single vertical support wall, and use of servo motors facilitates both the ease of retrofitting as described, and likewise renders the entire apparatus more accessible for rapid cleaning in use.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. An apparatus for the preparation of a sandwich product comprising:

a base having an infeed end and a discharge end;

a sandwich product assembly station comprising an extruder nozzle mounted for discharge of a comestible filling material in the vertically downward direction, paired wafer trays for feeding wafers against opposite sides of said extruder nozzle, and a vertically actuated wafer pusher driven by a first actuator motor have a wafer pusher blade cooperating therewith to urge wafers downward into contact with said comestible filling material;

an indexing wheel rotatably mounted vertically below said sandwich product assembly station, said indexing wheel defining a plurality of circumferentially positioned pockets for receiving and transferring assembled sandwiches for conveyance toward said discharge end, wherein said indexing wheel is driven by a first servo motor;

a transport assembly having an indexing wheel ejector proximate to said indexing wheel, wherein said indexing wheel ejector is driven by an actuator, and a inclined elevator driven by a second actuator, wherein inclined elevator is positioned at a pre-determined angle;

a wrapping assembly comprising a wrapping head having an upper platform, an elevator having a shaft for the upward travel of a sandwich product to said upper platform driven by an actuator for receiving said sandwich from the coordinated indexing wheel ejector and inclined elevator to deliver said sandwich product to said upper platform, side tucking device mounted adjacent said shaft wherein said side tucking device is driven by a servo motor, and pusher bar mounted adjacent said upper platform for urging the wrapped sandwich product off said elevator and toward said discharge end, wherein said push bar is driven by a servo motor;

a wrapping feeder, wherein said wrapping feeder comprises a wrap roller driven by a servo motor to feed a wrap to said wrapping assembly; and a controller communicatively connected to each servo motor configured to control the servo motors and timing of each servo motor relative to each other according to a pre-determined program on a memory, wherein said base comprises a vertical wall member, and wherein said sandwich product assembly station, said sandwich transporting assembly, said sandwich wrapping assembly and said inclined elevator are all mounted in cantilevered relationship on said base.

2. The apparatus of claim 1, further including an output conveyor extending from said upper platform toward said discharge end.

3. The apparatus of claim 1, further including at least one heated platen proximate to the discharge end, wherein said heated platen is configured to heat seal the bottom overlaps of the cut sheet of wrapping paper to each other and provide a secure wrap of said sandwich product.

4. The apparatus of claim 2, wherein said friction member is a heated platen configured to heat seal the bottom overlaps of the cut sheet of wrapping paper to each other and provide a secure wrap of said sandwich product.

5. The apparatus of claim 1, further comprising a braking system coupled to said wrapping feeder and communicatively coupled to said controller.

6. The apparatus of claim 5, wherein the braking system comprises:

a sensor configured to monitor the tension of said wrap, and a braking system configured to apply torque to said wrap roller.

7. The apparatus of claim 6, wherein said braking system is a magnetic particle brake.

8. The apparatus of claim 7, wherein said braking system is a pneumatic brake.

9. The apparatus of claim 7, wherein said breaking system is a servo motor.

10. The apparatus of claim 1, wherein said wrap roller servo drive assembly is further comprised of additional servo motors configured, wherein the servos are configured to drive a first and second roller to feed a wrap to said wrapping assembly, and wherein a third servo motor is configured to drive a rotary knife configured to cut said wrap.

11. The apparatus of claim 1, wherein said wrapper roller comprises a first motor, a second motor, and a third motor, wherein first motor in the wrapper roller spins at a first pre-determined rate, the second motor is coupled to rotary knife and spins at a second pre-determined rate, and the third motor can spin at a third pre-determined rate.

12. The apparatus of claim 11, wherein the first pre-determined rate is the wrap calculated from the wrap feed rate and the roller's fixed diameter.

13. The apparatus of claim 12, wherein the third pre-determined rate is faster than the first pre-determined rate and is configured to create tension when cutting the wrap.

14. The apparatus of claim 13, wherein the inclined elevator has a head portion and the indexing wheel ejector has an ejector head portion, wherein the indexing wheel has a first width, the inclined elevator head portion has a second width, and the ejector head portion has a third width.

15. The apparatus of claim 14, wherein the indexing wheel width is narrower that the ejector head width.

16. The apparatus of claim 15, further comprising a quick disconnecting arbor chuck including a plunger, shaft, and one or more clamping jaws, wherein the chuck is configured to clamp equally around the diameter of a paper core and maintain the paper in a centered configuration.

17. The apparatus of claim 16, wherein the shaft has a stepped configuration having a plurality of steps, wherein said steps contact an interfacing portion of the claiming jaws to further extend the jaws as the plunger is further depressed.

18. A method for controlling the tension of wrap on a wrap feed system comprising:

providing a controller communicatively coupled to a first servo motor coupled to a roll of wrap, a second servo motor, a third servo motor, a fourth servo motor, and a laser distance sensor positioned proximate to the roll of wrap configured to measure the diameter of the roll of wrap;

initiate wrap at a prescribed a feed rate at a first pre-determined rate;

input a desired a wrap tension;

monitor the tension of the wrap;

change the feed rate to increase or decrease the wrap tension;

calculate using the controller the speed of the spin of the roll to provide a pre-determined amount of wrap;

provide wrap to the second motor, wherein the second motor spins at the same rate as the first motor;

spin second motor at a second pre-determined rate, wherein said second pre-determined rate corresponds to a wrapping cycle;

spin third motor at a third-predetermined rate, wherein said third pre-determined rate is faster than said first pre-determined rate and configured to create tension on the wrap.

* * * * *